US010841542B2

(12) United States Patent
Siminoff et al.

(10) Patent No.: US 10,841,542 B2
(45) Date of Patent: Nov. 17, 2020

(54) LOCATING A PERSON OF INTEREST USING SHARED VIDEO FOOTAGE FROM AUDIO/VIDEO RECORDING AND COMMUNICATION DEVICES

(71) Applicant: Ring Inc., Santa Monica, CA (US)

(72) Inventors: James Siminoff, Pacific Palisades, CA (US); Mark Troughton, Santa Monica, CA (US); Aviv Gilboa, Los Angeles, CA (US); Darrell Sommerlatt, Los Angeles, CA (US); Alex Jacobson, Tucson, AZ (US)

(73) Assignee: A9.Com, Inc., Palo Alto, CA (US)

( * ) Notice: Subject to any disclaimer, the term of this patent is extended or adjusted under 35 U.S.C. 154(b) by 141 days.

(21) Appl. No.: 15/857,537

(22) Filed: Dec. 28, 2017

(65) Prior Publication Data
US 2018/0146169 A1 May 24, 2018

Related U.S. Application Data

(63) Continuation-in-part of application No. 15/480,214, filed on Apr. 5, 2017, which is a continuation-in-part
(Continued)

(51) Int. Cl.
*H04N 7/18* (2006.01)
*G06K 9/00* (2006.01)
(Continued)

(52) U.S. Cl.
CPC ......... *H04N 7/186* (2013.01); *G06F 16/5846* (2019.01); *G06F 16/784* (2019.01);
(Continued)

(58) Field of Classification Search
CPC ............... H04N 7/186; H04N 1/00925; H04N 1/32016; H04N 1/33323; G08B 27/003;
(Continued)

(56) References Cited

U.S. PATENT DOCUMENTS 4,764,953 A    8/1988  Chern et al.
5,428,388 A    6/1995  von Bauer et al.
(Continued)

FOREIGN PATENT DOCUMENTS

CN    2585521 Y    11/2003
CN    2792061 Y    6/2006
(Continued)

OTHER PUBLICATIONS

Ahn, Jeong Hwan, International Search Report and Written Opinion of the International Searching Authority for PCT/US2018/025285, dated Jul. 31, 2018, International Application Division, Korean Intellectual Property Office, Republic of Korea, 14 pages.
(Continued)

*Primary Examiner* — Kyung H Shin
(74) *Attorney, Agent, or Firm* — Lee & Hayes, P.C.

(57) ABSTRACT

Systems and methods for communicating in a network using share signals in accordance with various embodiments of the present disclosure are provided. In one embodiment, a method for sharing video footage captured by audio/video (A/V) recording and communication devices is provided, the method comprising: receiving from a first client device a share signal including first image data including a person of interest; receiving from a second A/V recording and communication device second image data; transmitting to a second client device, the first image data and a request to check the second image data; receiving from the second client device a locate person command signal; searching the second image data for a match of the person of interest; and when a match of the person of interest is found, generating and transmitting an alert signal that includes a notification that the person of interest was matched in the second image data.

30 Claims, 59 Drawing Sheets

Related U.S. Application Data of application No. 15/431,607, filed on Feb. 13, 2017, now Pat. No. 10,033,780, and a continuation-in-part of application No. 15/431,275, filed on Feb. 13, 2017, now Pat. No. 9,819,713.

(60) Provisional application No. 62/376,826, filed on Aug. 18, 2016, provisional application No. 62/300,547, filed on Feb. 26, 2016.

(51) Int. Cl.

| | |
|---|---|
| *G08B 13/196* | (2006.01) |
| *G06K 9/20* | (2006.01) |
| *G06K 9/46* | (2006.01) |
| *G06F 16/783* | (2019.01) |
| *G06F 16/583* | (2019.01) |
| *G08B 27/00* | (2006.01) |
| *G08B 29/18* | (2006.01) |
| *G08B 3/10* | (2006.01) |
| *G06F 40/40* | (2020.01) |

(52) U.S. Cl.
CPC .......... *G06F 16/7844* (2019.01); *G06F 40/40* (2020.01); *G06K 9/00288* (2013.01); *G06K 9/00362* (2013.01); *G06K 9/00771* (2013.01); *G06K 9/2018* (2013.01); *G06K 9/4652* (2013.01); *G08B 3/10* (2013.01); *G08B 13/19602* (2013.01); *G08B 13/19619* (2013.01); *G08B 13/19645* (2013.01); *G08B 13/19656* (2013.01); *G08B 13/19669* (2013.01); *G08B 13/19682* (2013.01); *G08B 13/19684* (2013.01); *G08B 13/19691* (2013.01); *G08B 13/19695* (2013.01); *G08B 27/003* (2013.01); *G08B 27/005* (2013.01); *G08B 29/183* (2013.01); *G08B 13/19671* (2013.01)

(58) Field of Classification Search
CPC ............ G08B 27/005; G08B 13/19691; G08B 13/19645; G08B 13/19656; G08B 13/19682; G06Q 50/01
See application file for complete search history.

(56) References Cited

U.S. PATENT DOCUMENTS

| | | | |
|---|---|---|---|
| 5,760,848 A | 6/1998 | Cho | |
| 5,886,739 A | 3/1999 | Winningstad | |
| 6,072,402 A | 6/2000 | Kniffin et al. | |
| 6,192,257 B1 | 2/2001 | Ray | |
| 6,271,752 B1 | 8/2001 | Vaios | |
| 6,356,196 B1 | 3/2002 | Wong et al. | |
| 6,381,346 B1 | 4/2002 | Eraslan | |
| 6,429,893 B1 | 8/2002 | Xin | |
| 6,456,322 B1 | 9/2002 | Marinacci | |
| 6,476,858 B1 | 11/2002 | Ramirez Diaz et al. | |
| 6,618,727 B1 | 9/2003 | Wheeler et al. | |
| 6,633,231 B1 | 10/2003 | Okamoto et al. | |
| 6,636,256 B1 | 10/2003 | Passman et al. | |
| 6,658,091 B1 | 12/2003 | Naidoo et al. | |
| 6,753,774 B2 | 6/2004 | Pan et al. | |
| 6,917,952 B1 | 7/2005 | Dailey et al. | |
| 6,970,183 B1 | 11/2005 | Monroe | |
| 6,975,346 B2 | 12/2005 | Kumhyr | |
| 7,062,291 B2 | 6/2006 | Ryley et al. | |
| 7,065,196 B2 | 6/2006 | Lee | |
| 7,085,361 B2 | 8/2006 | Thomas | |
| 7,109,860 B2 | 9/2006 | Wang | |
| 7,134,088 B2 | 11/2006 | Larsen | |
| 7,193,644 B2 | 3/2007 | Carter | |
| 7,304,572 B2 | 12/2007 | Sheynman et al. | |
| 7,346,472 B1 | 3/2008 | Moskowitz et al. | |
| 7,382,249 B2 | 6/2008 | Fancella | |
| 7,450,638 B2 | 11/2008 | Iwamura | |
| 7,483,485 B2 | 1/2009 | Winningstad et al. | |
| 7,496,140 B2 | 2/2009 | Winningstad et al. | |
| 7,643,056 B2 | 1/2010 | Silsby | |
| 7,669,771 B2 | 3/2010 | Puttaswamy | |
| 7,683,924 B2 | 3/2010 | Oh et al. | |
| 7,683,929 B2 | 3/2010 | Elazar et al. | |
| 7,738,917 B2 | 6/2010 | Ryley et al. | |
| 7,786,891 B2 | 8/2010 | Owens et al. | |
| 7,787,697 B2 | 8/2010 | Ritzau et al. | |
| 7,820,900 B2 | 10/2010 | Lemons | |
| 7,834,904 B2 | 11/2010 | Brookins | |
| 7,894,519 B2 | 2/2011 | Winningstad et al. | |
| 8,077,029 B1 | 12/2011 | Daniel et al. | |
| 8,086,461 B2 | 12/2011 | De Los Reyes et al. | |
| 8,121,839 B2 | 2/2012 | Srivastava et al. | |
| 8,139,098 B2 | 3/2012 | Carter | |
| 8,144,183 B2 | 3/2012 | Carter | |
| 8,154,581 B2 | 4/2012 | Carter | |
| 8,295,649 B2 | 10/2012 | Berini et al. | |
| 8,457,366 B2 | 6/2013 | Cheswick | |
| 8,520,072 B1 | 8/2013 | Slavin et al. | |
| 8,619,136 B2 | 12/2013 | Howarter et al. | |
| 8,630,820 B2 | 1/2014 | Amis | |
| 8,872,915 B1 | 5/2014 | Scalisi et al. | |
| 8,780,201 B1 | 7/2014 | Scalisi et al. | |
| 8,823,795 B1 | 9/2014 | Scalisi et al. | |
| 8,824,750 B2 | 9/2014 | Jankowski et al. | |
| 8,842,180 B1 | 9/2014 | Kasmir et al. | |
| 8,937,659 B1 | 1/2015 | Scalisi et al. | |
| 8,937,661 B1 | 1/2015 | Slavin et al. | |
| 8,941,736 B1 | 1/2015 | Scalisi | |
| 8,947,530 B1 | 2/2015 | Scalisi | |
| 8,948,465 B2 | 2/2015 | Tiwari et al. | |
| 8,953,040 B1 | 2/2015 | Scalisi et al. | |
| 8,983,941 B1 | 3/2015 | Murphy-Chutorian et al. | |
| 8,998,084 B2 | 4/2015 | McIntyre | |
| 9,013,575 B2 | 4/2015 | Scalisi | |
| 9,049,352 B2 | 6/2015 | Scalisi et al. | |
| 9,053,622 B2 | 6/2015 | Scalisi | |
| 9,055,202 B1 | 6/2015 | Scalisi et al. | |
| 9,058,738 B1 | 6/2015 | Scalisi | |
| 9,060,103 B2 | 6/2015 | Scalisi | |
| 9,060,104 B2 | 6/2015 | Scalisi | |
| 9,065,987 B2 | 6/2015 | Scalisi | |
| 9,094,584 B2 | 7/2015 | Scalisi et al. | |
| 9,109,378 B2 | 8/2015 | Scalisi | |
| 9,113,051 B1 | 8/2015 | Scalisi | |
| 9,113,052 B1 | 8/2015 | Scalisi et al. | |
| 9,118,819 B1 | 8/2015 | Scalisi et al. | |
| 9,142,214 B2 | 9/2015 | Scalisi | |
| 9,160,987 B1 | 10/2015 | Kasmir et al. | |
| 9,165,444 B2 | 10/2015 | Scalisi | |
| 9,172,920 B1 | 10/2015 | Kasmir et al. | |
| 9,172,921 B1 | 10/2015 | Scalisi et al. | |
| 9,172,922 B1 | 10/2015 | Kasmir et al. | |
| 9,179,107 B1 | 11/2015 | Scalisi | |
| 9,179,108 B1 | 11/2015 | Scalisi | |
| 9,179,109 B1 | 11/2015 | Kasmir et al. | |
| 9,196,133 B2 | 11/2015 | Scalisi et al. | |
| 9,197,867 B1 | 11/2015 | Scalisi et al. | |
| 9,204,103 B1 | 12/2015 | Zhang et al. | |
| 9,230,424 B1 * | 1/2016 | Scalisi ................. | G08B 27/005 |
| 9,237,318 B2 | 1/2016 | Kasmir et al. | |
| 9,240,214 B2 | 1/2016 | Hannuksela | |
| 9,247,219 B2 | 1/2016 | Kasmir et al. | |
| 9,253,455 B1 | 2/2016 | Harrison et al. | |
| 9,342,936 B2 | 5/2016 | Scalisi | |
| 9,389,083 B1 | 7/2016 | Agulnik et al. | |
| 9,489,745 B1 | 11/2016 | Heitz, III et al. | |
| 9,494,936 B2 | 11/2016 | Kerzner | |
| 9,508,239 B1 | 11/2016 | Harrison et al. | |
| 9,542,832 B1 | 1/2017 | Fu et al. | |
| 9,572,503 B2 | 2/2017 | DeForest | |
| 9,619,955 B2 | 4/2017 | Eichenblatt | |
| 9,646,217 B2 | 5/2017 | Hanna | |
| 9,679,428 B2 | 6/2017 | Arpin et al. | |

(56) References Cited

U.S. PATENT DOCUMENTS

| | | |
|---|---|---|
| 9,721,166 B2 | 8/2017 | Deri et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,779,316 B2 | 10/2017 | Rao et al. |
| 9,786,133 B2 | 10/2017 | Harrison et al. |
| 9,799,183 B2 | 10/2017 | Harrison et al. |
| 9,854,211 B2 | 12/2017 | Yamaguchi et al. |
| 9,860,282 B2 | 1/2018 | Farrell |
| 9,946,919 B2 | 4/2018 | Weiner et al. |
| 10,008,099 B2 | 6/2018 | Drolshagen et al. |
| 10,522,013 B2 | 12/2019 | Gordon-Carroll |
| 10,529,204 B2 | 1/2020 | Hicks, III et al. |
| 2002/0094111 A1 | 7/2002 | Puchek et al. |
| 2002/0147982 A1 | 10/2002 | Naidoo et al. |
| 2003/0043047 A1 | 3/2003 | Braun |
| 2003/0053659 A1 | 3/2003 | Pavlidis et al. |
| 2003/0058084 A1 | 3/2003 | O'Hara |
| 2003/0130771 A1 | 7/2003 | Crank |
| 2004/0003073 A1 | 1/2004 | Krzyzanowski et al. |
| 2004/0081020 A1 | 4/2004 | Blosser et al. |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0021724 A1 | 1/2005 | Kung et al. |
| 2005/0111660 A1 | 5/2005 | Hosoda |
| 2005/0132414 A1 | 6/2005 | Bentley et al. |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2006/0170956 A1 | 8/2006 | Jung et al. |
| 2006/0221190 A1 | 10/2006 | Limberis et al. |
| 2007/0008081 A1 | 1/2007 | Tylicki et al. |
| 2007/0091177 A1 | 4/2007 | West et al. |
| 2007/0217780 A1 | 9/2007 | Hirooka et al. |
| 2008/0041942 A1 | 2/2008 | Aissa |
| 2008/0084473 A1 | 4/2008 | Romanowich |
| 2008/0115174 A1 | 5/2008 | Nicholl et al. |
| 2008/0163355 A1 | 7/2008 | Chu |
| 2008/0288299 A1 | 11/2008 | Schultz |
| 2009/0300608 A1 | 12/2009 | Ferris et al. |
| 2009/0326942 A1 | 12/2009 | Fulop |
| 2010/0146055 A1 | 6/2010 | Hannuksela |
| 2010/0225455 A1 | 9/2010 | Claiborne et al. |
| 2010/0309225 A1 | 12/2010 | Gray et al. |
| 2011/0004474 A1 | 1/2011 | Bansal et al. |
| 2011/0013018 A1 | 1/2011 | Leblond |
| 2011/0058034 A1 | 3/2011 | Grass |
| 2011/0302420 A1 | 12/2011 | Davida |
| 2012/0044050 A1 | 2/2012 | Vig et al. |
| 2012/0075469 A1 | 3/2012 | Oskin et al. |
| 2012/0105632 A1 | 5/2012 | Renkis |
| 2012/0243730 A1 | 9/2012 | Outtagarts et al. |
| 2012/0257061 A1 | 10/2012 | Edwards et al. |
| 2012/0313781 A1 | 12/2012 | Barker et al. |
| 2013/0057695 A1 | 3/2013 | Huisking |
| 2013/0073624 A1 | 3/2013 | Nguyen et al. |
| 2013/0212521 A1 | 8/2013 | Fedoseyeva et al. |
| 2013/0346563 A1 | 12/2013 | Huang |
| 2014/0070922 A1 | 3/2014 | Davis |
| 2014/0098227 A1 | 4/2014 | Chen et al. |
| 2014/0132772 A1 | 5/2014 | Billau et al. |
| 2014/0143334 A1 | 5/2014 | Jung |
| 2014/0155171 A1 | 6/2014 | Laakkonen et al. |
| 2014/0232737 A1 | 8/2014 | Zhang et al. |
| 2014/0267716 A1 | 9/2014 | Child et al. |
| 2014/0267775 A1 | 9/2014 | Lablans |
| 2014/0282877 A1 | 9/2014 | Mahaffey et al. |
| 2014/0293046 A1 | 10/2014 | Ni |
| 2014/0304178 A1 | 10/2014 | Bengson et al. |
| 2014/0313330 A1 | 10/2014 | Carey |
| 2014/0328570 A1 | 11/2014 | Cheng et al. |
| 2014/0329507 A1 | 11/2014 | Siminoff |
| 2014/0330890 A1 | 11/2014 | Hourani et al. |
| 2014/0365568 A1 | 12/2014 | Huang et al. |
| 2014/0368601 A1 | 12/2014 | deCharms |
| 2015/0016665 A1 | 1/2015 | Tanner |
| 2015/0022618 A1 | 1/2015 | Siminoff |
| 2015/0035987 A1 | 2/2015 | Fernandez |
| 2015/0058016 A1 | 2/2015 | Goldstein |
| 2015/0095352 A1 | 4/2015 | Lacey |
| 2015/0098686 A1 | 4/2015 | Obukhov et al. |
| 2015/0109111 A1 | 4/2015 | Lee et al. |
| 2015/0109128 A1 | 4/2015 | Fadell et al. |
| 2015/0145991 A1 | 5/2015 | Russell et al. |
| 2015/0154462 A1 | 6/2015 | Rosenkrantz |
| 2015/0156031 A1 | 6/2015 | Fadell et al. |
| 2015/0163463 A1 | 6/2015 | Hwang et al. |
| 2015/0172853 A1 | 6/2015 | Liu et al. |
| 2015/0180750 A1 | 6/2015 | LaPlante et al. |
| 2015/0189041 A1 | 7/2015 | Wang et al. |
| 2015/0189243 A1 | 7/2015 | Cucco |
| 2015/0208103 A1 | 7/2015 | Guntur et al. |
| 2015/0281321 A1 | 10/2015 | Hrytsevich et al. |
| 2015/0293996 A1 | 10/2015 | Liu |
| 2015/0319590 A1 | 11/2015 | Sharon et al. |
| 2015/0339912 A1 | 11/2015 | Farrand et al. |
| 2015/0341599 A1 | 11/2015 | Carey |
| 2015/0341603 A1 | 11/2015 | Kasmir et al. |
| 2015/0363638 A1 | 12/2015 | Takahashi |
| 2015/0363989 A1 | 12/2015 | Scalisi |
| 2015/0365632 A1 | 12/2015 | Eilertsen |
| 2015/0365707 A1 | 12/2015 | Melanson |
| 2015/0370615 A1 | 12/2015 | Pi-Sunyer |
| 2016/0050037 A1 | 2/2016 | Webb |
| 2016/0092727 A1 | 3/2016 | Ren et al. |
| 2016/0094810 A1 | 3/2016 | Mirza et al. |
| 2016/0105644 A1 | 4/2016 | Smith et al. |
| 2016/0180152 A1 | 6/2016 | Rosenkrantz et al. |
| 2016/0180667 A1 | 6/2016 | Bunker et al. |
| 2016/0182850 A1 | 6/2016 | Thompson |
| 2016/0192166 A1 | 6/2016 | deCharms |
| 2016/0203370 A1 | 7/2016 | Child et al. |
| 2016/0224841 A1 | 8/2016 | Rosenkrantz et al. |
| 2016/0248840 A1 | 8/2016 | Bockhold et al. |
| 2016/0260459 A1 | 9/2016 | Miner |
| 2016/0283797 A1 | 9/2016 | Chung et al. |
| 2016/0286607 A1 | 9/2016 | Mishra et al. |
| 2016/0343220 A1 | 11/2016 | Grabham |
| 2016/0345035 A1 | 11/2016 | Han et al. |
| 2016/0351030 A1 | 12/2016 | Williams |
| 2016/0366373 A1 | 12/2016 | Siminoff et al. |
| 2017/0124834 A1 | 5/2017 | Pedersoli et al. |
| 2017/0127012 A1 | 5/2017 | Marchya et al. |
| 2017/0161383 A1 | 6/2017 | Caudle et al. |
| 2017/0214781 A1 | 7/2017 | Ichida et al. |
| 2017/0236193 A1 | 8/2017 | Zundel et al. |
| 2017/0262798 A1 | 9/2017 | Kosseifi et al. |
| 2017/0270930 A1 | 9/2017 | Ozmeral et al. |
| 2017/0272269 A1 | 9/2017 | Siminoff |
| 2017/0293883 A1 | 10/2017 | Li et al. |
| 2018/0012460 A1 | 1/2018 | Heitz, III et al. |
| 2018/0033153 A1 | 2/2018 | Hirasawa et al. |
| 2018/0220108 A1 | 8/2018 | Siminoff et al. |
| 2018/0232895 A1 | 8/2018 | Modestine et al. |
| 2018/0233010 A1 | 8/2018 | Modestine et al. |
| 2018/0233025 A1 | 8/2018 | Modestine et al. |
| 2018/0356961 A1 | 12/2018 | Lewis et al. |
| 2019/0051143 A9 | 2/2019 | Modestine et al. |
| 2019/0260959 A1 | 8/2019 | Saito et al. |
| 2019/0342527 A1 | 11/2019 | Siminoff |
| 2019/0378284 A1 | 12/2019 | Siminoff et al. |
| 2020/0042555 A1 | 2/2020 | Duda et al. |
| 2020/0043185 A1 | 2/2020 | Siminoff et al. |
| 2020/0112679 A1 | 4/2020 | Lemberger |

FOREIGN PATENT DOCUMENTS

| | | |
|---|---|---|
| CN | 104318654 | 1/2015 |
| EP | 0944883 A1 | 6/1998 |
| EP | 1480462 A1 | 11/2004 |

(56) References Cited

FOREIGN PATENT DOCUMENTS

| | | |
|---|---|---|
| GB | 2286283 A | 8/1995 |
| GB | 2354394 A | 3/2001 |
| GB | 2357387 A | 6/2001 |
| GB | 2400958 A | 10/2004 |
| IN | 2015CH00695 | 4/2015 |
| JP | 2001-103463 A | 4/2001 |
| JP | 2002-033839 A | 1/2002 |
| JP | 2002-125059 A | 4/2002 |
| JP | 2002-342863 A | 11/2002 |
| JP | 2002-344640 A | 11/2002 |
| JP | 2002-354137 A | 12/2002 |
| JP | 2002-368890 A | 12/2002 |
| JP | 2003271504 | 9/2003 |
| JP | 2003-283696 A | 10/2003 |
| JP | 2004054536 | 2/2004 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 2009-008925 A | 1/2009 |
| JP | 2011134003 | 7/2011 |
| JP | 2013065187 | 4/2013 |
| JP | 2016021732 | 12/2017 |
| KR | 10-1658006 | 9/2016 |
| WO | 1998/39894 A1 | 9/1998 |
| WO | 2001/13638 A1 | 2/2001 |
| WO | 2001/93220 A1 | 12/2001 |
| WO | 2002/085019 A1 | 10/2002 |
| WO | 2003/028375 A1 | 4/2003 |
| WO | 2003/096696 A1 | 11/2003 |
| WO | 2006/038760 A1 | 4/2006 |
| WO | 2006/067782 A1 | 6/2006 |
| WO | 2007/125143 A1 | 8/2007 |
| WO | WO2011043732 | 4/2011 |
| WO | WO2015155725 | 10/2015 |
| WO | WO2016109838 | 7/2016 |
| WO | WO2016114932 | 7/2016 |

OTHER PUBLICATIONS

Anonymous, "Creating a network share for video surveillance storage" dated Jan. 12, 2012, cctvcamerapros, 12 pages.
BusinessWire—FaceFirst Makes Shopping Safer with National Facial Recognition Deployment—2014, 2 pages.
The Canadian Office Action dated Nov. 25, 2019 for Canadian Patent Application No. 3,015,480, a counterpart of U.S. Pat. No. 9,819,713, 3 pages.
Chacos—7 Casino Technologies They Dont Want You to Know About—Gizmodo—2011, 4 pages.
Cohen—6 Ways Law Enforcement Uses Social Media to Fight Crime—2010, 9 pages.
FindBiometrics—Interview_Joe Rosenkrantz_CEO_FaceFirst—2015, 13 pages.
Hess—Facial Recognition _A Valuable Tool for Law Enforcement—2010, 6 pages.
Office Action for U.S. Appl. No. 16/595,312, dated Jan. 22, 2020, Duda, "Searching Shared Video Footage From Audio/Video Recording and Communication Devices", 12 pages.
Final Office Action dated Sep. 24, 2019 for U.S. Appl. No. 15/904,398 "Neighborhood Alert Mode for Triggering Multi-Device Recording, Multi-Camera Locating, and Multi-Camera Event Stitching for Audio/Video Recording and Communication Devices" Modestine, 12 pages.
Final Office Action dated Oct. 17, 2019 for U.S. Appl. No. 15/904,403 "Neighborhood Alert Mode for Triggering Multi-Device Recording, Multi-Camera Locating, and Multi-Camera Event Stitching for Audio/Video Recording and Communication Devices" Modestine, 15 pages.
Office Action for U.S. Appl. No. 15/857,537, dated Oct. 23, 2019, Siminoff, "Locating a Person of Interest Using Shared Video Footage from Audio/Video Recording and Communication Devices", 22 pages.
Office Action for U.S. Appl. No. 15/480,214, dated Nov. 26, 2019, Siminoff, Triggering Actions Based on Shared Video Footage from Audio/Video Recording and Communication Devices, 20 Pages.
Office Action for U.S. Appl. No. 16/240,735, dated Dec. 10, 2019, Siminoff, "Sharing Video Footage from Audio/Video Recording and Communication Devices for Parcel Theft Deterrence", 8 pages.
Office action for U.S. Appl. No. 16/551,469, dated Dec. 2, 2019, Siminoff, "Sharing Video Footage from Audio/Video Recording and Communication Devices", 12 pages.
Non Final Office Action dated Dec. 26, 2019 for U.S. Appl. No. 15/926,496 "Augmenting and Sharing Data From Audio/Video Recording and Communication Devices" Siminoff, 19 pages.
Office Action for U.S. Appl. No. 15/925,637, dated Dec. 4, 2019, Siminoff, "Sharing Positive Information Captured Using Audio/Video Recording and Communication", 26 Pages.
Office Action for U.S. Appl. No. 15/904,398, dated Apr. 18, 2019, Modestine, "Neighborhood Alert Mode for Triggering Multi-Device Recording, Multi-Camera Motion Tracking, and Multi-Camera Event Stitching for Audio/Video Recording and Communication Devices", 11 pages.
The PCT Search Report and Written Opinion dated Jul. 31, 2018 for PCT application No. PCT/US2018/026054, 16 pages.
Roberts—Walmart used facial recognition technology to catch shoplifters—Fortune—2015, 9 pages.
US Dept of Justice—NDEx policy and operating manual—dated Jan. 26, 2016, 21 pages.
Indian Office Action dated May 28, 2020 for Indian Patent Application No. 201817033613, a counterpart of U.S. Pat. No. 9,819,713, 8 pages.
Japanese Office Action dated Jan. 20, 2020 for Japanese Patent Application No. 2019-0054022, a counterpart foreign application of the U.S. Pat. No. 9,819,713, 4 pages.
WhatsApp, "WhatsApp Share Button", WordPress.org, https://web.archive.org/web/20141120072621/https://wordpress.org/plugins/whatsapp/, Nov. 20, 2014, 3 pages.
Office Action for U.S. Appl. No. 15/721,549, dated Jan. 28, 2020, Siminoff, "Verification and Membership to Neighborhoods for Sharing of Video Footage from Audio/Video Recording and Communication Devices", 19 Pages.
Office Action for U.S. Appl. No. 15/904,403, dated Feb. 18, 2020, Modestine, "Neighborhood Alert Mode for Triggering Multi-Device Recording, Multi-Camera Locating, and Multi-Camera Event Stitching for Audio/Video Recording and Communication Devices", 16 Pages.
Office Action for U.S. Appl. No. 15/480,214, dated Mar. 26, 2020, Siminoff, "Triggering Actions Based on Shared Video Footage from Audio/Video Recording and Communication Devices", 26 Pages.
Office Action for U.S. Appl. No. 16/410,783, dated Jun. 18, 2020, Modestine, "Neighborhood Alert Mode for Triggering Multi-Device Recording, Multi-Camera Locating, and Multi-Camera Event Stitching for Audio/Video Recording and Communication Devices", 16 Pages.
Office Action Action for U.S. Appl. No. 15/904,403, dated Apr. 16, 2019, Modestine, "Neighborhood Alert Mode for Triggering Multi-Device Recording, Multi-Camera Motion Tracking, and Multi-Camera Event Stitching for Audio/Video Recording and Communication Devices", 10 pags.
Japanese Office Action dated Jun. 8, 2020 for Japanese Patent Application No. 2019-054022, a counterpart of U.S. Appl. No. 15/431,275, 4 pages.
Office Action for U.S. Appl. No. 16/517,574, dated Jun. 23, 2020, Siminoff, "Providing Status Information for Secondary Devices with Video Footage from Audio/Video Recording and Communication Devices ", 19 Pages.

* cited by examiner

LOCATING A PERSON OF INTEREST USING SHARED VIDEO FOOTAGE FROM AUDIO/VIDEO RECORDING AND COMMUNICATION DEVICES

CROSS-REFERENCE TO RELATED APPLICATIONS

This application is a continuation-in-part of U.S. application Ser. No. 15/480,214, filed on Apr. 5, 2017, which is a continuation-in-part of U.S. application Ser. No. 15/431,607, filed on Feb. 13, 2017, and U.S. application Ser. No. 15/431,275, filed on Feb. 13, 2017, each of which claims priority to provisional application Ser. No. 62/376,826, filed on Aug. 18, 2016, and provisional application Ser. No. 62/300,547, filed on Feb. 26, 2016. The entire contents of the priority applications are hereby incorporated by reference as if fully set forth.

TECHNICAL FIELD

The present embodiments relate to audio/video (A/V) recording and communication devices, including A/V recording and communication doorbell systems. In particular, the present embodiments improve the functionality of A/V recording and communication devices by facilitating easy sharing of video footage recorded by such devices.

BACKGROUND

Home safety is a concern for many homeowners and renters. Those seeking to protect or monitor their homes often wish to have video and audio communications with visitors, for example, those visiting an external door or entryway. Audio/Video (A/V) recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

SUMMARY

The various embodiments of the present apparatus, systems, and methods for locating a person of interest using shared video footage from audio/video (A/V) recording and communication devices have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present embodiments includes the realization that users of audio/video (A/V) recording and communication devices may from time to time desire to share video footage recorded by their devices. For example, when an A/V recording and communication device records video footage of suspicious activity, or even criminal activity, a user viewing the footage may desire to alert his or her neighbors to the possible danger posed by the person(s) involved in the suspicious or criminal activity. It would be advantageous, then, to enhance the functionality of A/V recording and communication devices by facilitating easy sharing of video footage recorded by such devices with one's neighbors. In another example, an A/V recording and communication device may record video footage of activity that may be of interest to the user's friends and family (e.g., images of children playing in the yard). It would be advantageous, then, to enhance the functionality of A/V recording and communication devices by facilitating easy sharing of video footage recorded by such devices with one's friends and family. The present embodiments, as described in detail below, provide these, and other, enhancements. In particular, the present embodiments enable video footage captured by A/V recording and communication devices to be readily uploaded to the cloud and shared with anyone of the user's choosing, including neighbors, friends, and family. In addition, the present embodiments improve upon and solve the problem of video footage captured by A/V recording and communication devices being accessible only to the owner of the A/V recording and communication device, which limits the ability of such devices to help stop crime.

Another aspect of the present embodiments includes the realization that A/V recording and communication devices, such as A/V recording and communication doorbells, are very well adapted for capturing audio and/or video of criminal activity, but not every person owns such a device. Further, many people who do not own such devices do own other types of devices, including client devices such as smartphones, that are equipped with cameras and microphones and are also capable of capturing audio and/or video of criminal activity. It would be advantageous, then, to provide a network that facilitated the sharing of audio and/or video of criminal activity regardless of what type of device captured the audio and/or video. It would be even more advantageous if such a network enabled communication between users who own A/V recording and communication devices, such as A/V recording and communication doorbells, and users who do not own such devices. And it would be still more advantageous if such a network facilitated the identification of persons engaged in criminal activity. The present embodiments provide such a network.

Another aspect of the present embodiments includes the realization that members of a neighborhood (may also be referred to as "network of users") may benefit from the capability of locating a person of interest, initially identified by a first user, on image data captured by other users. In various embodiments, a neighborhood may include a grouping of members (may also be referred to as "users") sharing information using a neighborhood platform running on each user's client device. For example, the neighborhood platform may include a neighborhood alert feed that allows members to post videos, photos, and/or texts to alert other members of possible suspicious activity in the neighborhood using a share signal. In some embodiments, a first user may share first image data that includes a person of interest committing a criminal act or acting suspiciously. In such embodiments, other users, such as a second user, may see the shared first image data in their neighborhood feed and be asked for permission to search second image data captured by devices associated with the second user for a match of the person of interest. Further, if the person of interest is found in the second image data, the matched second image data may be appended to the first image data of the person of interest and further shared to other users of the network. In other embodiments, a first user may not have video but may still share a text-based description of a person of interest. In such embodiments, other users, such as the second user, may see the shared text-based description of the person of interest and be asked for permission to search the second image data for a match of the text-based description of the person of interest. In addition, if the person of interest is found in the second image data, the matched second image data may be included with the text-based description of the person of interest and further shared to other users of the network. In these ways, neighborhood safety may be enhanced by tracking movement and activity of the person of interest and providing multiple data points for users of the network to see suspicious and/or criminal patterns in the neighborhood. The present embodiments provide these advantages and enhancements, as described below.

In a first aspect, a method for sharing video footage captured by audio/video (A/V) recording and communication devices is provided, the method comprising: receiving, from a first client device associated with a first A/V recording and communication device, at a backend server in network communication with the first A/V recording and communication device, a share signal including first image data captured by a camera of the first A/V recording and communication device, the first image data including a person of interest, the share signal including a command to share the first image data with a network of users; receiving, from a second A/V recording and communication device, at the backend server in network communication with the second A/V recording and communication device, second image data captured by a camera of the second A/V recording and communication device; transmitting, from the backend server to a second client device associated with the second A/V recording and communication device, the first image data that includes the person of interest and a request to check the second image data for the person of interest; receiving, from the second client device at the backend server, a locate person command signal, in response to the request to check the second image data for the person of interest; searching the second image data received from the second A/V recording and communication device for a match of the person of interest in the first image data; and when a match of the person of interest is found in the second image data, generating and transmitting an alert signal to the second client device, wherein the alert signal includes a notification that the person of interest was matched in the second image data.

In an embodiment of the first aspect, the alert signal, transmitted to the second client device, includes the second image data of the matched person of interest.

In another embodiment of the first aspect, the alert signal, transmitted to the second client device, includes a request for permission to share the second image data of the matched person of interest with the network of users.

In another embodiment of the first aspect, the method further comprises receiving, from the second client device, an append signal, in response to the request for permission to share the second image data of the matched person of interest, wherein the append signal includes a command to append the second image data of the matched person of interest onto the shared first image data of the person of interest.

In another embodiment of the first aspect, the method further comprises transmitting, to the network of users, the first image data and the second image data of the matched person of interest.

In another embodiment of the first aspect, the searching the second image data for the match of the person of interest is performed using at least one of facial recognition, color matching schemes, and a body build score.

In another embodiment of the first aspect, the method further comprises confirming, by a human operator, the match of the person of interest in the second image data.

In another embodiment of the first aspect, the searching the second image data for the match of the person of interest is restricted to a subset of the second image data captured during a predetermined length of time.

In another embodiment of the first aspect, the method further comprises receiving, from the second client device at the backend server, an automatic locate command signal, and in response activating a setting for automatically identifying a further person of interest and searching the second image data for a match of the further person of interest in the second image data each time a new share signal is received including the further person of interest.

In a second aspect, a method for sharing video footage captured by audio/video (A/V) recording and communication devices is provided, the method comprising: receiving, from a first client device, at a backend server in network communication with the first client device, a text-based description of a person of interest; receiving, from an A/V recording and communication device, at the backend server in network communication with the A/V recording and communication device, image data captured by a camera of the A/V recording and communication device; searching the image data for a match of the text-based description of the person of interest; transmitting, from the backend server to a second client device associated with the A/V recording and communication device, the matched image data and a request to confirm that the matched image data includes the person of interest; and receiving, from the second client device, confirmation that the matched image data includes the person of interest.

In an embodiment of the second aspect, the method further comprises transmitting, to the second client device, a request to share the matched image data with a user associated with the first client device.

In another embodiment of the second aspect, the method further comprises receiving, from the second client device at the backend server, a confirmation to share the matched image data with the first client device.

In another embodiment of the second aspect, the method further comprises transmitting, to the first client device, the matched image data and a request to confirm that the matched image data includes the person of interest.

In another embodiment of the second aspect, the method further comprises receiving, from the first client device at the backend server, a confirmation that the matched image data includes the person of interest.

In another embodiment of the second aspect, the method further comprises transmitting the matched image data to a network of users.

In another embodiment of the second aspect, the method further comprises transmitting, to the second client device, a request to share the matched image data with a network of users.

In another embodiment of the second aspect, the method further comprises receiving, from the second client device at the backend server, a confirmation to share the matched image data with the network of users.

In another embodiment of the second aspect, the method further comprises transmitting the matched image data to the network of users.

In another embodiment of the second aspect, the searching the image data for a match of the text-based description of the person of interest is performed using natural language processing.

In another embodiment of the second aspect, the searching the image data for a match of the text-based description of the at least one person of interest is performed by comparing a text-based description of the image data with the received text-based description of the person of interest.

In a third aspect, a method for sharing recorded video footage from audio/video (A/V) recording and communication devices is provided, the method comprising: receiving, from a backend server, at a second client device associated with a second A/V recording and communication device, first image data captured by a camera of a first A/V recording and communication device, the first image data including a person of interest; displaying, on a display of the second client device, the first image data that includes the person of interest; receiving, from the backend server, at the second client device, a second image data access request signal requesting permission to access second image data to search for a match of the person of interest, wherein the second image data is captured using a camera of the second A/V recording and communication device; displaying, on the display of the second client device, a request to access the second image data to search for a match of the person of interest; receiving a locate person command input from a user associated with the second client device; in response to the locate person command input, transmitting, from the second client device to the backend server, a locate person command signal; and receiving, from the backend server, at the second client device, an alert signal, wherein the alert signal includes a notification that the person of interest was matched in the second image data.

In an embodiment of the third aspect, the alert signal includes the second image data of the matched person of interest.

In another embodiment of the third aspect, the alert signal includes a second image data share request signal requesting permission to share the second image data of the matched person of interest to a network of users.

In another embodiment of the third aspect, the method further comprises: displaying, on the display of the second client device, a request to share the second image data with the network of users; receiving an append input from the user associated with the second client device; and in response to the append input, transmitting, from the second client device to the backend server, an append signal, wherein the append signal includes a command to append the second image data of the matched person of interest onto the first image data of the person of interest and share the appended second and first image data with the network of users.

In another embodiment of the third aspect, the method further comprises: displaying, on the display of the second client device, a request to automatically grant access to the second image data to search for a match of a further person of interest; receiving an automatic locate person command input from the user associated with the second client device; and in response to the automatic locate person command input, transmitting, from the second client device to the backend server, an automatic locate command signal, wherein the automatic locate command signal grants permission to access the second image data to search for a match of the further person of interest, each time a new share signal includes new image data that includes the further person of interest.

In a fourth aspect, a non-transitory machine-readable medium storing a client application for sharing recorded video from audio/video (A/V) recording and communication devices is provided, the client application comprising a set of instructions executable by a processor of a client device, which when executed configures the client device to: receive, from a backend server, a share signal including first image data captured by a camera of a first A/V recording and communication device, wherein the first image data includes a person of interest; display, on a display of the client device, the first image that includes the person of interest; receive, from the backend server, a second image data access request signal requesting permission to access second image data to search for a match of the person of interest, wherein the second image data is captured using a camera of a second A/V recording and communication device associated with the client device; display, on the display of the client device, a request to access the second image data to search for a match of the person of interest found in the first image data; receive a locate person command input from a user associated with the client device; in response to the locate person command input, transmit to the backend server, a locate person command signal; and receive, from the backend server, an alert signal, wherein the alert signal includes a notification that the person of interest was matched in the second image data.

In an embodiment of the fourth aspect, the alert signal includes the second image data of the matched person of interest.

In another embodiment of the fourth aspect, the alert signal includes a second image data share request signal requesting permission to share the second image data of the matched person of interest to a network of users.

In another embodiment of the fourth aspect, the client application, when executed by the processor of the client device, further configures the client device to: display, on the display of the client device, a request to share the second image data with the network of users; receive an append input from the user associated with the client device; and in response to the append input, transmit, to the backend server, an append signal, wherein the append signal includes a command to append the second image data of the matched person of interest onto the first image data of the person of interest and share the appended second and first image data with the network of users.

In another embodiment of the fourth aspect, the client application, when executed by the processor of the client device, further configures the client device to: display, on the display of the client device, a request to automatically grant access to the second image data to search for a match of a further person of interest; receive an automatic locate person command input from the user associated with the client device; and in response to the automatic locate person command input, transmit, to the backend server, an automatic locate command signal, wherein the automatic locate command signal grants permission to access the second image data to search for a match of the further person of interest, each time a new share signal includes new image data that includes the further person of interest.

BRIEF DESCRIPTION OF THE DRAWINGS

The various embodiments of the present apparatus, systems, and methods for locating a person of interest using shared video footage from audio/video (A/V) recording and communication devices now will be discussed in detail with an emphasis on highlighting the advantageous features.

These embodiments depict the novel and non-obvious apparatus, systems, and methods for locating a person of interest using shared video footage from A/V recording and communication devices shown in the accompanying drawings, which are for illustrative purposes only. These drawings include the following figures, in which like numerals indicate like parts.

DETAILED DESCRIPTION

Figure 1:
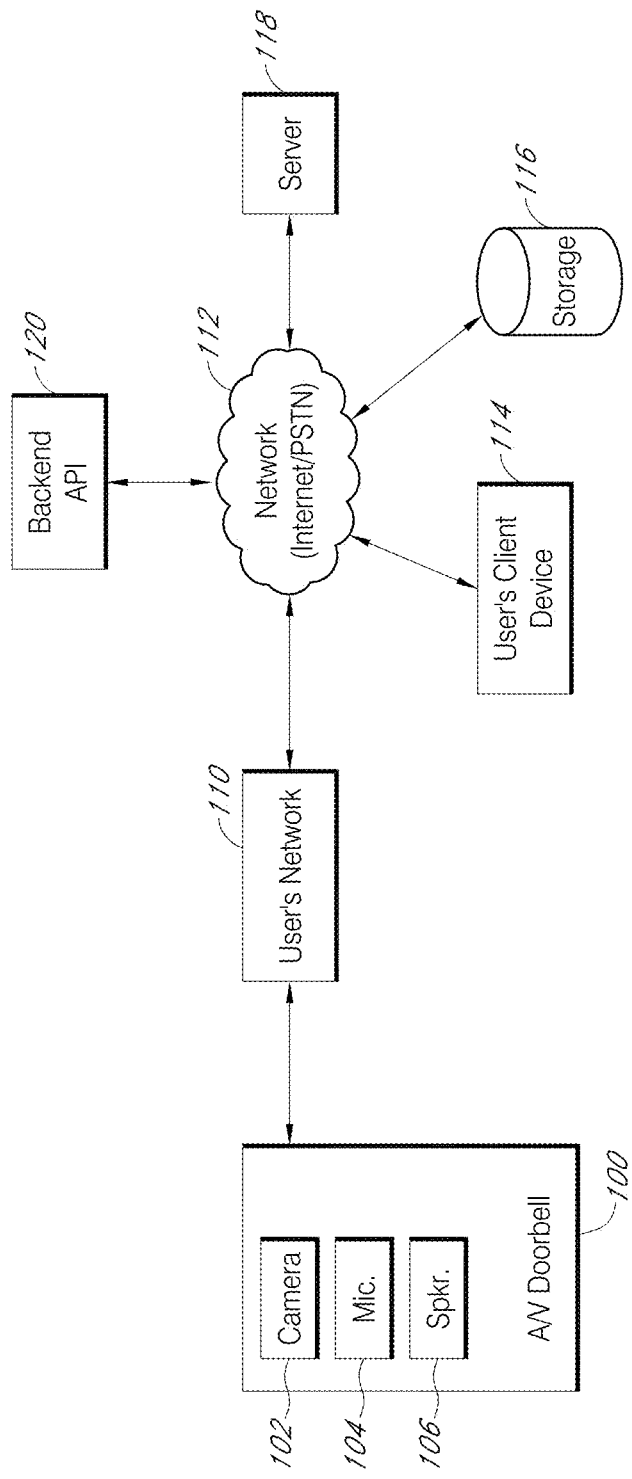
FIG. 1 is a functional block diagram illustrating a system for streaming and storing A/V content captured by an audio/video (A/V) recording and communication device according to the present embodiments.

The following detailed description describes the present embodiments with reference to the drawings. In the drawings, reference numbers label elements of the present embodiments. These reference numbers are reproduced below in connection with the discussion of the corresponding drawing features.

The embodiments of the present apparatus, systems, and methods for locating a person of interest using shared video footage from audio/video (A/V) recording and communication devices are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

With reference to FIG. 1, the present embodiments include an audio/video (A/V) recording and communication device, such as a doorbell 100. While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbells described herein, but without the front button and related components.

The A/V recording and communication doorbell 100 may be located near the entrance to a structure (not shown), such as a dwelling, a business, a storage facility, etc. The A/V recording and communication doorbell 100 includes a camera 102, a microphone 104, and a speaker 106. The camera 102 may comprise, for example, a high definition (HD) video camera, such as one capable of capturing video images at an image display resolution of 720p or better. While not shown, the A/V recording and communication doorbell 100 may also include other hardware and/or components, such as a housing, one or more motion sensors (and/or other types of sensors), a button, etc. The A/V recording and communication doorbell 100 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication doorbell 100 communicates with a user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication doorbell 100 may communicate with the user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication and/or computing device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication doorbell 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above-mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication doorbell 100, the A/V recording and communication doorbell 100 detects the visitor's presence and begins capturing video images within a field of view of the camera 102. The A/V recording and communication doorbell 100 may also capture audio through the microphone 104. The A/V recording and communication doorbell 100 may detect the visitor's presence using a motion sensor, and/or by detecting that the visitor has depressed the button on the A/V recording and communication doorbell 100.

In response to the detection of the visitor, the A/V recording and communication doorbell 100 sends an alert to the user's client device 114 (FIG. 1) via the user's network 110 and the network 112. The A/V recording and communication doorbell 100 also sends streaming video, and may also send streaming audio, to the user's client device 114. If the user answers the alert, two-way audio communication may then occur between the visitor and the user through the A/V recording and communication doorbell 100 and the user's client device 114. The user may view the visitor throughout the duration of the call, but the visitor cannot see the user (unless the A/V recording and communication doorbell 100 includes a display, which it may in some embodiments).

The video images captured by the camera 102 of the A/V recording and communication doorbell 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a backend API 120 including one or more components. As discussed in further detail below, a backend API (application programming interface) may comprise, for example, a server (e.g. a real server, or a virtual machine, or a machine running in a cloud infrastructure as a service), or multiple servers networked together, exposing at least one API to client(s) accessing it.

Figure 2:
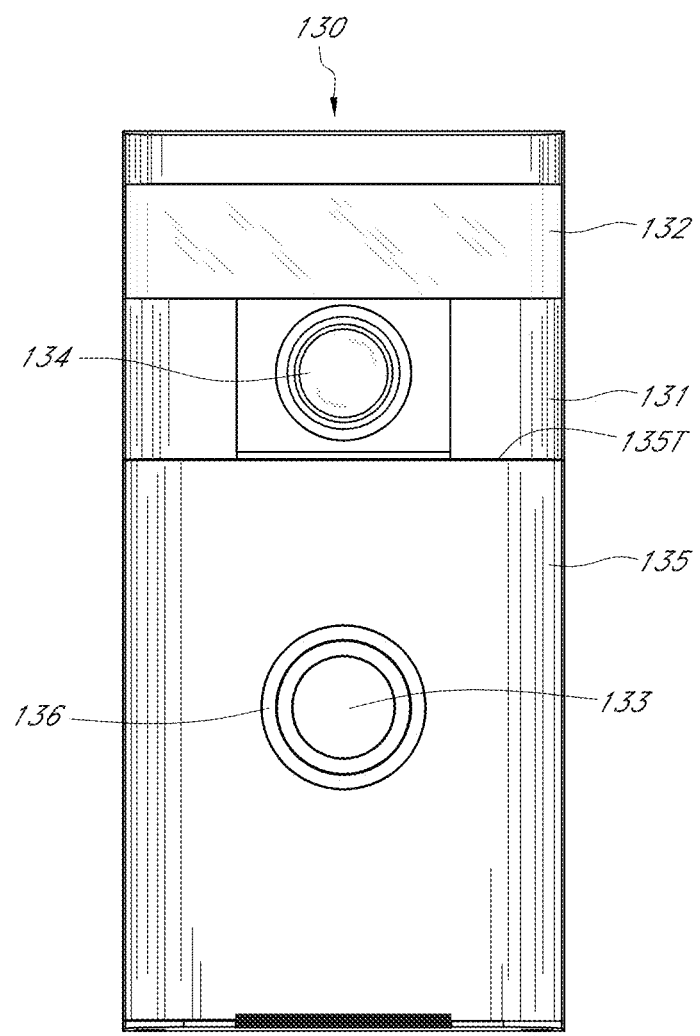
FIG. 2 is a front view of an A/V recording and communication doorbell according to an aspect of the present disclosure.
Figure 3:
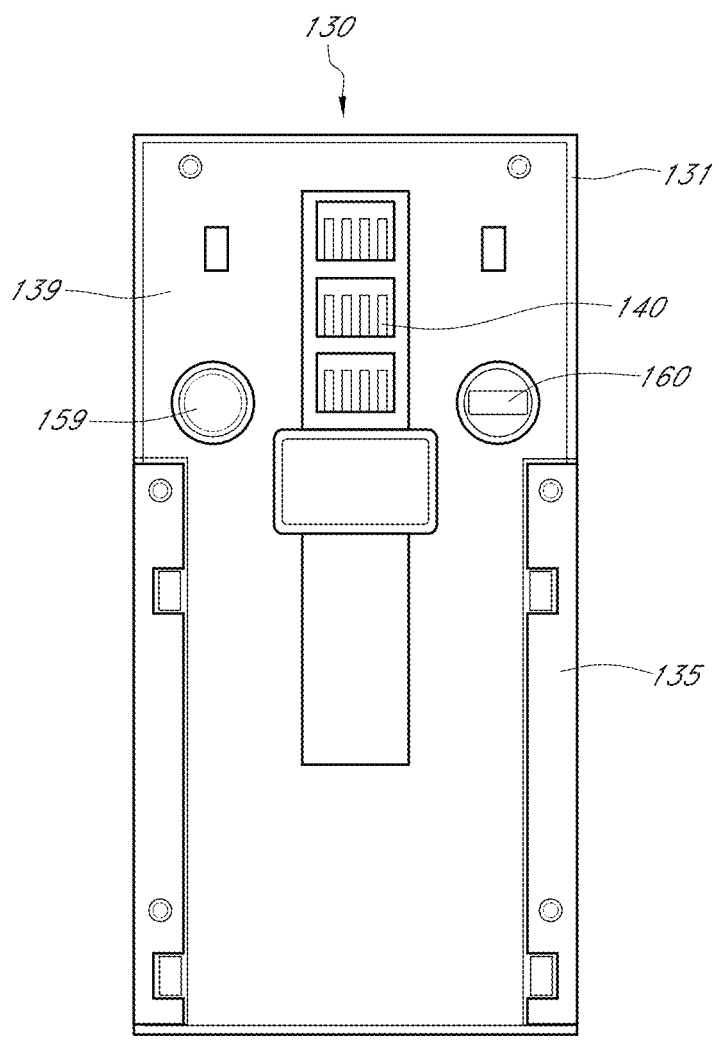
FIG. 3 is a rear view of the A/V recording and communication doorbell of FIG. 2.
Figure 4:
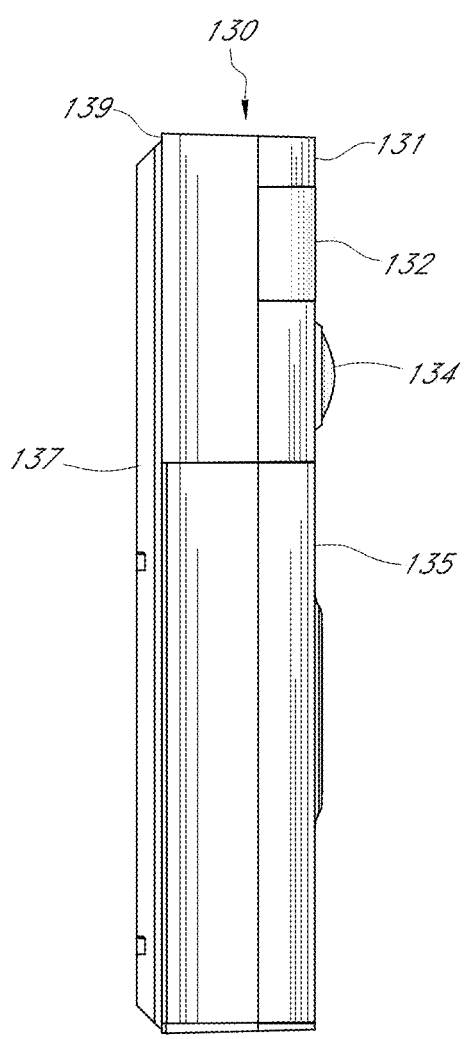
FIG. 4 is a left side view of the A/V recording and communication doorbell of FIG. 2 attached to a mounting bracket according to an aspect of the present disclosure.

FIGS. 2-4 illustrate an audio/video (A/V) communication doorbell 130 according to an aspect of present embodiments. FIG. 2 is a front view, FIG. 3 is a rear view, and FIG. 4 is a left side view of the doorbell 130 coupled with a mounting bracket 137. The doorbell 130 includes a faceplate 135 mounted to a back plate 139 (FIG. 3). With reference to FIG. 4, the faceplate 135 has a substantially flat profile. The faceplate 135 may comprise any suitable material, including, without limitation, metals, such as brushed aluminum or stainless steel, metal alloys, or plastics. The faceplate 135 protects the internal contents of the doorbell 130 and serves as an exterior front surface of the doorbell 130.

With reference to FIG. 2, the faceplate 135 includes a button 133 and a light pipe 136. The button 133 and the light pipe 136 may have various profiles that may or may not match the profile of the faceplate 135. The light pipe 136 may comprise any suitable material, including, without limitation, transparent plastic, that is capable of allowing light produced within the doorbell 130 to pass through. The light may be produced by one or more light-emitting components, such as light-emitting diodes (LED's), contained within the doorbell 130, as further described below. The button 133 may make contact with a button actuator (not shown) located within the doorbell 130 when the button 133 is pressed by a visitor. When pressed, the button 133 may trigger one or more functions of the doorbell 130, as further described below.

With reference to FIGS. 2 and 4, the doorbell 130 further includes an enclosure 131 that engages the faceplate 135. In the illustrated embodiment, the enclosure 131 abuts an upper edge 135T (FIG. 2) of the faceplate 135, but in alternative embodiments one or more gaps between the enclosure 131 and the faceplate 135 may facilitate the passage of sound and/or light through the doorbell 130. The enclosure 131 may comprise any suitable material, but in some embodiments the material of the enclosure 131 preferably permits infrared light to pass through from inside the doorbell 130 to the environment and vice versa. The doorbell 130 further includes a lens 132. In some embodiments, the lens may comprise a Fresnel lens, which may be patterned to deflect incoming light into one or more infrared sensors located within the doorbell 130. The doorbell 130 further includes a camera 134, which captures video data when activated, as described below.

FIG. 3 is a rear view of the doorbell 130, according to an aspect of the present embodiments. As illustrated, the enclosure 131 may extend from the front of the doorbell 130 around to the back thereof and may fit snugly around a lip of the back plate 139. The back plate 139 may comprise any suitable material, including, without limitation, metals, such as brushed aluminum or stainless steel, metal alloys, or plastics. The back plate 139 protects the internal contents of the doorbell 130 and serves as an exterior rear surface of the doorbell 130. The faceplate 135 may extend from the front of the doorbell 130 and at least partially wrap around the back plate 139, thereby allowing a coupled connection between the faceplate 135 and the back plate 139. The back plate 139 may have indentations in its structure to facilitate the coupling.

With further reference to FIG. 3, spring contacts 140 may provide power to the doorbell 130 when mated with other conductive contacts connected to a power source. The spring contacts 140 may comprise any suitable conductive material, including, without limitation, copper, and may be capable of deflecting when contacted by an inward force, for example the insertion of a mating element. The doorbell 130 further comprises a connector 160, such as a micro-USB or other connector, whereby power and/or data may be supplied to and from the components within the doorbell 130. A reset button 159 may be located on the back plate 139, and may make contact with a button actuator (not shown) located within the doorbell 130 when the reset button 159 is pressed. When the reset button 159 is pressed, it may trigger one or more functions, as described below.

FIG. 4 is a left side profile view of the doorbell 130 coupled to the mounting bracket 137, according to an aspect of the present embodiments. The mounting bracket 137 facilitates mounting the doorbell 130 to a surface, such as the exterior of a building, such as a home or office. As illustrated in FIG. 4, the faceplate 135 may extend from the bottom of the doorbell 130 up to just below the camera 134, and connect to the back plate 139 as described above. The lens 132 may extend and curl partially around the side of the doorbell 130. The enclosure 131 may extend and curl around the side and top of the doorbell 130, and may be coupled to the back plate 139 as described above. The camera 134 may protrude slightly through the enclosure 131, thereby giving it a wider field of view. The mounting bracket 137 may couple with the back plate 139 such that they contact each other at various points in a common plane of contact, thereby creating an assembly including the doorbell 130 and the mounting bracket 137. The couplings described in this paragraph, and elsewhere, may be secured by, for example and without limitation, screws, interference fittings, adhesives, or other fasteners. Interference fittings may refer to a type of connection where a material relies on pressure and/or gravity coupled with the material's physical strength to support a connection to a different element.

Figure 5:
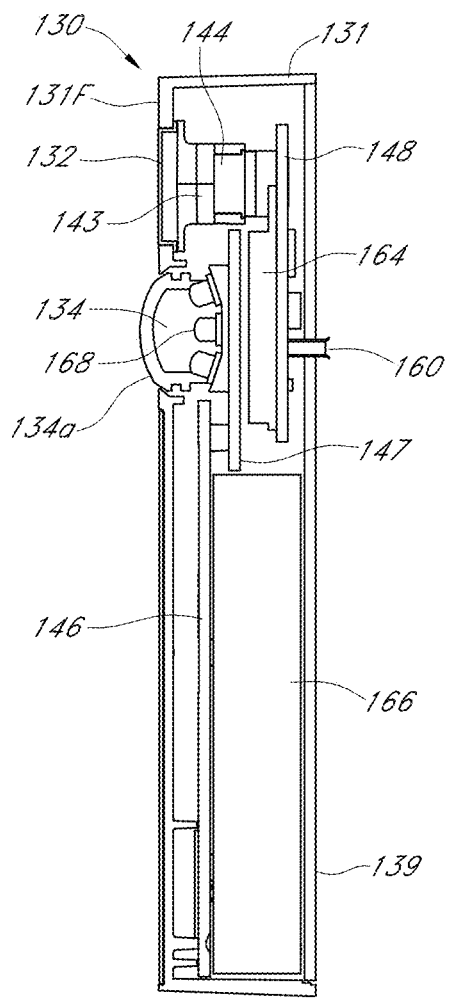
FIG. 5 is cross-sectional right side view of the A/V recording and communication doorbell of FIG. 2.

FIG. 5 is a right side cross-sectional view of the doorbell 130 without the mounting bracket 137. In the illustrated embodiment, the lens 132 is substantially coplanar with the front surface 131F of the enclosure 131. In alternative embodiments, the lens 132 may be recessed within the enclosure 131 or may protrude outward from the enclosure 131. The camera 134 is coupled to a camera printed circuit board (PCB) 147, and a lens 134a of the camera 134 protrudes through an opening in the enclosure 131. The camera lens 134a may be a lens capable of focusing light into the camera 134 so that clear images may be taken.

The camera PCB 147 may be secured within the doorbell with any suitable fasteners, such as screws, or interference connections, adhesives, etc. The camera PCB 147 comprises various components that enable the functionality of the camera 134 of the doorbell 130, as described below. Infrared light-emitting components, such as infrared LED's 168, are coupled to the camera PCB 147 and may be triggered to activate when a light sensor detects a low level of ambient light. When activated, the infrared LED's 168 may emit infrared light through the enclosure 131 and/or the camera 134 out into the ambient environment. The camera 134, which may be configured to detect infrared light, may then capture the light emitted by the infrared LED's 168 as it reflects off objects within the camera's 134 field of view, so that the doorbell 130 can clearly capture images at night (may be referred to as "night vision").

With continued reference to FIG. 5, the doorbell 130 further comprises a front PCB 146, which in the illustrated embodiment resides in a lower portion of the doorbell 130 adjacent a battery 166. The front PCB 146 may be secured within the doorbell 130 with any suitable fasteners, such as screws, or interference connections, adhesives, etc. The front PCB 146 comprises various components that enable the functionality of the audio and light components, as further described below. The battery 166 may provide power to the doorbell 130 components while receiving power from the spring contacts 140, thereby engaging in a trickle-charge method of power consumption and supply. Alternatively, the doorbell 130 may draw power directly from the spring contacts 140 while relying on the battery 166 only when the spring contacts 140 are not providing the power necessary for all functions.

With continued reference to FIG. 5, the doorbell 130 further comprises a power PCB 148, which in the illustrated embodiment resides behind the camera PCB 147. The power PCB 148 may be secured within the doorbell 130 with any suitable fasteners, such as screws, or interference connections, adhesives, etc. The power PCB 148 comprises various components that enable the functionality of the power and device-control components, as further described below.

With continued reference to FIG. 5, the doorbell 130 further comprises a communication module 164 coupled to the power PCB 148. The communication module 164 facilitates communication with client devices in one or more remote locations, as further described below. The connector 160 may protrude outward from the power PCB 148 and extend through a hole in the back plate 139. The doorbell 130 further comprises passive infrared (PIR) sensors 144, which are secured on or within a PIR sensor holder 143, and the assembly resides behind the lens 132. The PIR sensor holder 143 may be secured to the doorbell 130 with any suitable fasteners, such as screws, or interference connections, adhesives, etc. The PIR sensors 144 may be any type of sensor capable of detecting and communicating the presence of a heat source within their field of view. Further, alternative embodiments may comprise one or more motion sensors either in place of or in addition to the PIR sensors 144. The motion sensors may be configured to detect motion using any methodology, such as a methodology that does not rely on detecting the presence of a heat source within a field of view.

Figure 6:
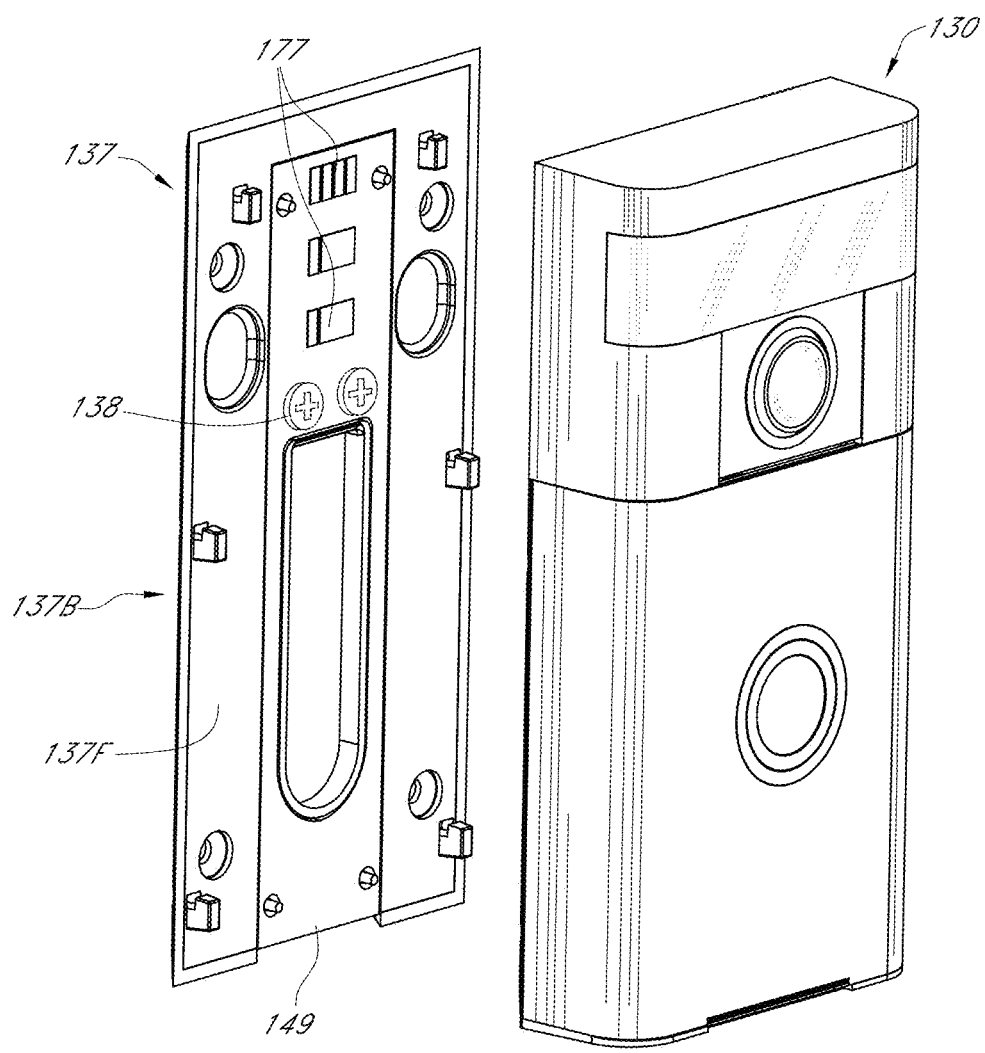
FIG. 6 is an exploded view of the A/V recording and communication doorbell and the mounting bracket of FIG. 4.

FIG. 6 is an exploded view of the doorbell 130 and the mounting bracket 137 according to an aspect of the present embodiments. The mounting bracket 137 is configured to be mounted to a mounting surface (not shown) of a structure, such as a home or an office. FIG. 6 shows the front side 137F of the mounting bracket 137. The mounting bracket 137 is configured to be mounted to the mounting surface such that the back side 137B thereof faces the mounting surface. In certain embodiments, the mounting bracket 137 may be mounted to surfaces of various composition, including, without limitation, wood, concrete, stucco, brick, vinyl siding, aluminum siding, etc., with any suitable fasteners, such as screws, or interference connections, adhesives, etc. The doorbell 130 may be coupled to the mounting bracket 137 with any suitable fasteners, such as screws, or interference connections, adhesives, etc.

With continued reference to FIG. 6, the illustrated embodiment of the mounting bracket 137 includes the terminal screws 138. The terminal screws 138 are configured to receive electrical wires adjacent the mounting surface of the structure upon which the mounting bracket 137 is mounted, so that the doorbell 130 may receive electrical power from the structure's electrical system. The terminal screws 138 are electrically connected to electrical contacts 177 of the mounting bracket. If power is supplied to the terminal screws 138, then the electrical contacts 177 also receive power through the terminal screws 138. The electrical contacts 177 may comprise any suitable conductive material, including, without limitation, copper, and may protrude slightly from the face of the mounting bracket 137 so that they may mate with the spring contacts 140 located on the back plate 139.

Figure 7:
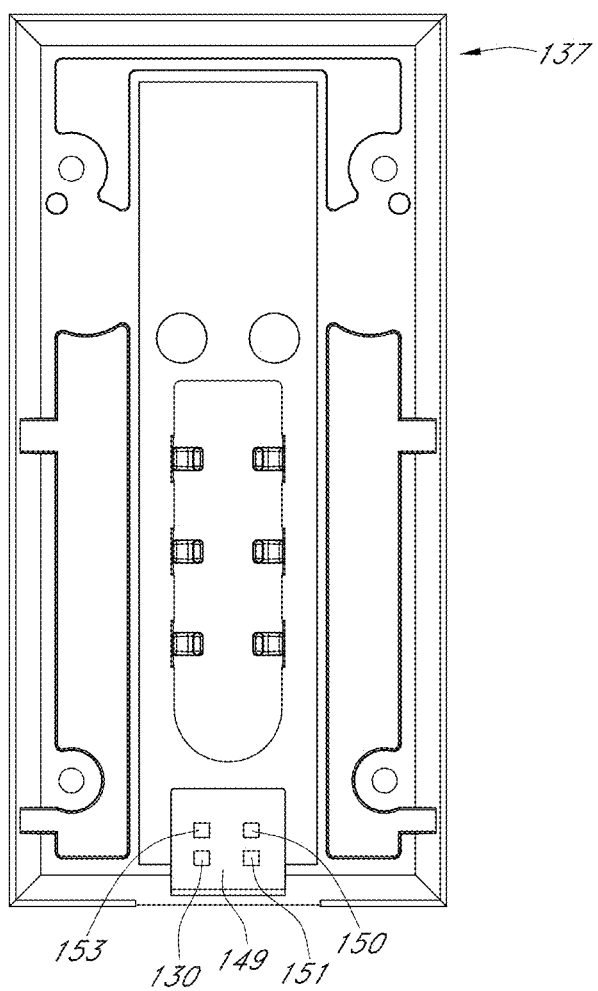
FIG. 7 is a rear view of the mounting bracket of FIG. 4.

With reference to FIGS. 6 and 7 (which is a rear view of the mounting bracket 137), the mounting bracket 137 further comprises a bracket PCB 149. With reference to FIG. 7, the bracket PCB 149 is situated outside the doorbell 130, and is therefore configured for various sensors that measure ambient conditions, such as an accelerometer 150, a barometer 151, a humidity sensor 152, and a temperature sensor 153. The functions of these components are discussed in more detail below. The bracket PCB 149 may be secured to the mounting bracket 137 with any suitable fasteners, such as screws, or interference connections, adhesives, etc.

Figure 8A:
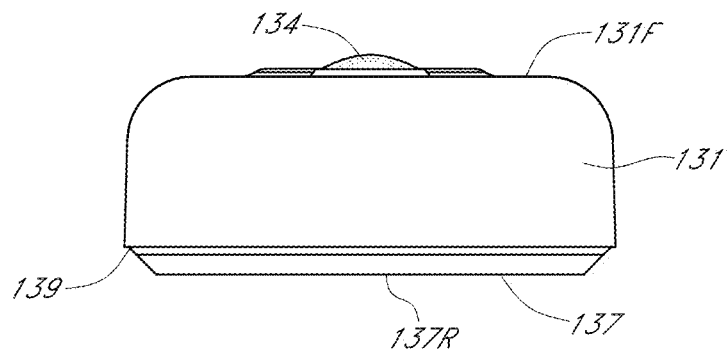
FIGS. 8A and 8B are top and bottom views, respectively, of the A/V recording and communication doorbell and the mounting bracket of FIG. 4.
Figure 8B:
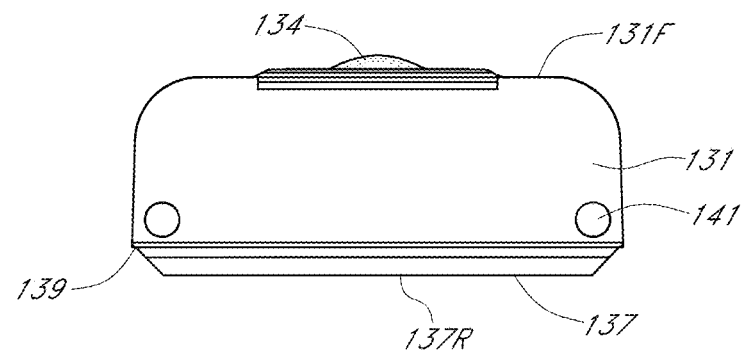

FIGS. 8A and 8B are top and bottom views, respectively, of the doorbell 130. As described above, the enclosure 131 may extend from the front face 131F of the doorbell 130 to the back, where it contacts and snugly surrounds the back plate 139. The camera 134 may protrude slightly beyond the front face 131F of the enclosure 131, thereby giving the camera 134 a wider field of view. The mounting bracket 137 may include a substantially flat rear surface 137R, such that the doorbell 130 and the mounting bracket 137 assembly may sit flush against the surface to which they are mounted. With reference to FIG. 8B, the lower end of the enclosure 131 may include security screw apertures 141 configured to receive screws or other fasteners.

Figure 9A:
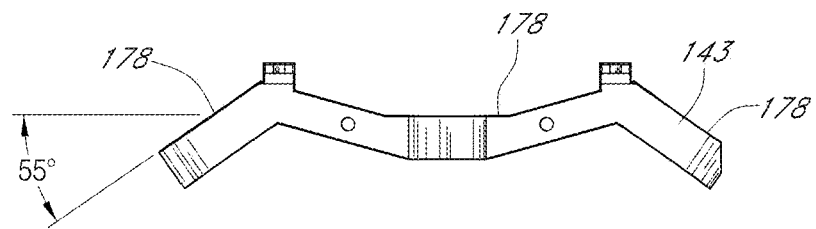
FIGS. 9A and 9B are top and front views, respectively, of a passive infrared sensor holder of the A/V recording and communication doorbell of FIG. 2.

FIG. 9A is a top view of the PIR sensor holder 143. The PIR sensor holder 143 may comprise any suitable material, including, without limitation, metals, metal alloys, or plastics. The PIR sensor holder 143 is configured to mount the PIR sensors 144 behind the lens 132 such that the PIR sensors 144 face out through the lens 132 at varying angles, thereby creating a wide field of view for the PIR sensors 144, and dividing the field of view into zones, as further described below. With further reference to FIG. 9A, the PIR sensor holder 143 includes one or more faces 178 within or on which the PIR sensors 144 may be mounted. In the illustrated embodiment, the PIR sensor holder 143 includes three faces 178, with each of two outer faces 178 angled at 55° with respect to a center one of the faces 178. In alternative embodiments, the angle formed by adjacent ones of the faces 178 may be increased or decreased as desired to alter the field of view of the PIR sensors 144.

Figure 9B:
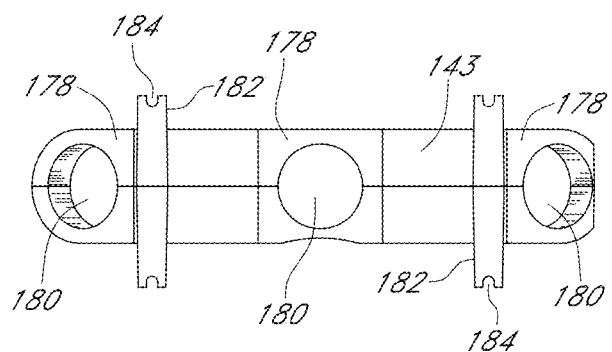

FIG. 9B is a front view of the PIR sensor holder 143. In the illustrated embodiment, each of the faces 178 includes a through hole 180 in which the PIR sensors 144 may be mounted. First and second brackets 182, spaced from one another, extend transversely across the PIR sensor holder 143. Each of the brackets 182 includes notches 184 at either end. The brackets 182 may be used to secure the PIR sensor holder 143 within the doorbell 130. In alternative embodiments, the through holes 180 in the faces 178 may be omitted. For example, the PIR sensors 144 may be mounted directly to the faces 178 without the through holes 180. Generally, the faces 178 may be comprise any structure configured to locate and secure the PIR sensors 144 in place.

Figure 10A:
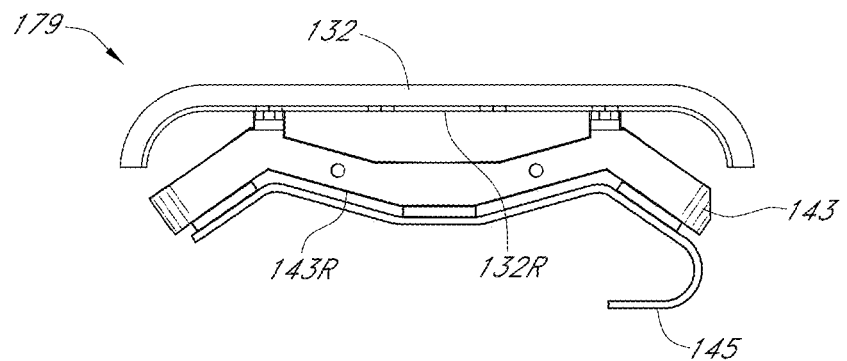
FIGS. 10A and 10B are top and front views, respectively, of a passive infrared sensor holder assembly of the A/V recording and communication doorbell of FIG. 2.
Figure 10B:
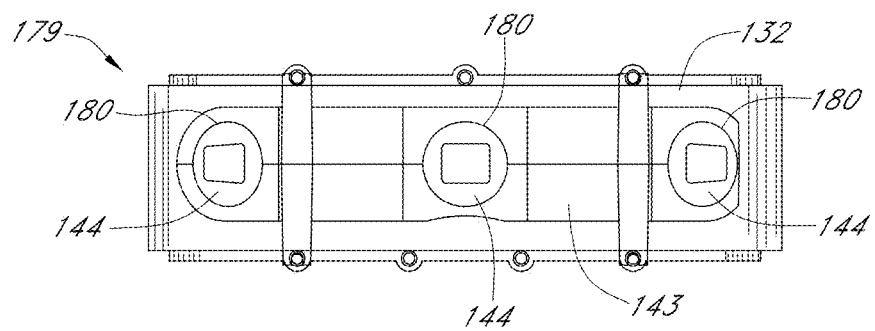

FIGS. 10A and 10B are top and front views, respectively, of a PIR sensor assembly 179, including the PIR sensor holder 143, the lens 132, and a flexible power circuit 145. The PIR sensor holder 143 may be secured to a rear face 132R of the lens 132, as shown, with the brackets 182 abutting the rear face 132R of the lens 132. The flexible power circuit 145, which may be any material or component capable of delivering power and/or data to and from the PIR sensors 144, is secured to a rear face 143R of the PIR sensor holder 143, and may be contoured to match the angular shape of the PIR sensor holder 143. The flexible power circuit 145 may connect to, draw power from, and/or transmit data to and/or from, the power PCB 148 (FIG. 5).

Figure 11:
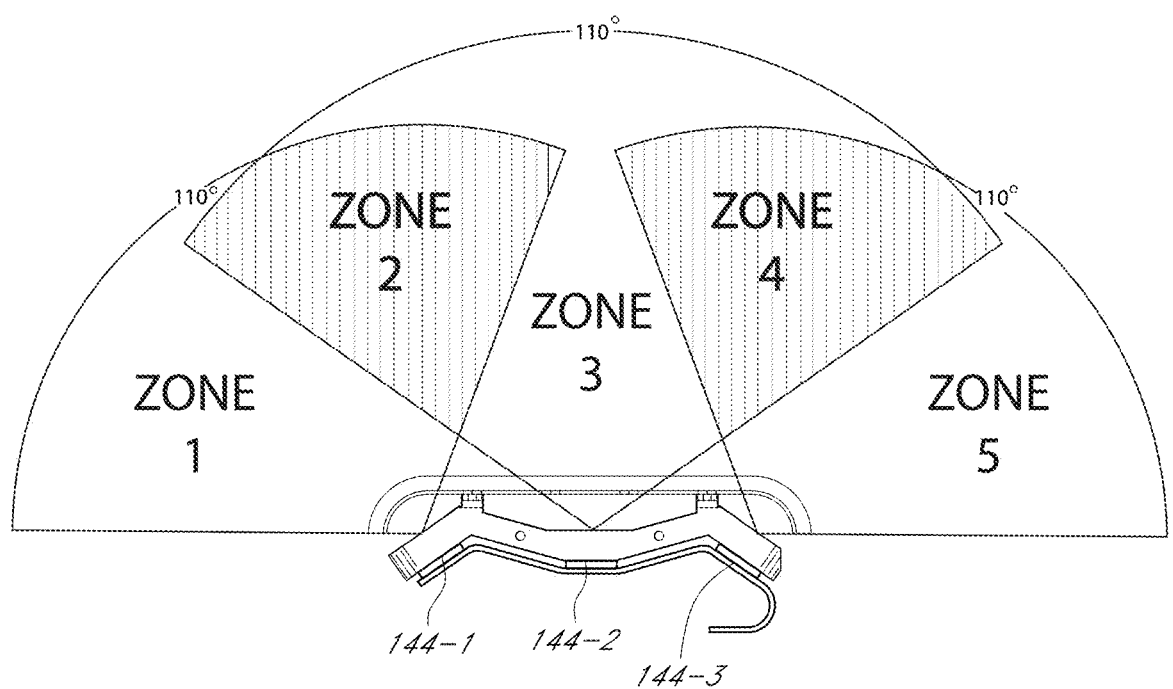
FIG. 11 is a top view of the passive infrared sensor assembly of FIG. 10A and a field of view thereof according to an aspect of the present disclosure.

FIG. 11 is a top view of the PIR sensor assembly 179 illustrating the fields of view of the PIR sensors 144. Each PIR sensor 144 includes a field of view, referred to as a "zone," that traces an angle extending outward from the respective PIR sensor 144. Zone 1 is the area that is visible only to Passive Infrared Sensor 144-1. Zone 2 is the area that is visible only to the PIR sensors 144-1 and 144-2. Zone 3 is the area that is visible only to Passive Infrared Sensor 144-2. Zone 4 is the area that is visible only to the PIR sensors 144-2 and 144-3. Zone 5 is the area that is visible only to Passive Infrared Sensor 144-3. The doorbell 130 may be capable of determining the direction that an object is moving based upon which zones are triggered in a time sequence. In the illustrated embodiment, each zone extends across an angle of 110°. In alternative embodiments, each zone may extend across a different angle, such as one greater than or less than 110°.

Figure 12:
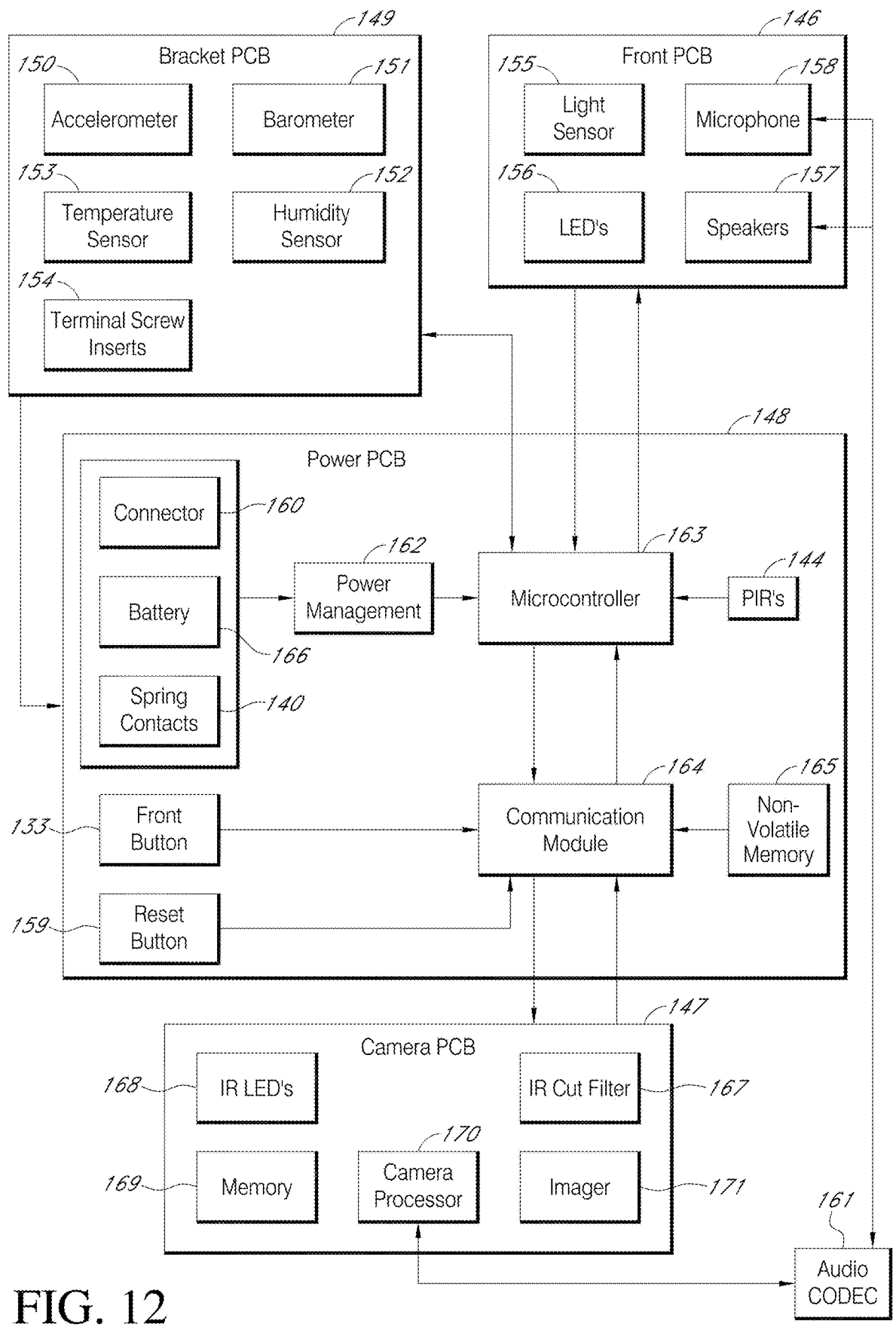
FIG. 12 is a functional block diagram of the components of the A/V recording and communication doorbell of FIG. 2.

FIG. 12 is a functional block diagram of the components within or in communication with the doorbell 130, according to an aspect of the present embodiments. As described above, the bracket PCB 149 may comprise an accelerometer 150, a barometer 151, a humidity sensor 152, and a temperature sensor 153. The accelerometer 150 may be one or more sensors capable of sensing motion and/or acceleration. The barometer 151 may be one or more sensors capable of determining the atmospheric pressure of the surrounding environment in which the bracket PCB 149 may be located. The humidity sensor 152 may be one or more sensors capable of determining the amount of moisture present in the atmospheric environment in which the bracket PCB 149 may be located. The temperature sensor 153 may be one or more sensors capable of determining the temperature of the ambient environment in which the bracket PCB 149 may be located. As described above, the bracket PCB 149 may be located outside the housing of the doorbell 130 so as to reduce interference from heat, pressure, moisture, and/or other stimuli generated by the internal components of the doorbell 130.

With further reference to FIG. 12, the bracket PCB 149 may further comprise terminal screw inserts 154, which may be configured to receive the terminal screws 138 and transmit power to the electrical contacts 177 on the mounting bracket 137 (FIG. 6). The bracket PCB 149 may be electrically and/or mechanically coupled to the power PCB 148 through the terminal screws 138, the terminal screw inserts 154, the spring contacts 140, and the electrical contacts 177. The terminal screws 138 may receive electrical wires located at the surface to which the doorbell 130 is mounted, such as the wall of a building, so that the doorbell can receive electrical power from the building's electrical system. Upon the terminal screws 138 being secured within the terminal screw inserts 154, power may be transferred to the bracket PCB 149, and to all of the components associated therewith, including the electrical contacts 177. The electrical contacts 177 may transfer electrical power to the power PCB 148 by mating with the spring contacts 140.

With further reference to FIG. 12, the front PCB 146 may comprise a light sensor 155, one or more light-emitting components, such as LED's 156, one or more speakers 157, and a microphone 158. The light sensor 155 may be one or more sensors capable of detecting the level of ambient light of the surrounding environment in which the doorbell 130 may be located. LED's 156 may be one or more light-emitting diodes capable of producing visible light when supplied with power. The speakers 157 may be any electro-mechanical device capable of producing sound in response to an electrical signal input. The microphone 158 may be an acoustic-to-electric transducer or sensor capable of converting sound waves into an electrical signal. When activated, the LED's 156 may illuminate the light pipe 136 (FIG. 2). The front PCB 146 and all components thereof may be electrically coupled to the power PCB 148, thereby allowing data and/or power to be transferred to and from the power PCB 148 and the front PCB 146.

The speakers 157 and the microphone 158 may be coupled to the camera processor 170 through an audio CODEC 161. For example, the transfer of digital audio from the user's client device 114 and the speakers 157 and the microphone 158 may be compressed and decompressed using the audio CODEC 161, coupled to the camera processor 170. Once compressed by audio CODEC 161, digital audio data may be sent through the communication module 164 to the network 112, routed by one or more servers 118, and delivered to the user's client device 114. When the user speaks, after being transferred through the network 112, digital audio data is decompressed by audio CODEC 161 and emitted to the visitor via the speakers 157.

With further reference to FIG. 12, the power PCB 148 may comprise a power management module 162, a microcontroller 163, the communication module 164, and power PCB non-volatile memory 165. In certain embodiments, the power management module 162 may comprise an integrated circuit capable of arbitrating between multiple voltage rails, thereby selecting the source of power for the doorbell 130. The battery 166, the spring contacts 140, and/or the connector 160 may each provide power to the power management module 162. The power management module 162 may have separate power rails dedicated to the battery 166, the spring contacts 140, and the connector 160. In one aspect of the present disclosure, the power management module 162 may continuously draw power from the battery 166 to power the doorbell 130, while at the same time routing power from the spring contacts 140 and/or the connector 160 to the battery 166, thereby allowing the battery 166 to maintain a substantially constant level of charge. Alternatively, the power management module 162 may continuously draw power from the spring contacts 140 and/or the connector 160 to power the doorbell 130, while only drawing from the battery 166 when the power from the spring contacts 140 and/or the connector 160 is low or insufficient. The power management module 162 may also serve as a conduit for data between the connector 160 and the microcontroller 163.

With further reference to FIG. 12, in certain embodiments the microcontroller 163 may comprise an integrated circuit including a processor core, memory, and programmable input/output peripherals. The microcontroller 163 may receive input signals, such as data and/or power, from the PIR sensors 144, the bracket PCB 149, the power management module 162, the light sensor 155, the microphone 158, and/or the communication module 164, and may perform various functions as further described below. When the microcontroller 163 is triggered by the PIR sensors 144, the microcontroller 163 may be triggered to perform one or more functions, such as those described below with reference to FIG. 14. When the light sensor 155 detects a low level of ambient light, the light sensor 155 may trigger the microcontroller 163 to enable "night vision," as further described below. The microcontroller 163 may also act as a conduit for data communicated between various components and the communication module 164.

With further reference to FIG. 12, the communication module 164 may comprise an integrated circuit including a processor core, memory, and programmable input/output peripherals. The communication module 164 may also be configured to transmit data wirelessly to a remote network device, and may include one or more transceivers (not shown). The wireless communication may comprise one or more wireless networks, such as, without limitation, Wi-Fi, cellular, Bluetooth, and/or satellite networks. The communication module 164 may receive inputs, such as power and/or data, from the camera PCB 147, the microcontroller 163, the button 133, the reset button 159, and/or the power PCB non-volatile memory 165. When the button 133 is pressed, the communication module 164 may be triggered to perform one or more functions, such as those described below with reference to FIG. 13. When the reset button 159 is pressed, the communication module 164 may be triggered to erase any data stored at the power PCB non-volatile memory 165 and/or at the camera PCB memory 169. The communication module 164 may also act as a conduit for data communicated between various components and the microcontroller 163. The power PCB non-volatile memory 165 may comprise flash memory configured to store and/or transmit data. For example, in certain embodiments the power PCB non-volatile memory 165 may comprise serial peripheral interface (SPI) flash memory.

With further reference to FIG. 12, the camera PCB 147 may comprise components that facilitate the operation of the camera 134. For example, an imager 171 may comprise a video recording sensor and/or a camera chip. In one aspect of the present disclosure, the imager 171 may comprise a complementary metal-oxide semiconductor (CMOS) array, and may be capable of recording high definition (720p or better) video files. A camera processor 170 may comprise an encoding and compression chip. In some embodiments, the camera processor 170 may comprise a bridge processor. The camera processor 170 may process video recorded by the imager 171 and audio recorded by the microphone 158, and may transform this data into a form suitable for wireless transfer by the communication module 164 to a network. The camera PCB memory 169 may comprise volatile memory that may be used when data is being buffered or encoded by the camera processor 170. For example, in certain embodiments the camera PCB memory 169 may comprise synchronous dynamic random access memory (SD RAM). IR LED's 168 may comprise light-emitting diodes capable of radiating infrared light. IR cut filter 167 may comprise a system that, when triggered, configures the imager 171 to see primarily infrared light as opposed to visible light. When the light sensor 155 detects a low level of ambient light (which may comprise a level that impedes the performance of the imager 171 in the visible spectrum), the IR LED's 168 may shine infrared light through the doorbell 130 enclosure out to the environment, and the IR cut filter 167 may enable the imager 171 to see this infrared light as it is reflected or refracted off of objects within the field of view of the doorbell. This process may provide the doorbell 130 with the "night vision" function mentioned above.

Figure 13:
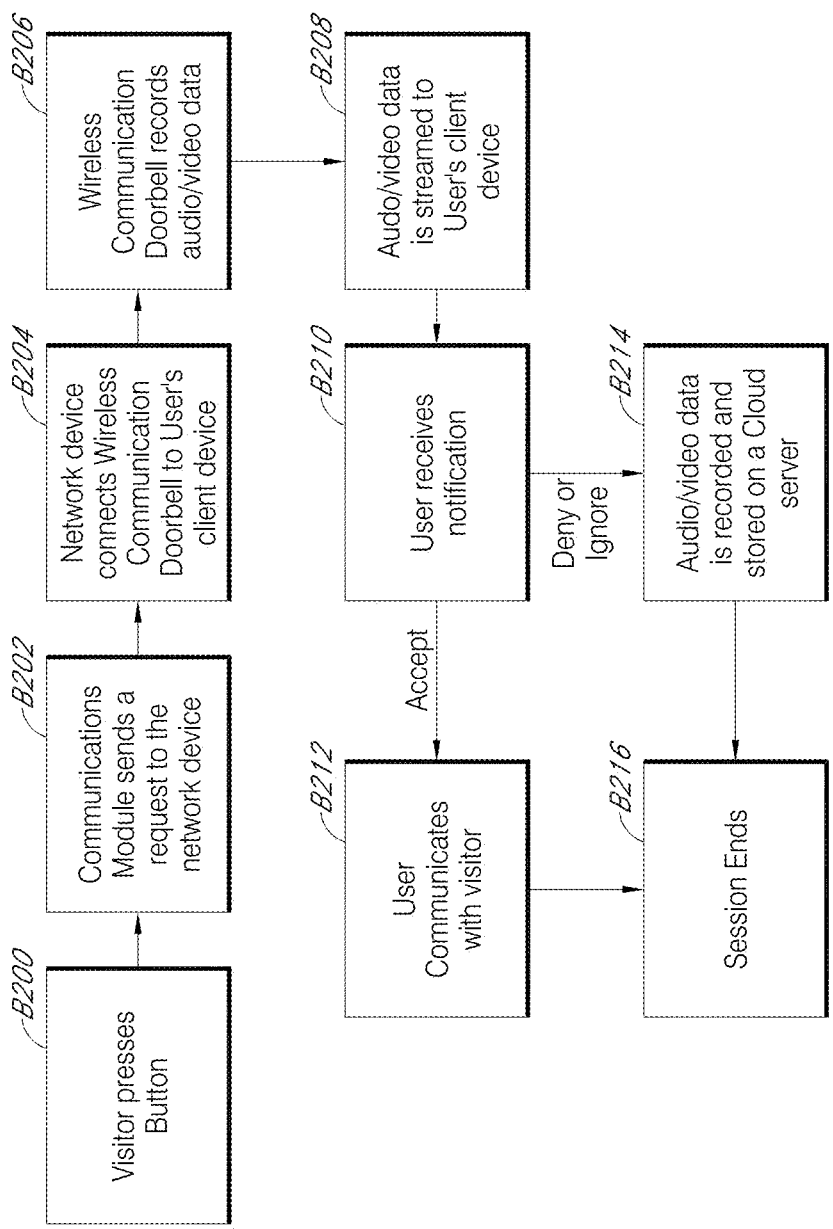
FIG. 13 is a flowchart illustrating a process for a A/V recording and communication doorbell according to an aspect of the present disclosure.

FIG. 13 is a flowchart illustrating one embodiment of a process according to an aspect of the present disclosure. At block B200, a visitor presses the button 133 on the doorbell 130. At block B202, the communication module 164 sends a request to a network device. Once the network device receives the request, at block B204 the network device may connect the doorbell 130 to the user's client device 114 through the user's network 110 and the network 112. In block B206, the doorbell 130 may record available audio and/or video data using the camera 134, the microphone 158, and/or any other sensor available. At block B208, the audio and/or video data is transmitted to the user's client device 114. At block B210, the user may receive a notification on his or her client device 114 prompting him or her to either accept or deny. If the user denies the notification, then the process advances to block B214, where the audio and/or video data is recorded and stored at a cloud server. The session then ends at block B216 and the connection between the doorbell 130 and the user's client device 114 is terminated. If, however, the user elects to accept the notification, then at block B212 the user communicates with the visitor through the user's client device 114 while being provided audio and/or video data captured by the camera 134, the microphone 158, and/or other sensors. At the end of the call, the user may terminate the connection between the user's client device 114 and the doorbell 130 and the session ends at block B216. In some embodiments, the audio and/or video data may be recorded and stored at a cloud server even if the user accepts the notification and communicates with the visitor through the user's client device 114.

Figure 14:
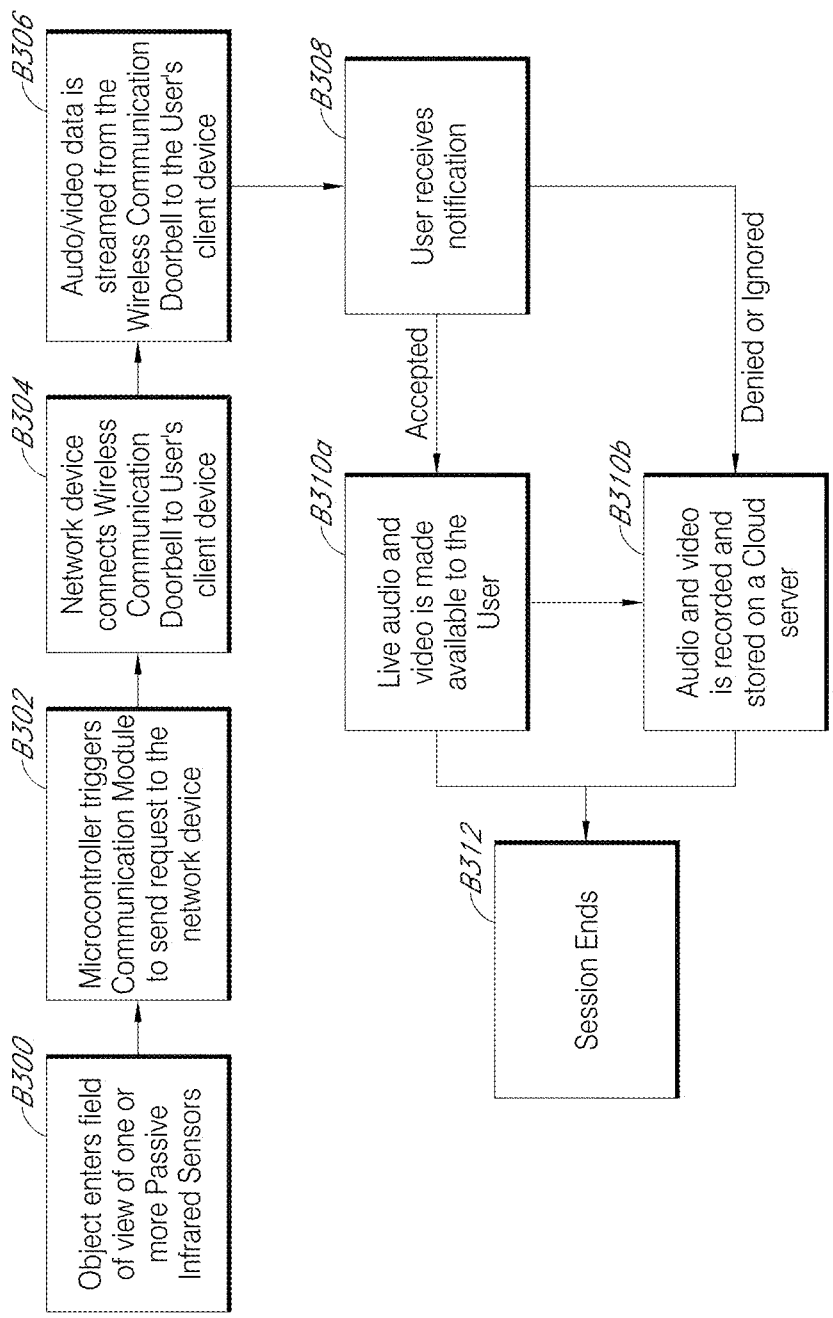
FIG. 14 is a flowchart illustrating another process for a A/V recording and communication doorbell according to an aspect of the present disclosure.

FIG. 14 is a flowchart illustrating another embodiment of a process according to an aspect of the present disclosure. At block B300, an object may move into the field of view of one or more of the PIR sensors 144. At block B302, the PIR sensors 144 may trigger the microcontroller 163, which may then trigger the communication module 164 to send a request to a network device. At block B304, the network device may connect the doorbell 130 to the user's client device 114 through the user's network 110 and the network 112. At block B306, the doorbell 130 may record available audio and/or video data using the camera 134, the microphone 158, and/or any other available sensor, and stream the data to the user's client device 114. At block B308, the user may receive a notification prompting the user to either accept or deny the notification. If the notification is accepted, then at block B310a the live audio/video data may be displayed on the user's client device 114, thereby allowing the user surveillance from the perspective of the doorbell 130. When the user is satisfied with this function, the user may sever the connection at block B312, whereby the session ends. If, however, at block B308 the user denies the notification, or ignores the notification and a specified time interval elapses, then the connection between the doorbell 130 and the user's client device 114 is terminated and the audio/video data is recorded and stored at a cloud server at block B310b, such that the user may view the audio/video data later at their convenience. The doorbell 130 may be configured to record for a specified period of time in the event the notification in block B308 is denied or ignored. If such a time period is set, the doorbell 130 may record data for that period of time before ceasing operation at block B312 thereby ending the session.

Figure 15:
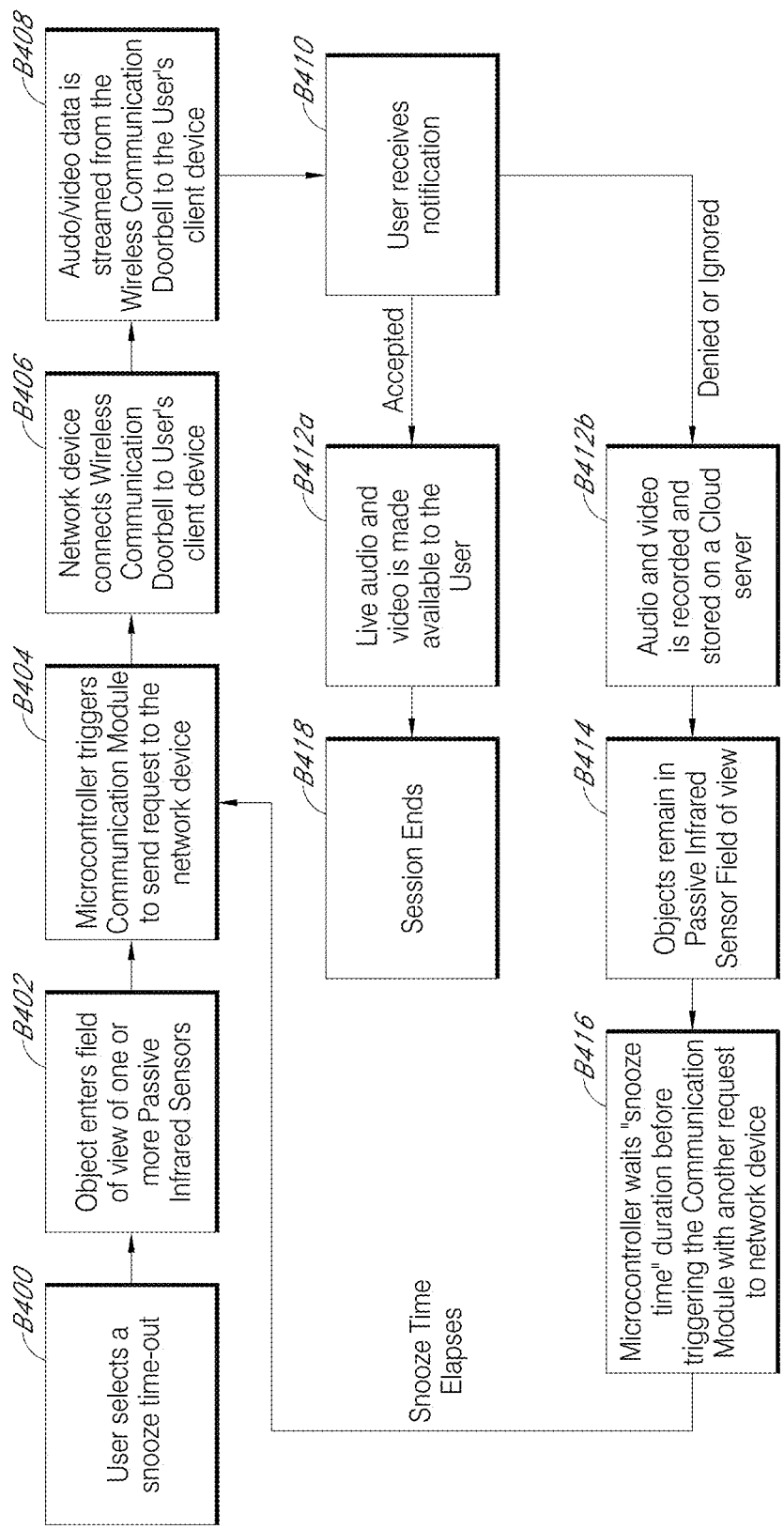
FIG. 15 is a flowchart illustrating another process for a A/V recording and communication doorbell according to an aspect of the present disclosure.

FIG. 15 is a flowchart illustrating another embodiment of a process according to an aspect of the present disclosure. At block B400, the user may select a "snooze time-out," which is a time period during which the doorbell 130 may deactivate or otherwise not respond to stimuli (such as light, sound, or heat signatures) after an operation is performed, e.g. a notification is either accepted or denied/ignored. For example, the user may set a snooze time-out of 15 minutes. At block B402, an object moves into the field of view of one or more of the PIR sensors 144. At block B404, the microcontroller 163 may trigger the communication module 164 to send a request to a network device. In block B406, the network device may connect the doorbell 130 to the user's client device 114 through the user's network 110 and the network 112. At block B408, audio/video data captured by the doorbell 130 may be streamed to the user's client device 114. At block B410, the user may receive a notification prompting the user to either accept or deny/ignore the request. If the request is denied or ignored, then at block B412b audio/video data may be recorded and stored at a cloud server. After the doorbell 130 finishes recording, the objects may remain in the PIR sensor 144 field of view at block B414. In block B416, the microcontroller 163 waits for the "snooze time" to elapse, e.g. 15 minutes, before triggering the communication module 164 to submit another request to the network device. After the snooze time, e.g. 15 minutes, elapses, the process moves back to block B404 and progresses as described above. The cycle may continue like this until the user accepts the notification request at block B410. The process then moves to block B412a, where live audio and/or video data is displayed on the user's client device 114, thereby allowing the user surveillance from the perspective of the doorbell 130. At the user's request, the connection may be severed and the session ends at block B418. At this point the user may elect for the process to revert back to block B416, whereby there may be no further response until the snooze time, e.g. 15 minutes, has elapsed from the end of the previous session, or the user may elect for the process to return to block B402 and receive a notification the next time an object is perceived by one or more of the PIR sensors 144.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbell 130, but without the front button 133, the button actuator, and/or the light pipe 136. An example A/V recording and communication security camera may further omit other components, such as, for example, the bracket PCB 149 and its components.

As described above, one aspect of the present embodiments includes the realization that users of audio/video (A/V) recording and communication devices may from time to time desire to share video footage recorded by their devices. For example, when an A/V recording and communication device records video footage of suspicious activity, or even criminal activity, a user viewing the footage may desire to alert his or her neighbors to the possible danger posed by the person(s) involved in the suspicious or criminal activity. It would be advantageous, then, to enhance the functionality of A/V recording and communication devices by facilitating easy sharing of video footage recorded by such devices with one's neighbors. In another example, an A/V recording and communication device may record video footage of activity that may be of interest to the user's friends and family (e.g., images of children playing in the yard). It would be advantageous, then, to enhance the functionality of A/V recording and communication devices by facilitating easy sharing of video footage recorded by such devices with one's friends and family. The present embodiments, as described in detail below, provide these, and other, enhancements. In particular, the present embodiments enable video footage captured by A/V recording and communication devices to be readily uploaded to the cloud and shared with anyone of the user's choosing, including neighbors, friends, and family.

Figure 16:
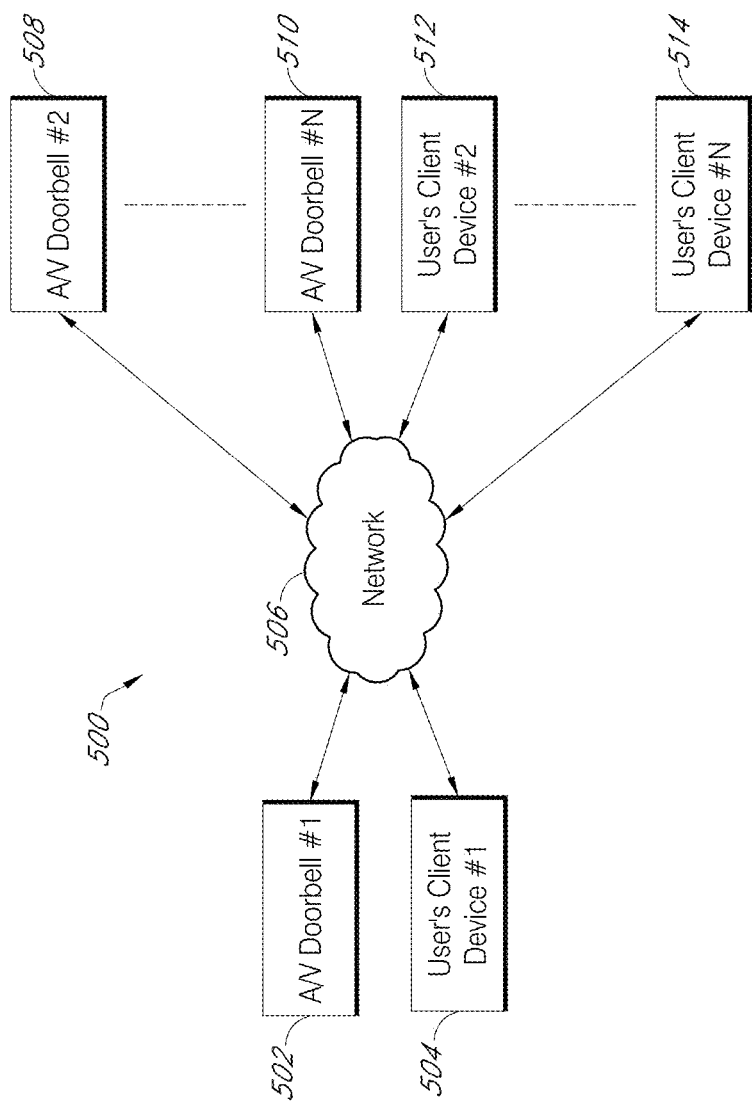
FIG. 16 is a functional block diagram illustrating a system for sharing video footage from audio/video recording and communication devices according to the present embodiments.

FIG. 16 illustrates a system 500 for sharing video footage from A/V recording and communication devices according to the present embodiments. The illustrated system 500 includes a first A/V recording and communication doorbell 502 (labeled "A/V Doorbell #1"). The first A/V doorbell 502 may have, for example, similar components and/or functionality as the doorbell 130 described herein. Alternatively, the first A/V doorbell 502 may have different components and/or functionality as the doorbell 130, but may nevertheless be capable of recording video footage and/or audio and wirelessly transmitting the recorded video footage and/or audio. In certain embodiments, the first A/V doorbell 502 may not be a doorbell at all, but may be, for example, an A/V recording and communication security camera.

With further reference to FIG. 16, the system 500 further includes a first client device 504 (labeled "Client Device #1") associated with the first A/V doorbell 502. The first client device 504 and the first A/V doorbell 502 may be owned by and/or controlled by the same user. The first client device 504 may have, for example, similar components and/or functionality as the user's client device 114 described herein, and may comprise, for example, a mobile telephone (may also be referred to as a cellular telephone), such as a smartphone, a personal digital assistant (PDA), or another communication and/or computing device. The system 500 further includes a network 506. The network 506, which may comprise, for example, the Internet and/or a public switched telephone network (PSTN), includes a plurality of network devices, such as one or more servers, routers, switches, storage devices, etc. (not shown). The system 500 further includes a plurality of other A/V doorbells 508, 510 (labeled "A/V Doorbell #2" through "A/V Doorbell # N") and a plurality of other client devices 512, 514 (labeled "Client Device #2" through "Client Device # N"). The other client devices 512, 514 are each associated with a corresponding one of the other A/V doorbells 508, 510. The other A/V doorbells 508, 510 may have, for example, similar components and/or functionality as the first A/V doorbell 502, and the other client devices 512, 514 may have, for example, similar components and/or functionality as the first client device 504.

In the system 500 of FIG. 16, any of the A/V doorbells may record video footage from an area within a field of view of the respective doorbell. The owner (or a user) of the doorbell that has recorded video footage may share the video footage with one or more other owners/users of the other A/V doorbells. The determination of which users will receive a notification of the shared video footage may be based on the relative locations of the A/V doorbells associated with the different users. More particularly, a given user (USER X) may receive a notification of the shared video footage if the shared video footage was recorded by one of the A/V doorbells that is located within a predetermined distance of USER X's own A/V doorbell. Further, in certain embodiments the predetermined distance may be configurable by USER X. Example processes for such sharing of recorded video footage are described below with reference to FIGS. 17-19.

Figure 17:
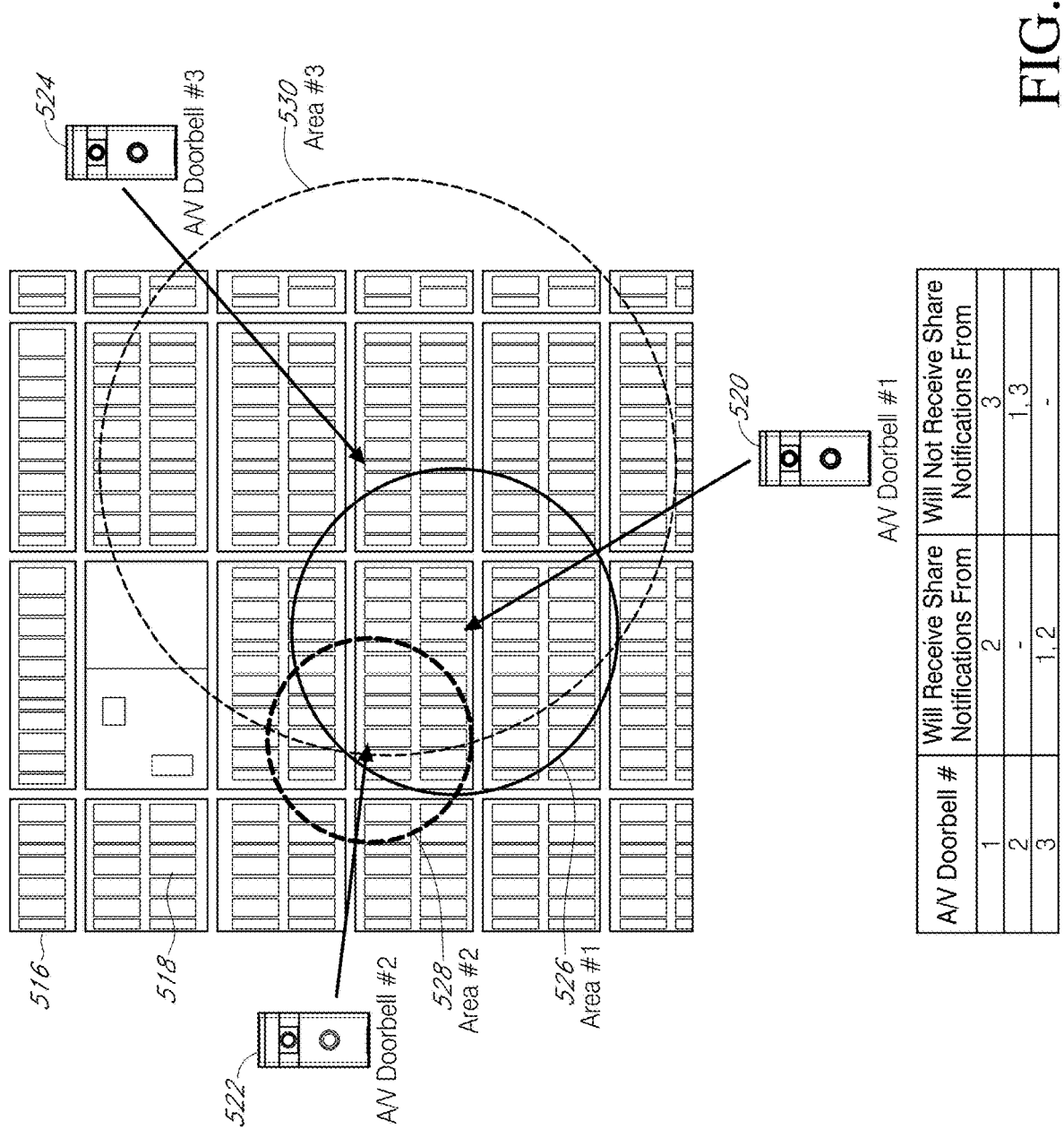
FIG. 17 is a top plan view of a neighborhood with a plurality of A/V recording and communication doorbells according to an aspect of the present disclosure.

FIG. 17 illustrates a neighborhood 516 comprising a plurality of buildings 518, such as homes, offices, retail businesses, warehouses, etc. At least some of the buildings 518 include A/V recording and communication doorbells secured to an exterior surface, such as adjacent the front door. For example, FIG. 17 illustrates three A/V doorbells (A/V Doorbell #1 520, A/V Doorbell #2 522, A/V Doorbell #3 524) associated with three different buildings. Each of the A/V doorbells 520, 522, 524 has a defined area around it represented by the three overlapping circles (Area #1 526, Area #2 528, Area #3 530). Each circle 526, 528, 530 represents the area from which the owner/user of the A/V doorbell at the center of the circle will receive notifications of shared video footage recorded by other A/V doorbells within the area.

For example, if A/V Doorbell #1 520 records video footage and the owner/user of A/V Doorbell #1 520 shares the recorded video footage, then the owner/user of A/V Doorbell #3 524 will receive a notification of the shared video footage because A/V Doorbell #1 520 is located within Area #3 530, but the owner/user of A/V Doorbell #2 522 will not receive a notification of the shared video footage because A/V Doorbell #1 520 is located outside of Area #2 528. In another example, if A/V Doorbell #2 522 records video footage and the owner/user of A/V Doorbell #2 522 shares the recorded video footage, then the owners/users of A/V Doorbells 1 and 3 will both receive a notification of the shared video footage because A/V Doorbell #2 522 is located within both Area #1 526 and Area #3 530. In another example, if A/V Doorbell #3 524 records video footage and the owner/user of A/V Doorbell #3 524 shares the recorded video footage, then neither of the owners/users of A/V Doorbells 1 and 2 will receive a notification of the shared video footage because A/V Doorbell #3 524 is located outside of both Area #1 526 and Area #2 528. The determinations of which owners/users will receive share notifications, and which owners/users will not receive share notifications, are summarized in the table at the bottom of FIG. 17.

Figure 18:
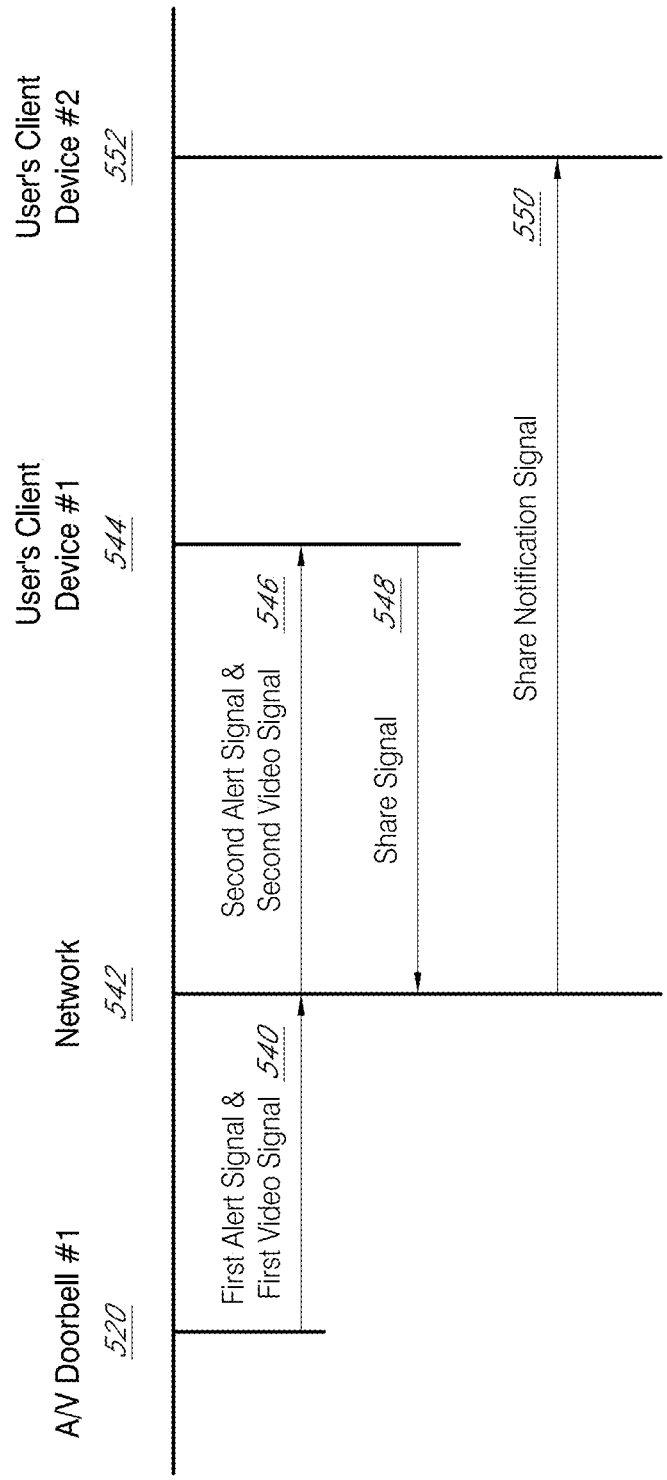
FIG. 18 is a sequence diagram illustrating a process for sharing video footage from an A/V recording and communication doorbell according to an aspect of the present disclosure.

FIG. 18 is a sequence diagram illustrating a process for sharing video footage from an A/V recording and communication doorbell (or other A/V recording and communication device) according to an aspect of the present disclosure. An A/V doorbell 520 (A/V Doorbell #1, FIGS. 17 and 18) may record video footage, which may also include audio. For example, the doorbell 520 may begin recording the video footage when a visitor is detected at the doorbell 520, which may occur, for example, when the doorbell 520 detects motion or when the visitor presses the front button on the doorbell 520. With further reference to FIG. 18, the doorbell 520 sends a first alert signal and a first video signal 540 to the network 542, and the network 542 receives the first alert signal and the first video signal 540. The network 542 includes one or more network devices, such as, for example, one or more servers, routers, switches, storage devices, etc. (not shown). At least some of the network devices include a processor and a memory. The first video signal includes images (the video footage) captured by a camera of the doorbell 520.

The network 542 transmits to a first client device 544 (User's Client Device #1), in response to receiving the first alert signal and the first video signal 540, a second alert signal and a second video signal 546. The second alert signal may be, for example, a push notification. A push notification, also called a server push notification, is the delivery of information from a software application to a computing device without a specific request from the client. The second video signal includes the images captured by the camera of the doorbell 520. The user associated with the first client device 544 may be the owner/user of the doorbell 520 (A/V Doorbell #1). The user, upon receiving the second alert signal, may choose to answer the second alert signal, which may, for example, open a live call between the user and the visitor at the doorbell 520. Alternatively, the user may ignore the second alert signal (e.g. choose not to answer the call). If the user ignores the second alert signal, he or she may still view the video footage of the second video signal at a later time.

After viewing (or while viewing) the video footage on the display of his or her client device 544, the user may decide to share the video footage with other users. For example, the user may tap a "share" button from within an application executing on his or her client device 544. The first client device 544 then sends a share signal 548 to the network 542, and the network 542 receives the share signal 548 from the first client device 544. In response to receiving the share signal 548 from the first client device 544, at least one of the network devices in the network 542 determines the other users who are to receive a notification of the shared video footage. For example, the network device(s) may determine that the doorbell 520 that recorded the shared video footage is within a predefined distance from at least one other A/V recording and communication doorbell (or other A/V recording and communication device) from among a plurality of other A/V recording and communication doorbells (or other A/V recording and communication devices). For example, with reference to FIG. 17, if the doorbell that recorded the shared video footage is A/V Doorbell #1 520, then the network device(s) may identify at least one other doorbell, such as A/V Doorbell #3 524, having a defined area (Area #3 530) around it that encompasses the location of the doorbell 520 that recorded the shared video footage. Once the other doorbell(s) has/have been identified, the network device(s) may transmit a share notification signal 550 to each client device associated with the other doorbell(s) identified (including at least User's Client Device #3 552). The share notification signal 550 may be, for example, a push notification. The other user(s), upon receiving the share notification signal 550, may choose to view the shared video footage. Alternatively, the other user(s) may ignore the share notification signal 550. If the other user(s) ignores the share notification signal 550, he or she may still view the shared video footage at a later time.

The process described above with reference to FIG. 18 advantageously enables users of A/V recording and communication devices to share video footage with one another. This feature can help reduce crime by increasing public awareness of suspicious activity. For example, a first user may view video footage that was recorded by his or her doorbell and determine that the person or persons in the video footage are, or may be, engaged in criminal activity. The first user may then share that video footage with other users who, after viewing the shared video footage, may be alerted to be on the lookout for the person or persons in the shared video footage and, if one or more such other users observe the person or persons in the shared video footage engaged in further suspicious activity, they may be more likely to report the person or persons to law enforcement.

In the process of FIG. 18, as well as in other processes described herein, a determination is made as to which other users will receive a notification of the video footage that is shared by the first user. This determination is based on the relative locations of the A/V recording and communication devices associated with each of the users. And, as described above with reference to FIG. 17, whether or not a given user (User X) will receive a share notification is dependent upon the distance (alert radius) set by User X with respect to his or her own A/V recording and communication device(s). If the device that recorded the shared video is located within the area(s) defined by User X around his or her own A/V recording and communication device(s), then User X will receive a share notification. If the device that recorded the shared video is located outside the area(s) defined by User X around his or her own A/V recording and communication device(s), then User X will not receive a share notification. Thus, the determination of which users will receive a share notification is not dependent upon an alert radius set by the owner/user of the A/V recording and communication device that recorded the shared video. Rather, that determination is based on the alert radii set by the owners/users of the A/V recording and communication devices other than the device that recorded the shared video, and many of these alert radii may differ from one another. That is, User $X_1$ may set an alert radius of one-half mile around his or her doorbell while User $X_2$ may set an alert radius of three miles around his or her doorbell. If the device that recorded the shared video is within one-half mile of User $X_1$'s doorbell, then User $X_1$ will receive a share notification, and if the device that recorded the shared video is within three miles of User $X_2$'s doorbell, then User $X_2$ will receive a share notification.

Further, in some instances a first user may not receive a share notification while a second user may receive a share notification, even though the first user's doorbell is located closer to the doorbell that recorded the shared video than the second user's doorbell is. For example, again assume that User $X_1$ has set an alert radius of one-half mile around his or her doorbell while User $X_2$ has set an alert radius of three miles around his or her doorbell. If User $X_1$'s doorbell is one mile away from the doorbell that recorded the shared video and User $X_2$'s doorbell is two miles away from the doorbell that recorded the shared video, then User $X_1$ will not receive a share notification because the doorbell that recorded the shared video is outside User $X_1$'s alert radius, but User $X_2$ will receive a share notification because the doorbell that recorded the shared video is inside User $X_2$'s alert radius.

Still further, a given user may have more than one A/V recording and communication device, and at least two of those devices may be in different locations (e.g. not on the same property or attached to the same structure). In such cases, each device may have its own alert radius, and therefore its own defined distance/area for receiving share notifications. Thus, a user may receive a share notification when the device that recorded the shared video is within the defined area around at least one of that user's devices, even if the device that recorded the shared video is outside the defined area around at least one other of that same user's devices.

In some embodiments, a user may have more than one A/V recording and communication device at the same location (e.g. attached to the same structure, or attached to separate structures that are located on the same property). In such cases, devices that are proximate one another may share an alert area. For example, a user may have an A/V recording and communication doorbell located near his or her front door and an A/V recording and communication security camera located at the rear of his or her home. These devices may share one alert radius/alert area.

Still further, users may adjust as desired the size of the defined area(s) around their A/V recording and communication device(s). Information about each A/V recording and communication device in a given set of A/V recording and communication devices may be stored in one or more data structures and accessed when needed to determine which users will receive a share notification whenever a first user shares recorded video footage. When a user adjusts the size of the defined area(s) around his or her A/V recording and communication device(s), the information stored in the data structure(s) may be updated accordingly.

Figure 19:
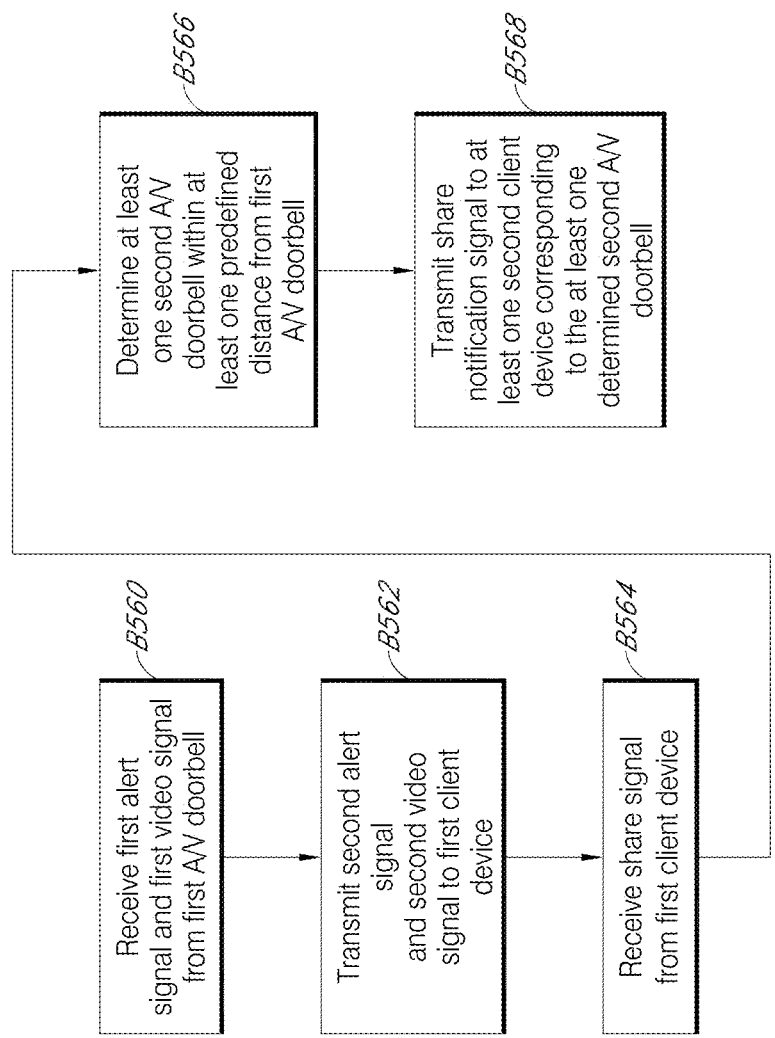
FIG. 19 is a flowchart illustrating another process for sharing video footage from an A/V recording and communication doorbell according to an aspect of the present disclosure.

FIG. 19 is a flowchart illustrating another process for sharing video footage from an A/V recording and communication doorbell (or other A/V recording and communication device) according to an aspect of the present disclosure. The process of FIG. 19 is described from the perspective of the network device(s). Thus, at block B560 the network device(s) receive a first alert signal and a first video signal from a first A/V doorbell. At block B562, the network device(s) transmit a second alert signal and a second video signal to the first client device. At block B564, the network device(s) receive a share signal from the first client device. At block B566, the network device(s) determine at least one second A/V doorbell within at least one predefined distance from the first A/V doorbell. At block B568, the network device(s) transmit a share notification signal to the at least one second client device corresponding to the at least one determined second A/V doorbell.

FIGS. 20-24 are screenshots of a graphical user interface (GUI) 570 illustrating aspects of a process for sharing video footage from an A/V recording and communication device according to an aspect of the present disclosure. The process of FIGS. 20-24 is described from the perspective of a user who receives an alert signal and a video signal on his or her client device. Thus, the GUI 570 illustrated in FIGS. 20-24 is configured to be displayed on a display of the user's client device, such as a smartphone.

Figure 20:
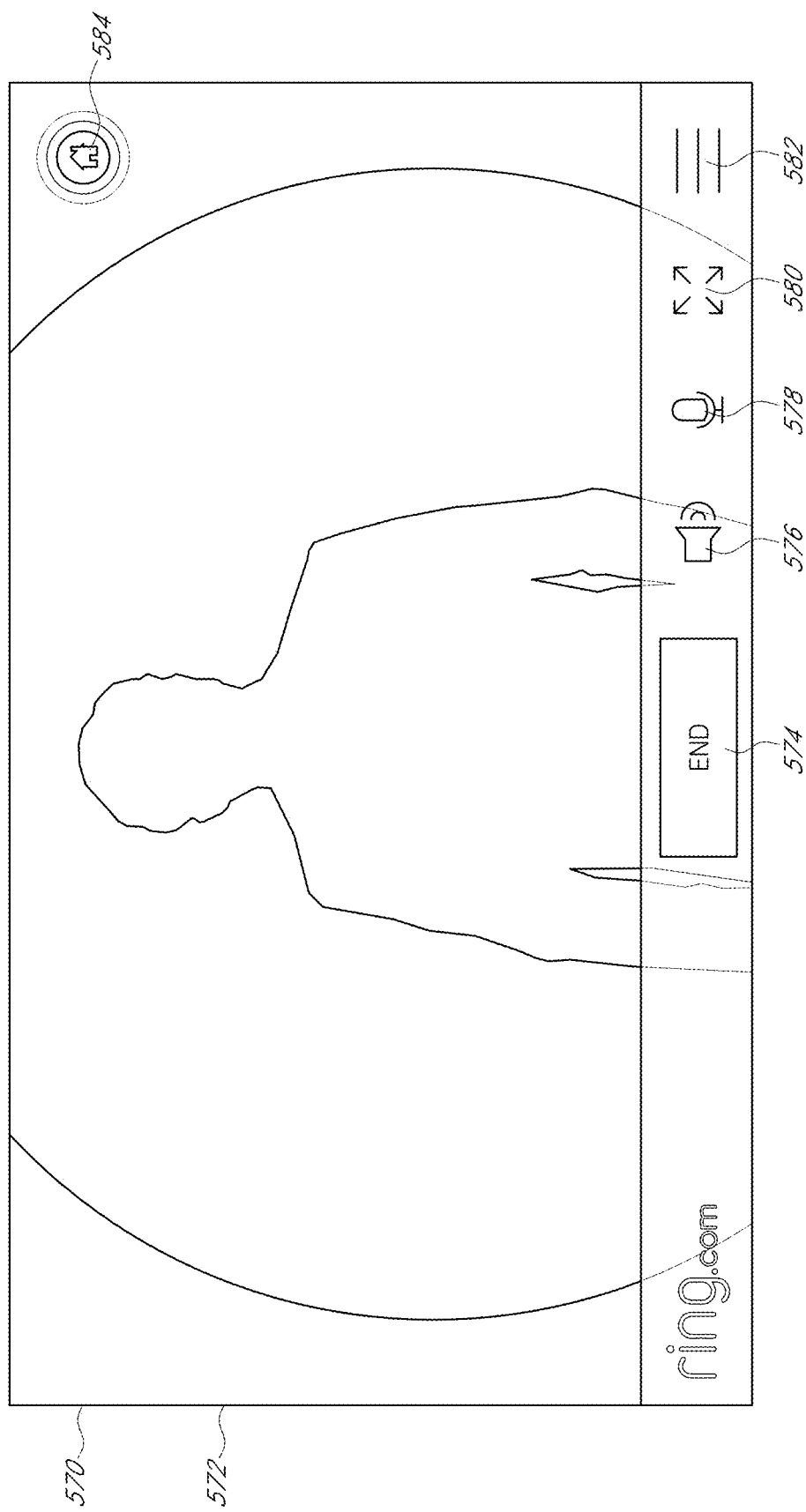
FIGS. 20-24 are screenshots of a graphical user interface (GUI) illustrating aspects of a process for sharing video footage from an A/V recording and communication device according to an aspect of the present disclosure.

With reference to FIG. 20, a live call screen 572 is illustrated. When a user's A/V recording and communication device detects motion, or, in the case of a doorbell, when a visitor presses the front button on the doorbell, the user receives an alert on his or her client device along with streaming video footage recorded by the camera of the A/V recording and communication device. If the user answers the alert, a live call screen 572 such as that shown in FIG. 20 may be displayed on the user's client device. The live call screen 572 may include one or more buttons, such as an END button 574 (to terminate or disconnect the call), a volume adjust button 576, a mute button 578, a full screen button 580 (to expand the video so that it fills the entire display screen), and/or a menu button 582.

Figure 21:
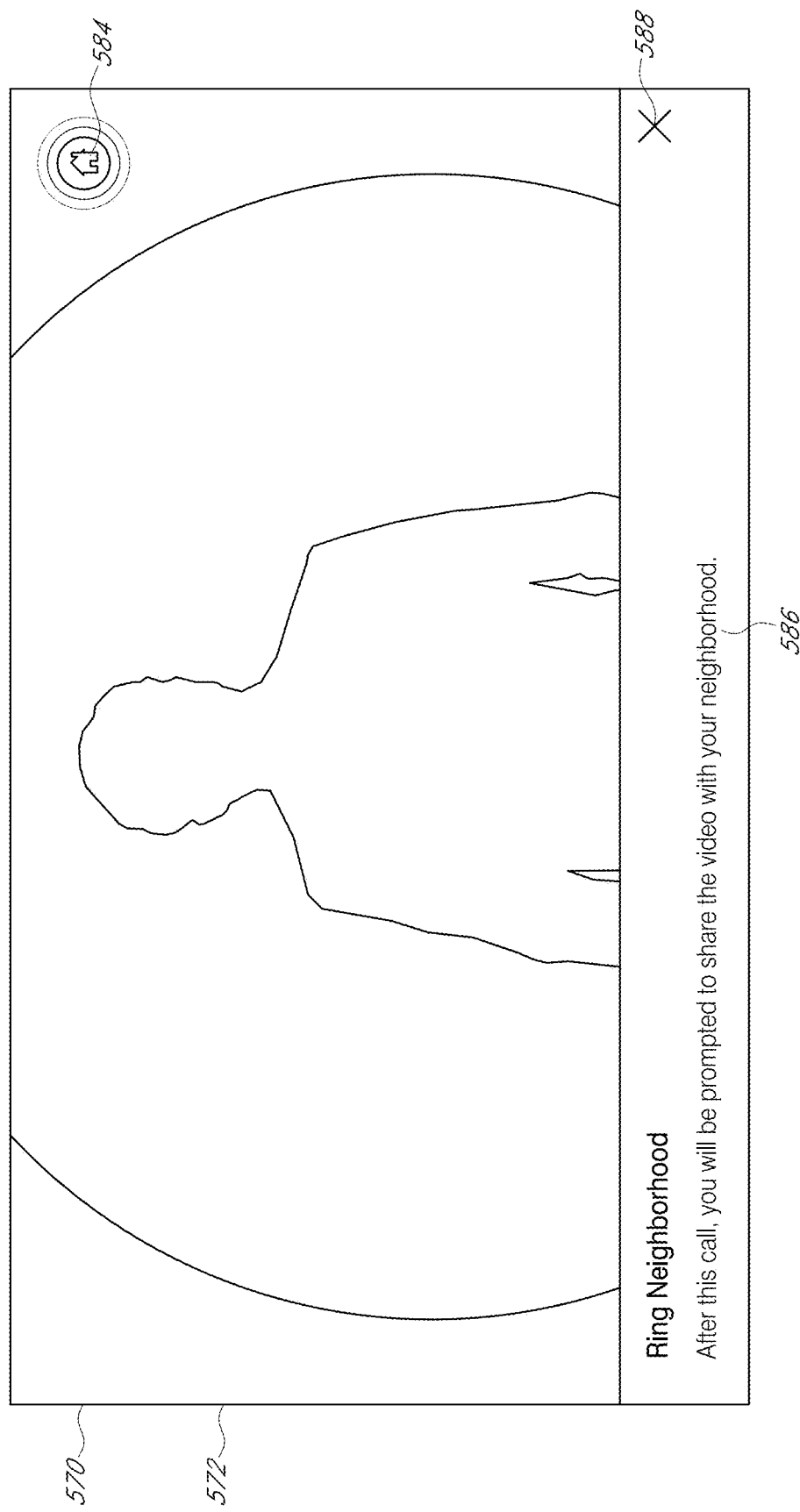

The live call screen 572 may further include a neighborhood share button 584. If the user selects the neighborhood share button 584 during the live call, the GUI 570 may display a notification 586 that the user will be prompted after the live call to share the video of the call with other users in the user's "neighborhood," e.g. those users determined according to the process described above with reference to FIGS. 18 and 19. For example, as shown in FIG. 21, the notification 586 may appear in a banner portion 588 of the live call screen 572. Advantageously, displaying the notification 586 in a banner 588 does not interrupt the live call, so that the user and the visitor can continue speaking to one another for as long as desired.

Figure 22:
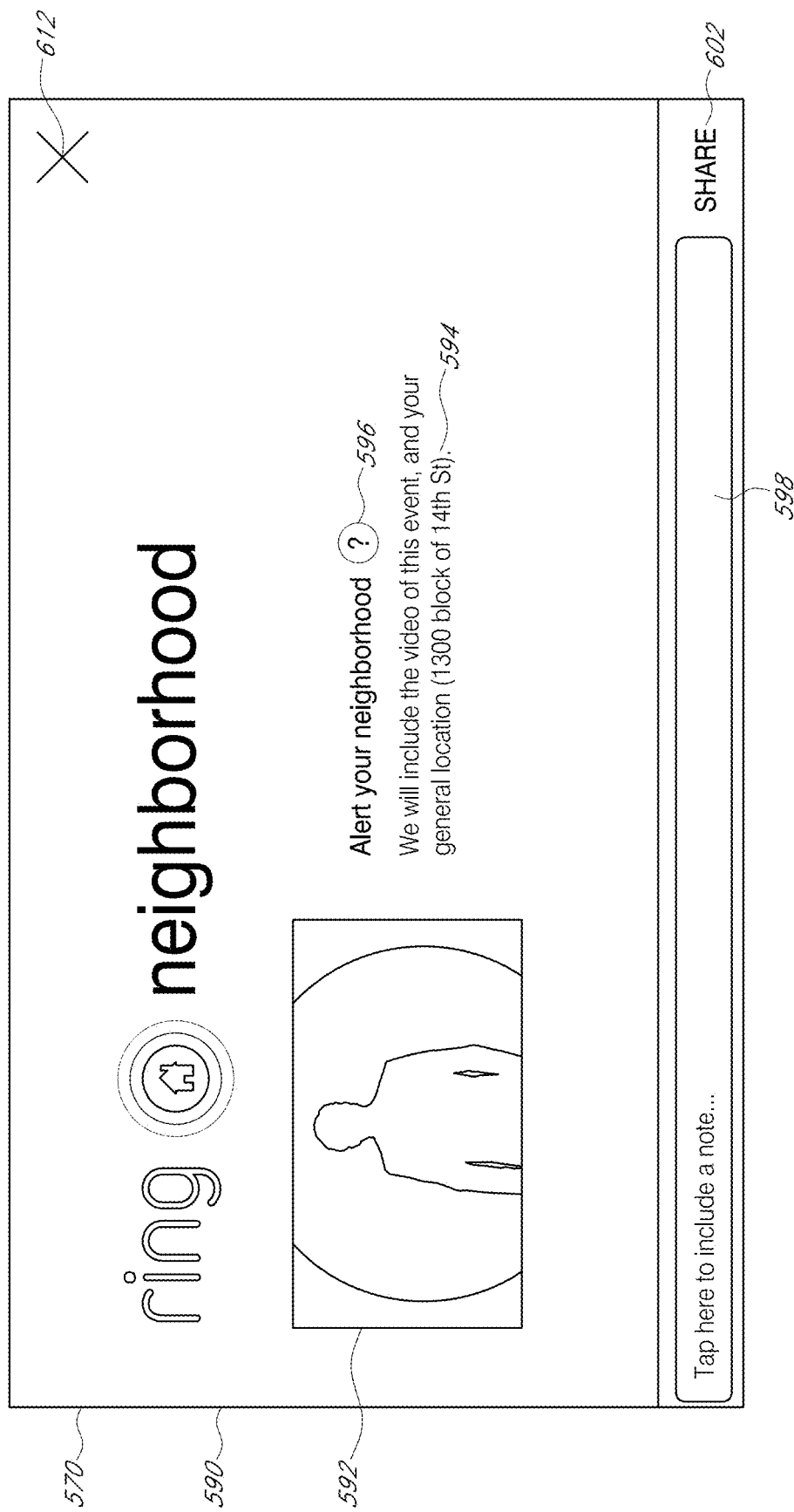

If the user selects the neighborhood share button 584 during the live call, then after the call is terminated, such as when the user selects the END button 574 on the live call screen 572 (FIG. 20), a share information screen 590 may be shown on the GUI 570, as shown in FIG. 22. In the illustrated embodiment, the share information screen 590 includes a still image 592 from the video that was recorded during the live call, and textual information 594. For example, the text 594 may include a phrase such as "Alert your neighborhood," which informs (or reminds) the user that he or she is about to share the recorded video footage with one or more other users. The text 594 may further include a notice that the video footage will be shared along with a general indication of where the video was recorded. For example, the location information may identify the street name and block number, such as "1300 block of 14$^{th}$ Street," and/or may identify the nearest intersection, such as "Near the intersection of 14$^{th}$ Street and Santa Monica Boulevard." An icon 596, such as a question mark, may also be displayed. If the user selects the question mark icon 596, further information about the share feature may be displayed, and/or a help menu may be displayed.

Figure 23:
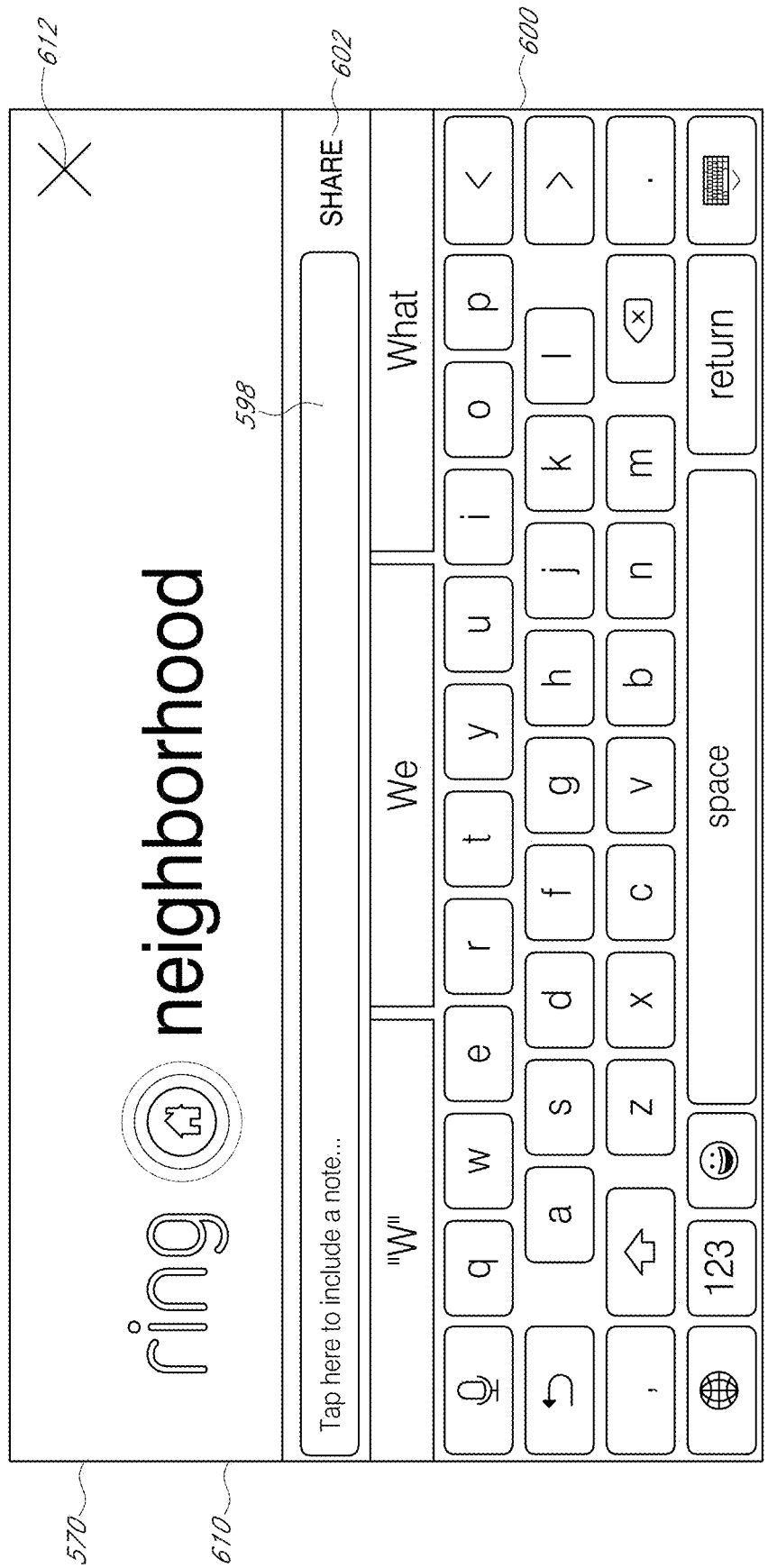

The share information screen 590 may further include a text entry box 598. If the user selects the text entry box 598, such as by tapping on it if the user's client device includes a touchscreen display, a keyboard 600 may appear on the display, as shown in FIG. 23. The user may then enter text to describe the content of the shared video. After entering text, the user may select a SHARE button 602, after which the share signal (FIG. 18) is sent to the network and the network identifies one or more other users who will be notified of the shared video and sends out notifications to the identified other users. The share signal may include, or be accompanied by, the text entered by the user in the text entry box 598 of the GUI 570 shown in FIG. 23. The user may also decline to enter any text in the text entry box 598, and may instead simply select the SHARE button 602 from the share information screen 590 of FIG. 22, after which the share signal (FIG. 18) is sent to the network and the network identifies one or more other users who will be notified of the shared video and sends out notifications to the identified other users.

Figure 24:
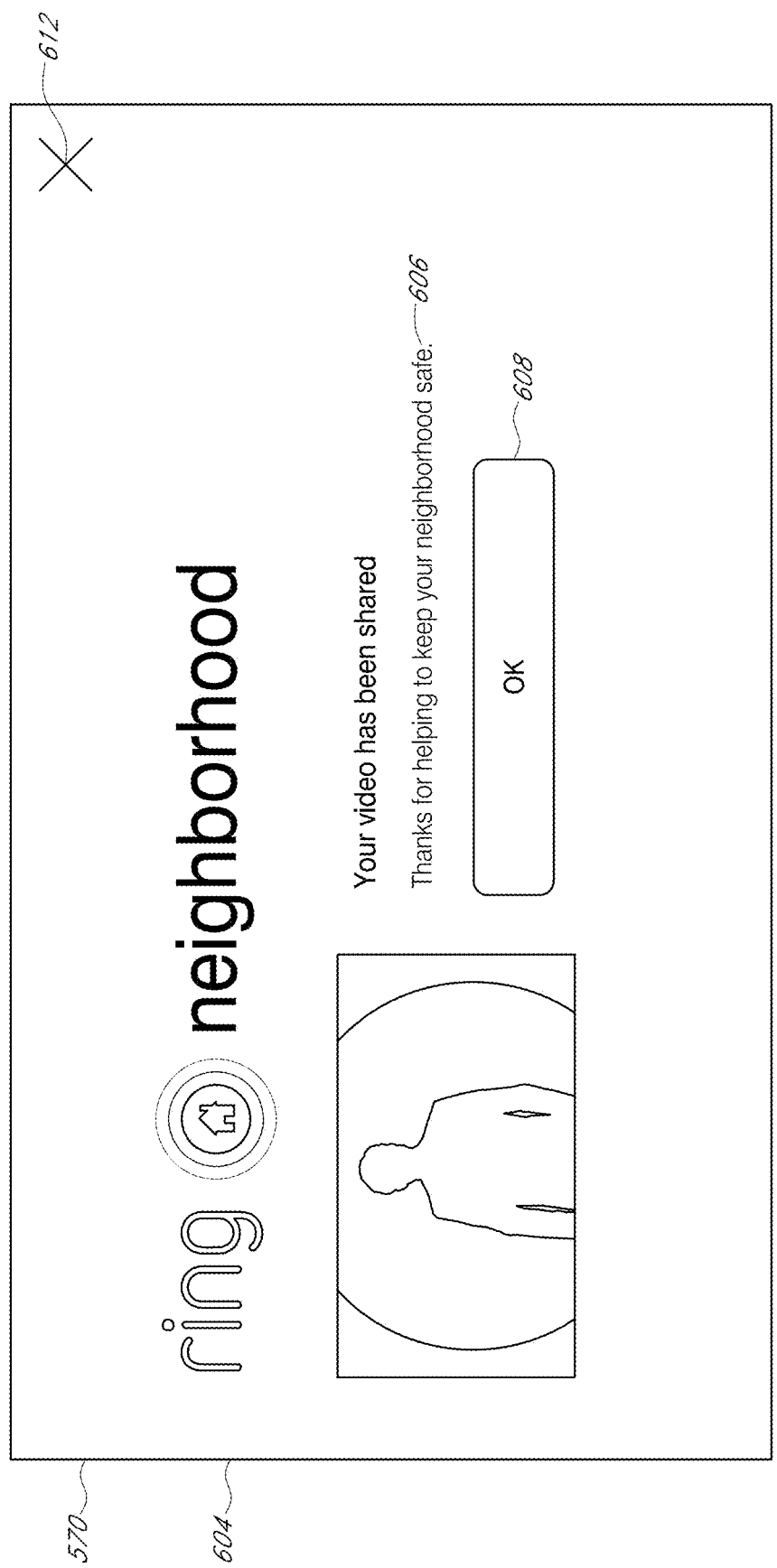

After the user selects the SHARE button 602, with or without entering text in the text entry box 598, a confirmation screen 604 may be displayed on the display of the user's client device, as shown in FIG. 24. The confirmation screen 604 may include text 606, such as a message confirming that the video has been shared ("Your video has been shared") and/or a thank you message ("Thanks for helping to keep your neighborhood safe."). The confirmation screen 604 may further include a button, such as an OK button 608, which, when selected, may return the user to another screen, such as a menu screen, of the application executing on the user's client device. With reference to FIGS. 22-24, the share information screen 590 (FIG. 22), the text entry screen 610 (FIG. 23), and/or the confirmation screen 604 (FIG. 24) may include a close button 612 (the "X" in the upper right-hand corner). If the user selects the close button 612, the share operation may be terminated without sharing the video footage from the live call. Further, if the user selects the close button 612, a popup window (not shown) may be shown on the display asking the user to confirm that the share operation is to be terminated.

In further reference to FIGS. 20-24, in some embodiments the share signal may be sent to the network, and the network may enable one or more of the identified recipient users to further comment about the shared video and/or the text regarding the shared video. In some embodiments, the further comments may be directed to the user that shared the video, or may be directed to all the users. For example, if a user shares a video depicting a person committing a crime, another user that receives the shared video may recognize the person depicted in the video (the perpetrator). The recipient user may then send identifying information about the perpetrator, which may be useful in apprehending the perpetrator. In some embodiments, the identifying information may be sent directly to the user that shared the information, or it may be posted to the network such that it is visible to all the recipients of the shared video. In another example, if a user shares a video depicting a person committing a crime, and knows (or recognizes) the perpetrator, then users that receive the shared video may request the identifying information about the person directly from the user that shared the video. In some embodiments, the user that shared the video may get a direct message such as (but not limited to) an email requesting the information. The user may then decide whether or not to provide the identifying information to the requesting user. A further example may include the network providing a comment section with the shared video so that the various users may provide comments regarding the shared video. An additional example may include allowing users to post comments and/or send messages regarding the shared video without revealing their personal identity and/or contact information, such as email addresses. In further embodiments, the share signal may include image data and/or audio data that is captured and transmitted to the network in real-time (or near real-time), which may make the share signal a live video feed. In such embodiments, a user may set his or her share features to automatically share particular events and/or types of events to the network. In some embodiments, various users may comment on the shared live video feed, as described above.

FIGS. 25-29 are screenshots of a graphical user interface (GUI) 620 illustrating aspects of another process for sharing video footage from an A/V recording and communication device according to an aspect of the present disclosure. The process of FIGS. 25-29 is described from the perspective of a user who views an earlier-recorded video on his or her client device. Thus, the GUI 620 illustrated in FIGS. 25-29 is configured to be displayed on a display of the user's client device, such as a smartphone. In this embodiment, the video displayed on the user's client device is not a live call, but rather is a recording of a visitor event that took place earlier in time. The recording may be, however, a recording of an earlier live call between the user and the visitor.

Figure 25:
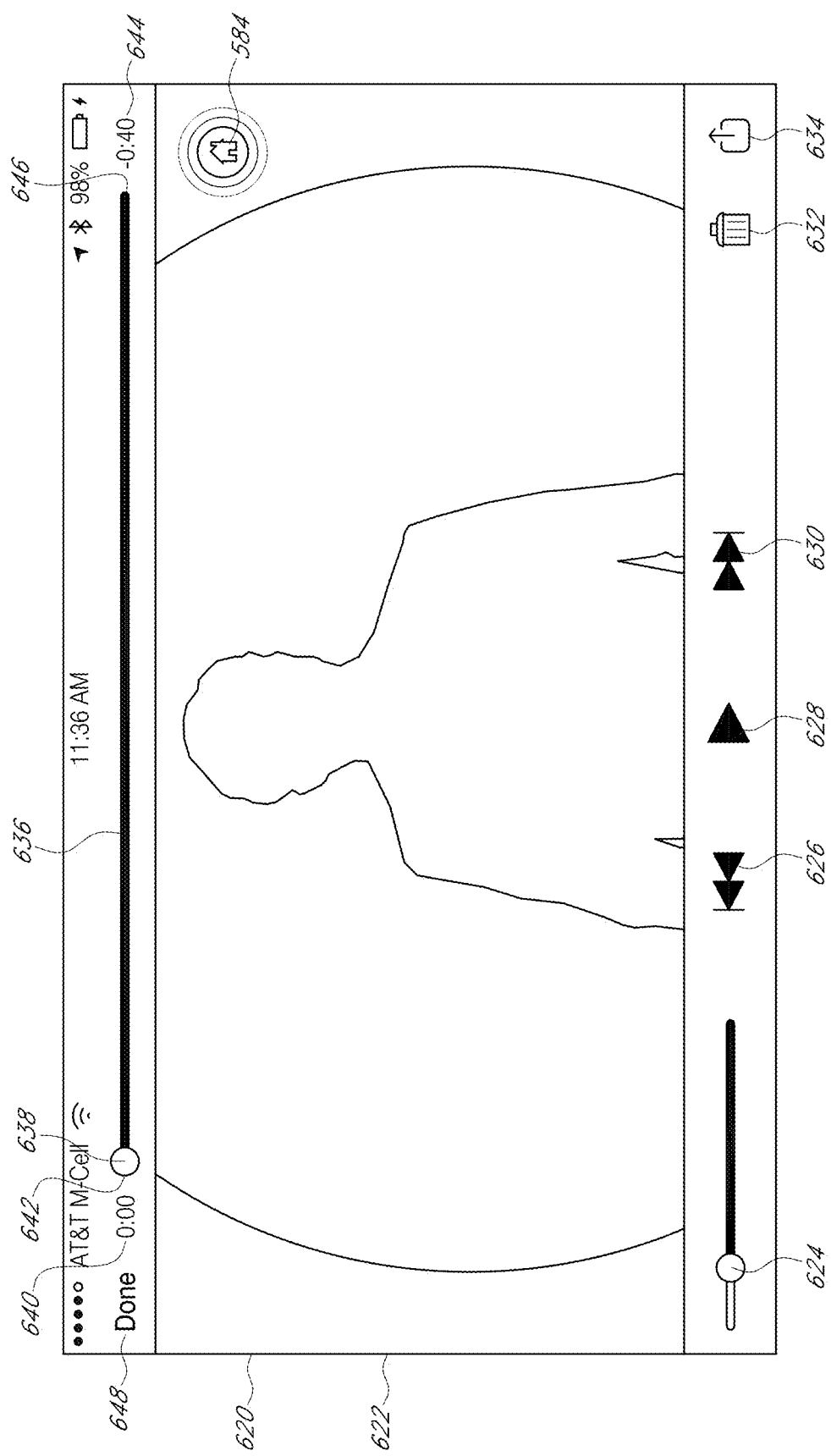
FIGS. 25-29 are screenshots of a graphical user interface (GUI) illustrating aspects of another process for sharing video footage from an A/V recording and communication device according to an aspect of the present disclosure.

With reference to FIG. 25, a video playback screen 622 is illustrated. When a user's A/V recording and communication device detects motion, or, in the case of a doorbell, when a visitor presses the front button on the doorbell, the user receives an alert on his or her client device along with streaming video footage recorded by the camera of the A/V recording and communication device. If the user ignores the alert, the motion event or button press event may nevertheless be recorded and stored at a remote network device. When the user later accesses the stored video footage, the video may be displayed on the video playback screen 622 on the user's client device, as shown in FIG. 25. Alternatively, if the user answers the alert and communicates with the visitor but does not share the video from within the live call (as described above with respect to FIGS. 20-24), the user may still view the recorded video footage by accessing it from a menu, as described below.

With further reference to FIG. 25, the video playback screen 622 may include one or more buttons or controls, such as a volume adjustment slider widget 624, a rewind button 626, a play button 628, a fast forward button 630, a delete button 632, and/or a share button 634. If the user selects the share button 634, a popup menu (not shown) may be shown on the display offering the user one or more options for sharing the video with his or her contacts and/or via social media. For example, the popup menu (or any other suitable type of interface) may include options for sharing the video via e-mail, via text message, and/or via social media, such as on NEXTDOOR®, FACEBOOK®, INSTAGRAM®, TWITTER®, etc. When the user selects one of the options, a new message (or post, etc.) may then be created including a link to the video to be shared. For example, if the user selects a social media network through which to share the video, the process may create a social media post with a link to the video to be shared. Posting the video to one or more social networks may enable the video to be seen by others, including others who live in the neighborhood where the video was recorded. Those persons may recognize a person in the video, and may be able to help identify that person. Further, the social network post may provide a warning to others who live in the neighborhood where the video was recorded, encouraging those people to be watchful for the person(s) in the video.

While the present embodiments are not limited to use with any particular social network, or type of social network, the present embodiments may nevertheless be well adapted for use with a neighborhood-oriented social network, such as NEXTDOOR®. Neighborhood-oriented social networks allow users to connect with people who live in their neighborhood, and/or in nearby neighborhoods, by limiting access to posts to the people in the same neighborhood as the poster, or those nearby. As described above, in some aspects the present embodiments enable a user to share a video to a social network. When the video is posted to a social networking service for neighborhoods, the video is more likely to be seen by people who live in the neighborhood where the video was recorded. The video is thus more likely to be relevant to the people in the neighborhood-oriented social network, because those people are more likely to have also seen the person(s) in the video. The neighborhood-oriented social network members may therefore be able to provide additional information about the person(s) in the video, such as confirming that they too have seen the person(s) in the neighborhood and/or helping to identify the person(s) in the video. If the person(s) in the video has committed criminal acts in the neighborhood, identifying the person(s) may help lead to their capture and conviction.

With further reference to FIG. 25, the video playback screen 622 may further include a progress bar 636 and a slider widget 638 that indicates what portion of the video is currently playing. For example, a timer 640 at a first end 642 of the progress bar 636 indicates how much of the video has elapsed, and a timer 644 at a second end 646 of the progress bar 636 indicates how much of the video is left to play. As the video plays, the progress slider widget 638 moves from the first end 642 to the second end 646 of the progress bar 636. If the user wants to jump to a particular portion of the video, he or she may move the slider widget 638 left or right by selecting it, sliding it along the progress bar 636, and releasing it. The video playback screen 622 may further include a Done button 648, which, when selected, closes the video and returns the user to a previous screen within the application executing on the user's client device.

Figure 26:
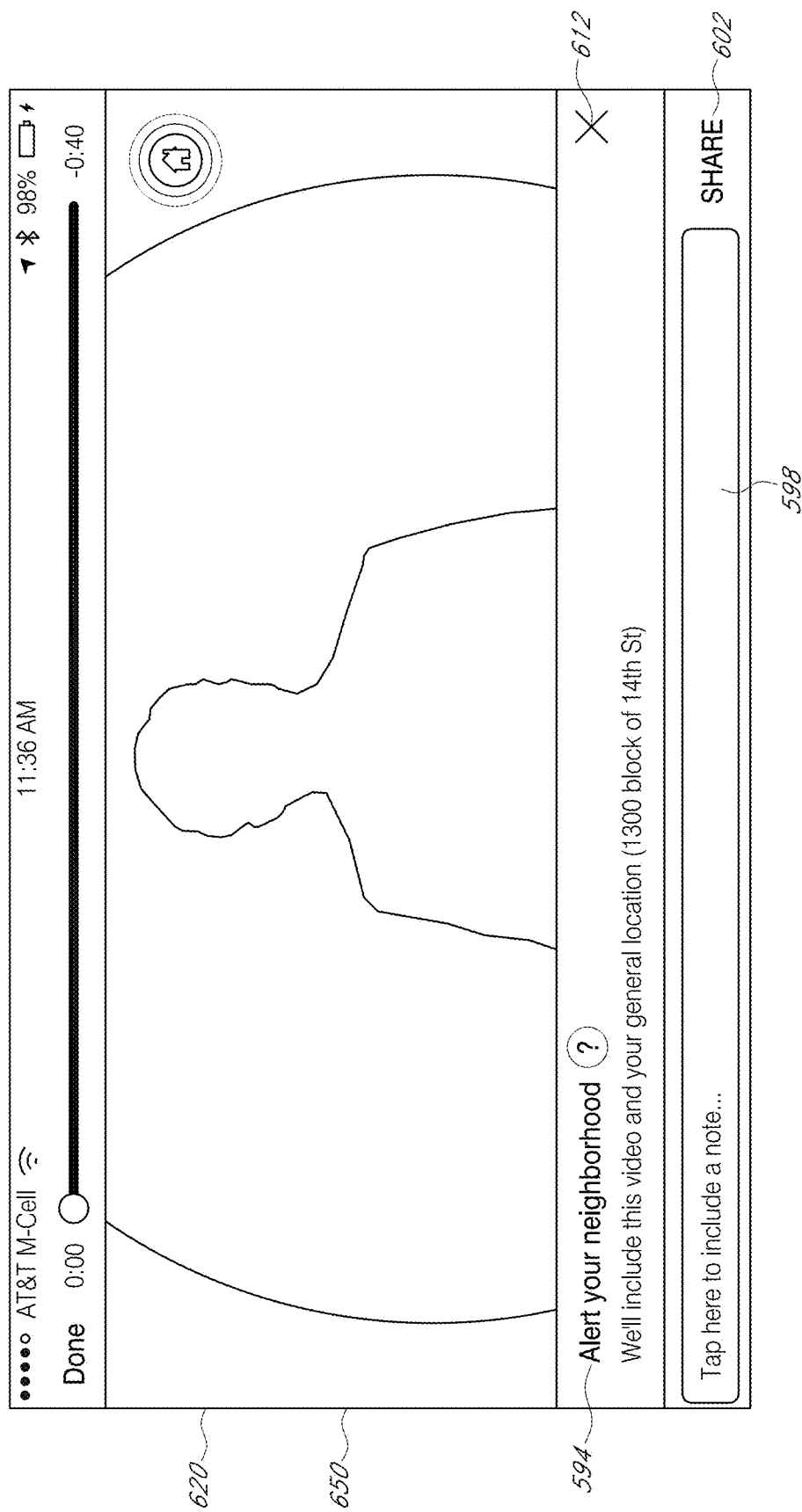

With further reference to FIG. 25, the video playback screen 622 may further include a neighborhood share button 584. If the user selects the neighborhood share button 584, the GUI 620 may display textual information 594, as shown in FIG. 26. For example, the text 594 may include a phrase such as "Alert your neighborhood," which informs (or reminds) the user that he or she is about to share the recorded video footage with one or more other users. The text 594 may further include a notice that the video footage will be shared along with a general indication of where the video was recorded. For example, the location information may identify the street name and block number, such as "1300 block of $14^{th}$ Street," and/or may identify the nearest intersection, such as "Near the intersection of $14^{th}$ Street and Santa Monica Boulevard." An icon 596, such as a question mark, may also be displayed. If the user selects the question mark icon 596, further information about the share feature may be displayed, and/or a help menu may be displayed.

Figure 27:
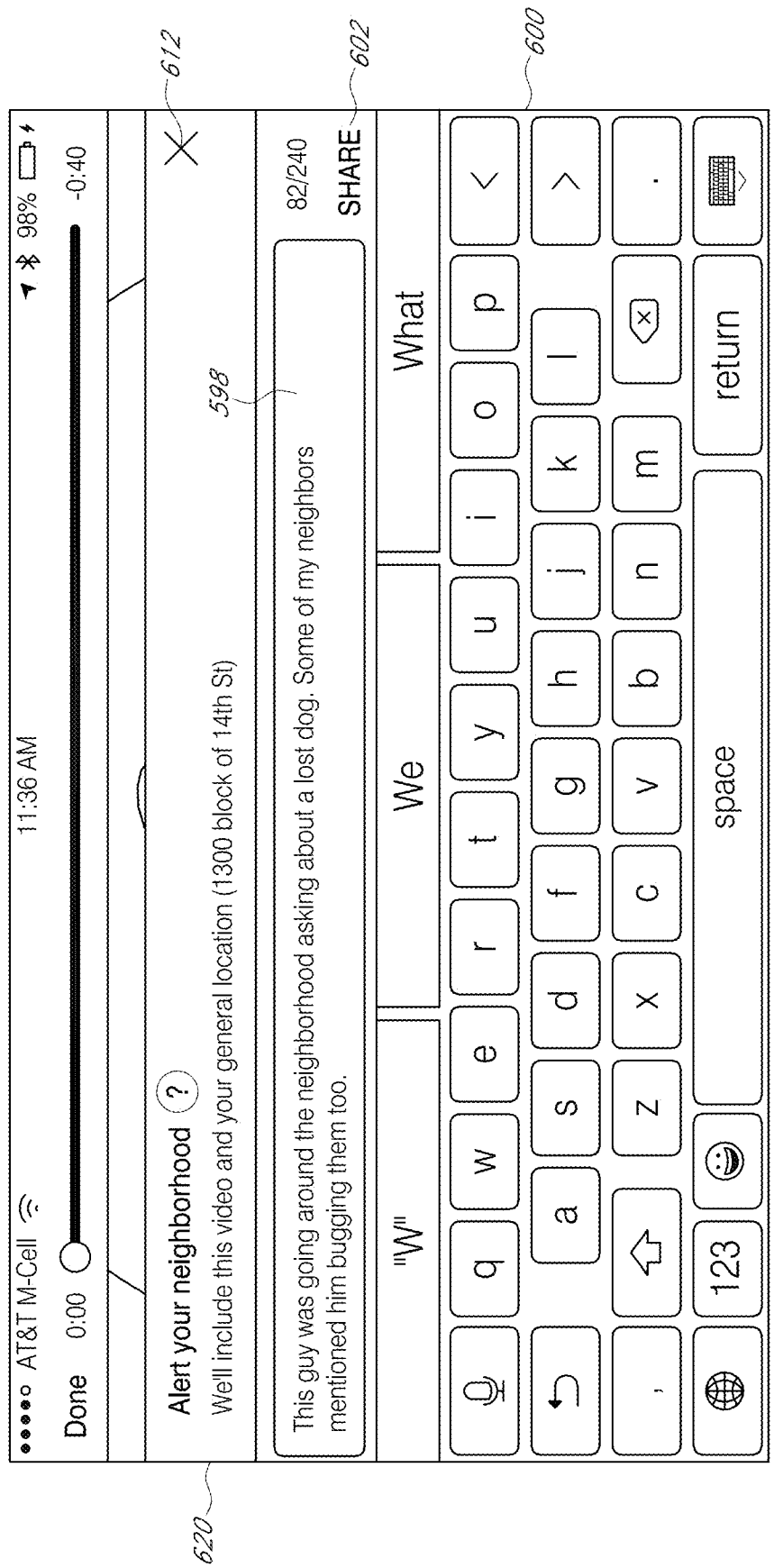

The GUI 620 of FIG. 26 may further include a text entry box 598. If the user selects the text entry box 598, such as by tapping on it if the user's client device includes a touchscreen display, a keyboard 600 may appear on the display, as shown in FIG. 27. The user may then enter text to describe the content of the shared video. After entering text, the user may select a SHARE button 602, after which the share signal (FIG. 18) is sent to the network and the network identifies one or more other users who will be notified of the shared video and sends out notifications to the identified other users. The share signal may include, or be accompanied by, the text entered by the user in the text entry box 598 of the GUI 620 shown in FIG. 27. The user may also decline to enter any text in the text entry box 598, and may instead simply select the SHARE button 602 from the share screen 650 of FIG. 26, after which the share signal (FIG. 18) is sent to the network and the network identifies one or more other users who will be notified of the shared video and sends out notifications to the identified other users.

Figure 28:
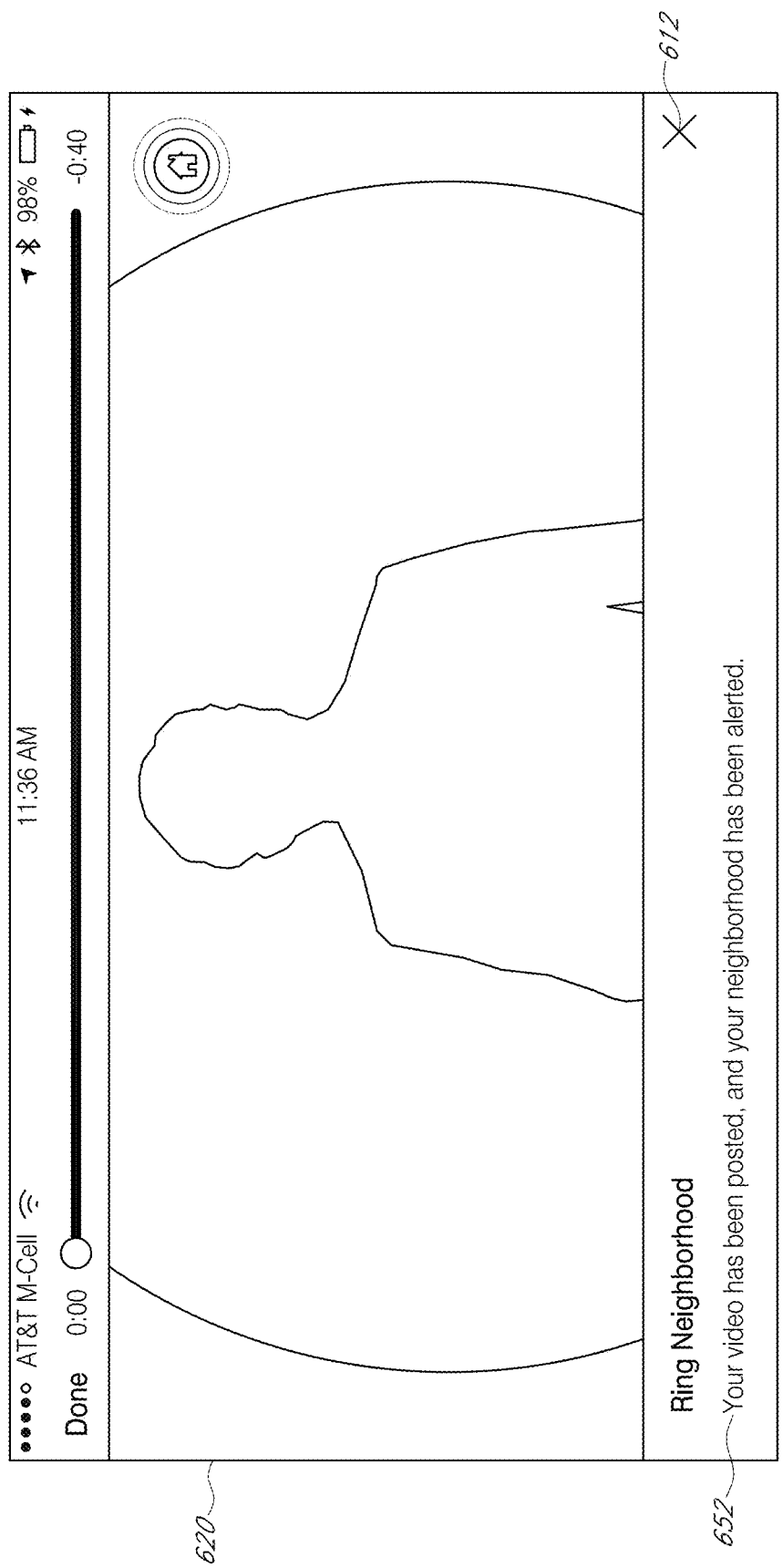
Figure 29:
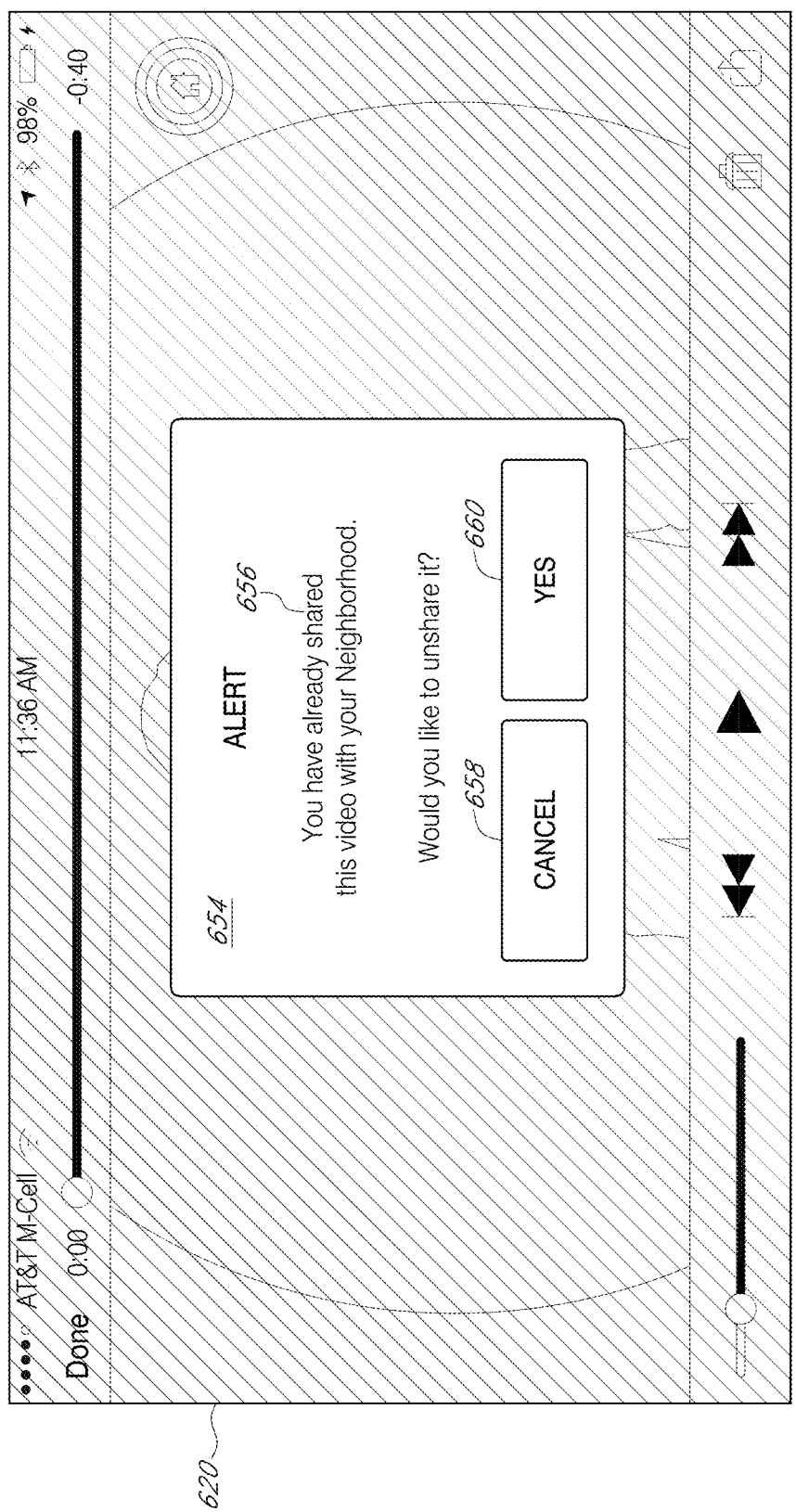

After the user selects the SHARE button 602, with or without entering text in the text entry box 598, a confirmation message 652 may be displayed on the GUI 620 of the user's client device, as shown in FIG. 28. The confirmation message 652 may include text, such as a message confirming that the video has been shared ("Your video has been posted and your neighborhood has been alerted."). With reference to FIG. 29, a popup message 654 may also be shown asking the user if he or she would like to "unshare" the video. The popup message 654 may include text 656 such as "You have already shared this video with your Neighborhood." and one or more buttons, such as a CANCEL button 658 and/or a YES (or OK) button 660. If the user selects the YES button 660, the shared video may be "unshared," whereas if the user selects the CANCEL button 658, the shared video will not be "unshared." With reference to FIGS. 26-28, the GUI 620 may include a close button 612 (the "X" in the upper right-hand corner). If the user selects the close button 612, the share operation may be terminated without sharing the video footage. Further, if the user selects the close button 612, a popup window (not shown) may be shown on the display asking the user to confirm that the share operation is to be terminated.

In some embodiments, video footage recorded by a user's A/V recording and communication device may not be stored at a remote network device on a long-term basis. In such embodiments, the user may still share video footage from his or her A/V recording and communication device with other users, but only from a live call, such as according to the process described above with reference to FIGS. 20-24 (and not from a video playback process, such as that described above with reference to FIGS. 25-29). To enable this aspect, all video recorded by the user's A/V recording and communication device may be temporarily stored at a remote network device so that it is available for sharing if the user shares the video footage from the live call. For example, the video may be temporarily stored at a remote network device as long as the live call is in progress, but if the live call terminates without the user selecting the neighborhood share button 584 (FIG. 20), the video that was temporarily stored at the remote network device may then be deleted.

In further reference to FIGS. 25-29, and as described above with respect to FIGS. 20-24, in some embodiments, the share signal may be sent to the network, and the network may enable one or more of the identified recipient users to further comment about the shared video and/or the text regarding the shared video. In some embodiments, the further comments may be directed to the user that shared the video, or may be directed to all the users. For example, if a user shares a video depicting a person committing a crime, another user that receives the shared video may recognize the person depicted in the video (the perpetrator). The recipient user may then send identifying information about the person, which may be useful in apprehending the perpetrator. In some embodiments, the identifying information may be sent directly to the user that shared the information, or it may be posted to the network such that it is visible to all the recipients of the shared video. In another example, if a user shares a video depicting a person committing a crime, and knows (or recognizes) the perpetrator, then users that receive the shared video may request the identifying information about the person directly from the user that shared the video. In some embodiments, the user that shared the video may get a direct message such as (but not limited to) an email requesting the information. The user may then decide whether or not to provide the identifying information to the requesting user. A further example may include the network providing a comment section with the shared video so that the various users may provide comments regarding the shared video. An additional example may include allowing users to post comments and/or send messages regarding the shared video without revealing their personal identity and/or contact information, such as email addresses. In further embodiments, the share signal may include image data and/or audio data that is captured and transmitted to the network in real-time (or near real-time) which may make the share signal a live video feed. In such embodiments, a user may set his or her share features to automatically share particular events and/or types of events to the network. In some embodiments, various users may comment on the shared live video feed, as described above.

Figure 30:
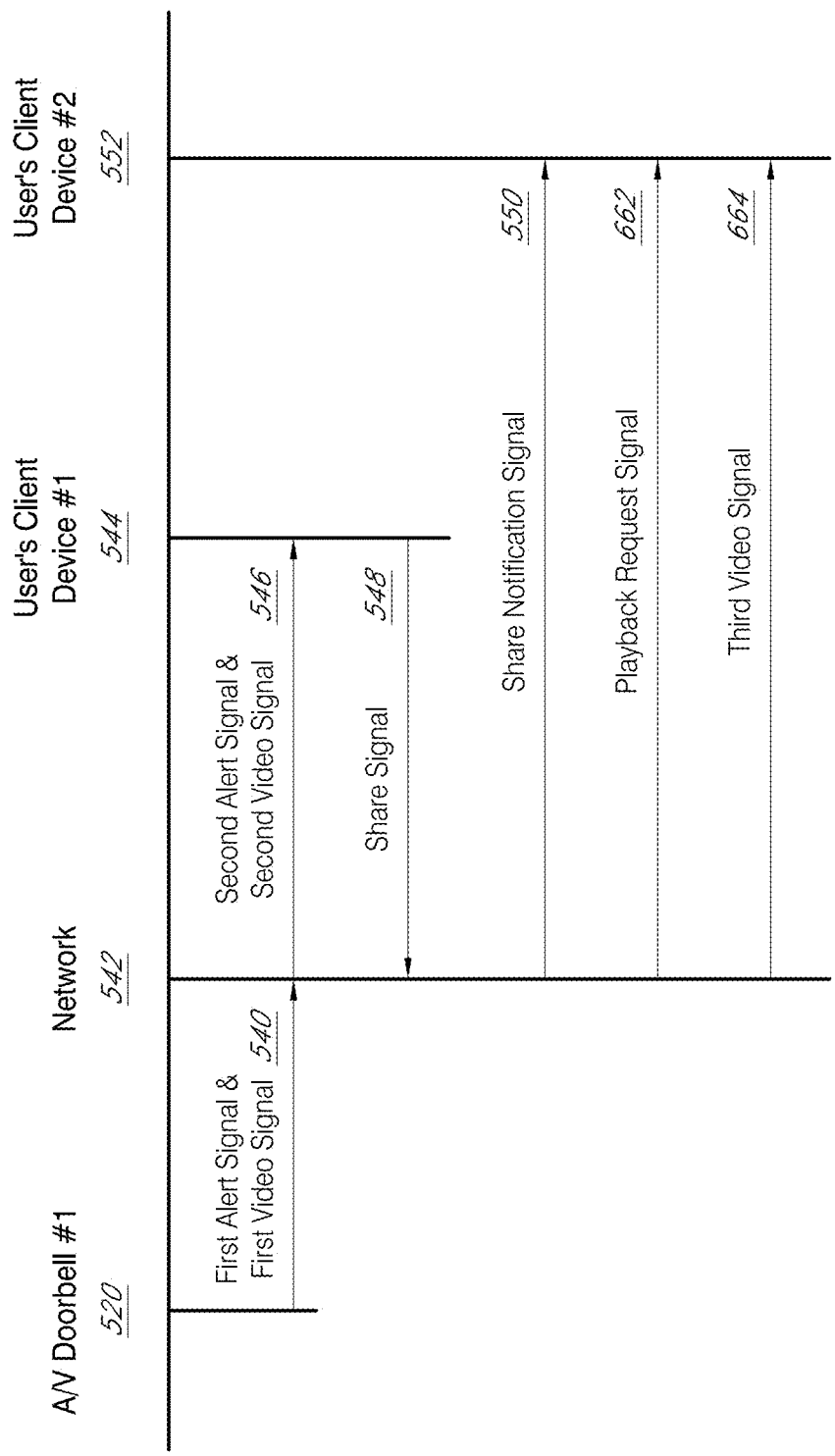
FIG. 30 is a sequence diagram illustrating another process for sharing video footage from an A/V recording and communication doorbell according to an aspect of the present disclosure.

FIG. 30 is a sequence diagram illustrating another process for sharing video footage from an A/V recording and communication doorbell according to an aspect of the present disclosure. The process of FIG. 30 includes aspects of the process of FIG. 18, including the doorbell 520 sending a first alert signal and a first video signal 540 to the network (and the network receives the first alert signal and the first video signal 540), the network 542 transmitting to a first client device (User's Client Device #1), in response to receiving the first alert signal and the first video signal, a second alert signal and a second video signal 546, the first client device 544 sending a share signal 548 to the network (and the network receiving the share signal 548 from the first client device), and the network device(s) 542 transmitting a share notification signal 550 to each client device associated with the other doorbell(s) identified (including at least User's Client Device #3 552).

The process of FIG. 30 further comprises the third client device 552 sending a playback request signal 662 to the network 542 (and the network 542 receiving the playback request signal 662 from the third client device 552), and the network device(s) 542, in response to receiving the playback request signal 662 from the third client device 552, transmitting a third video signal 664 to the third client device 552, the third video signal 664 including the shared video footage recorded by A/V Doorbell #1 520. For example, User's Client Device #3 552 may receive the share notification signal 550, which may be, for example, a push notification. The user associated with User's Client Device #3 552 may then choose to view the shared video footage, such as by selecting a "VIEW NOW" button (or an "OK" button, etc.) in the push notification. Alternatively, the user may ignore the share notification signal 550, but may subsequently request to view the shared video footage through one or more screens/menus within an application executing on User's Client Device #3 552, as described below. The playback request signal 662 is then sent to the network 542, and the shared video footage is sent to User's Client Device #3 552 in the third video signal 664.

Figure 31:
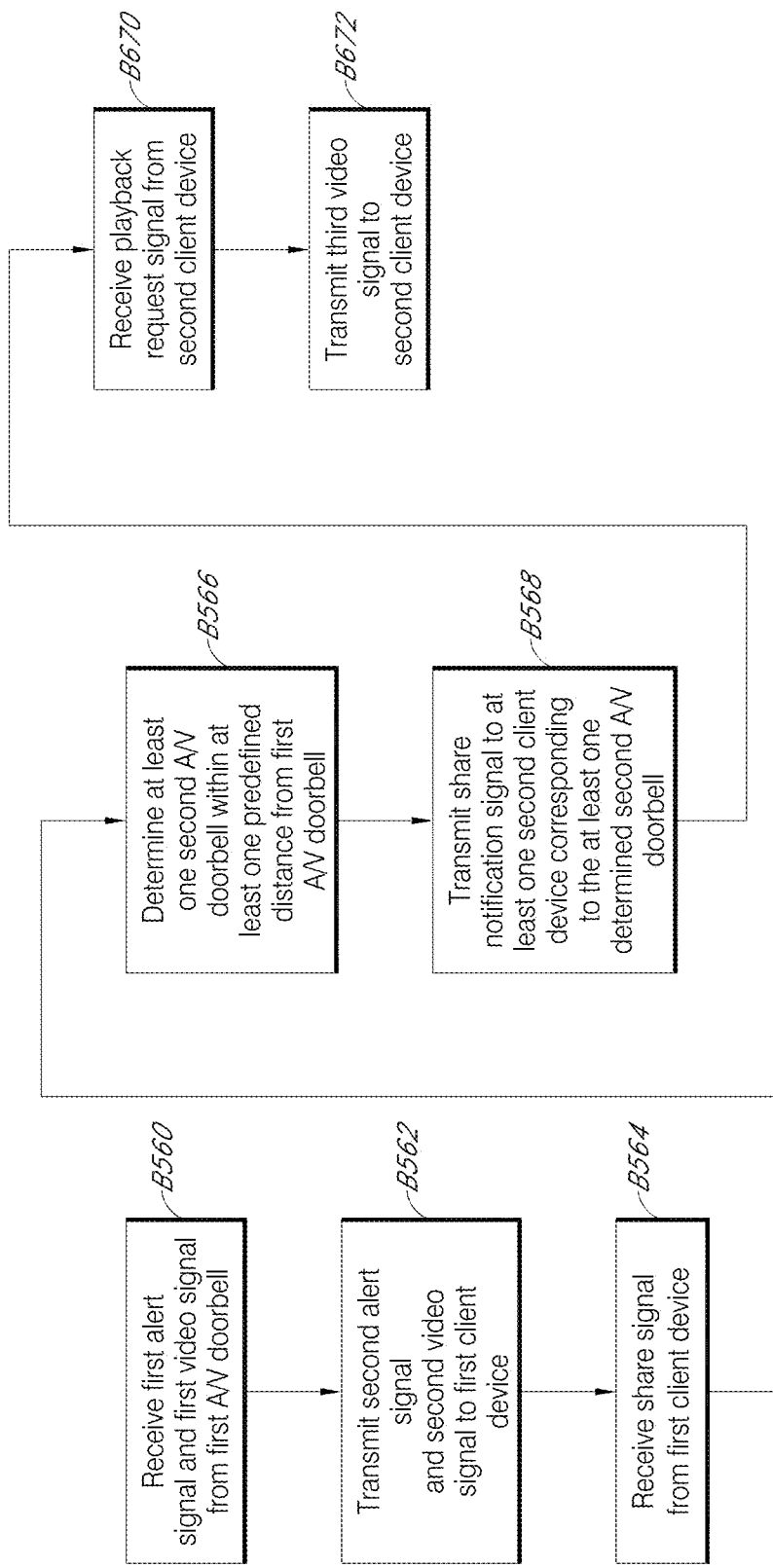
FIG. 31 is a flowchart illustrating another process for sharing video footage from an A/V recording and communication doorbell according to an aspect of the present disclosure.

FIG. 31 is a flowchart illustrating another process for sharing video footage from an A/V recording and communication doorbell according to an aspect of the present disclosure. The process of FIG. 31 is described from the perspective of the network device(s). Thus, at block B560 the network device(s) receive a first alert signal and a first video signal from a first A/V doorbell. At block B562, the network device(s) transmit a second alert signal and a second video signal to the first client device. At block B564, the network device(s) receive a share signal from the first client device. At block B566, the network device(s) determine at least one second A/V doorbell within at least one predefined distance from the first A/V doorbell. At block B568, the network device(s) transmit a share notification signal to the at least one second client device corresponding to the at least one determined second A/V doorbell. At block B670, the network device(s) receive a playback request signal from the second client device. At block B672, the network device(s) transmits a third video signal to the second client device.

FIGS. 32-35 are screenshots of graphical user interfaces (GUIs) illustrating aspects of another process for sharing video footage from an A/V recording and communication device according to an aspect of the present disclosure. FIGS. 32-35 are described below from the perspective of a user operating his or her client device. Thus, the GUIs illustrated in FIGS. 32-35 are configured to be displayed on a display of the user's client device, such as a smartphone.

Figure 32:
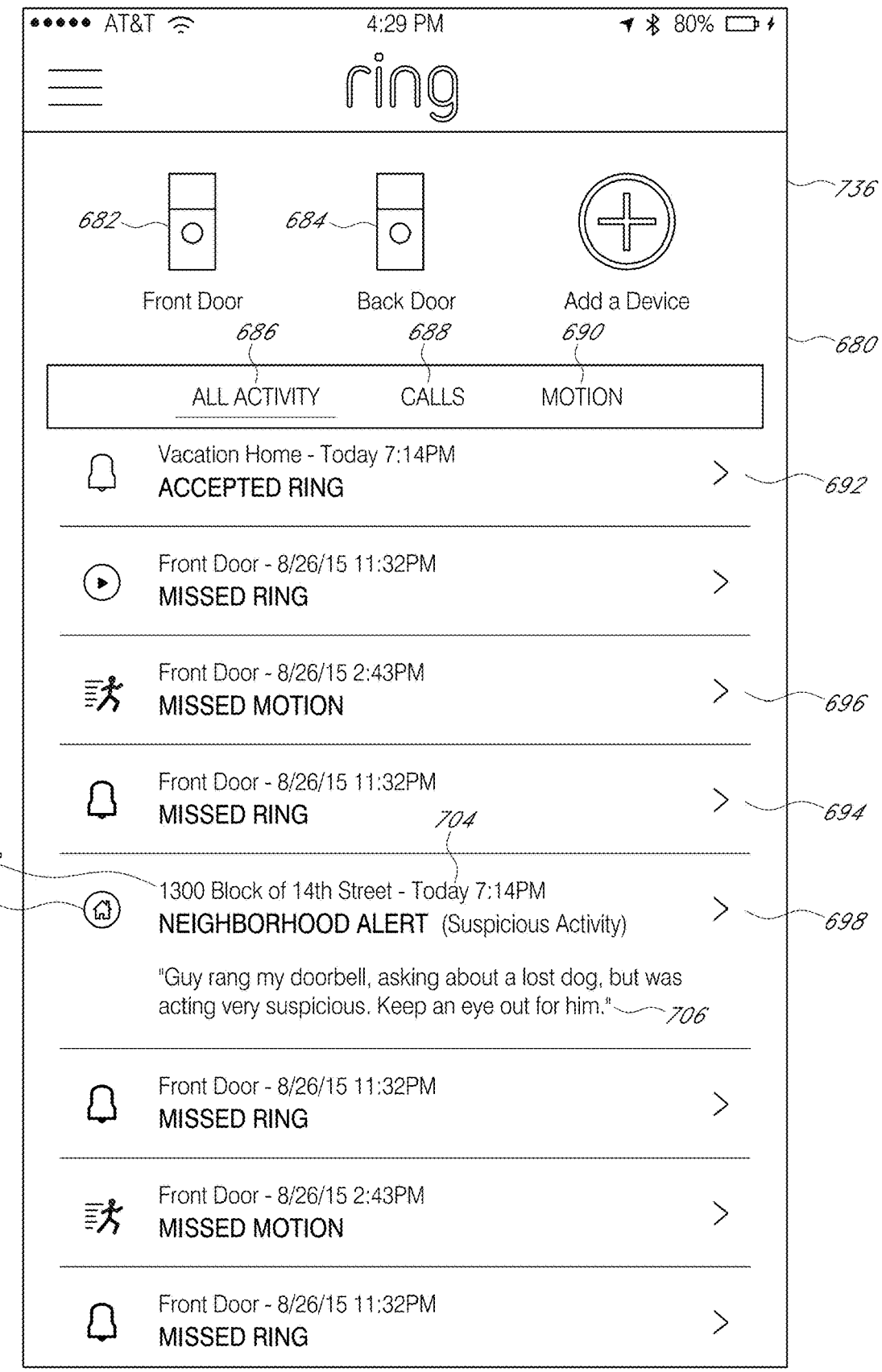
FIGS. 32-37 are screenshots of a graphical user interface (GUI) illustrating aspects of another process for sharing video footage from an A/V recording and communication device according to an aspect of the present disclosure.

With reference to FIG. 32, the GUI 680 includes buttons for each of the user's A/V recording and communication devices. For example, the GUI 680 of FIG. 32 includes a first button 682 for the doorbell located adjacent the user's front door and a second button 684 for the doorbell located adjacent the user's back door. The user may view video footage recorded by his or her devices by selecting from among the buttons 682, 684 corresponding to each device. The user may further view video footage organized by type by selecting from among a plurality of filter buttons 686, 688, 690. For example, the GUI 680 of FIG. 32 includes a first filter button 686 for ALL ACTIVITY, a second filter button 688 for CALLS (video recorded when the front button on the user's doorbell is pressed), and a third filter button 690 for MOTION (video recorded when the user's doorbell detects motion). When the user selects the ALL ACTIVITY filter button 686, a list 691 may be displayed on the GUI 680 that includes entries for all videos recorded by the user's device(s), as well as entries for all shared videos recorded by other users' devices in the user's "neighborhood," e.g. those devices determined according to the process described above with reference to FIGS. 18 and 19. For example, the list 691 of FIG. 32 includes entries labeled "ACCEPTED RING" 692 and "MISSED RING" 694, which correspond to videos recorded by the user's doorbell(s) in response to the button on the doorbell(s) being pressed. The list 691 further includes entries labeled "MISSED MOTION" 696, which correspond to videos recorded by the user's device(s) in response to motion being detected.

The list 691 of FIG. 32 further includes an entry labeled "NEIGHBORHOOD ALERT [Suspicious Activity]" 698. The neighborhood alert entry 698 may further include a neighborhood event icon 700, which identifies the entry 698 as corresponding to a shared video from another user's device in the user's "neighborhood." The neighborhood alert entry 698 may further include information about the shared video, including the approximate location 702 where it was recorded, the day and time 704 when it was recorded, and a textual description 706 of the video as provided by the user whose device recorded the video. If the user selects the neighborhood alert entry 698, a playback request signal 662 is sent from the user's client device to the network (FIG. 30), and a video signal 664 including the requested video is sent from the network to the user's client device. A GUI similar to that shown in FIG. 25 (but without the neighborhood share button) may then be shown on the display of the user's client device and the user may view the shared video.

Figure 33:
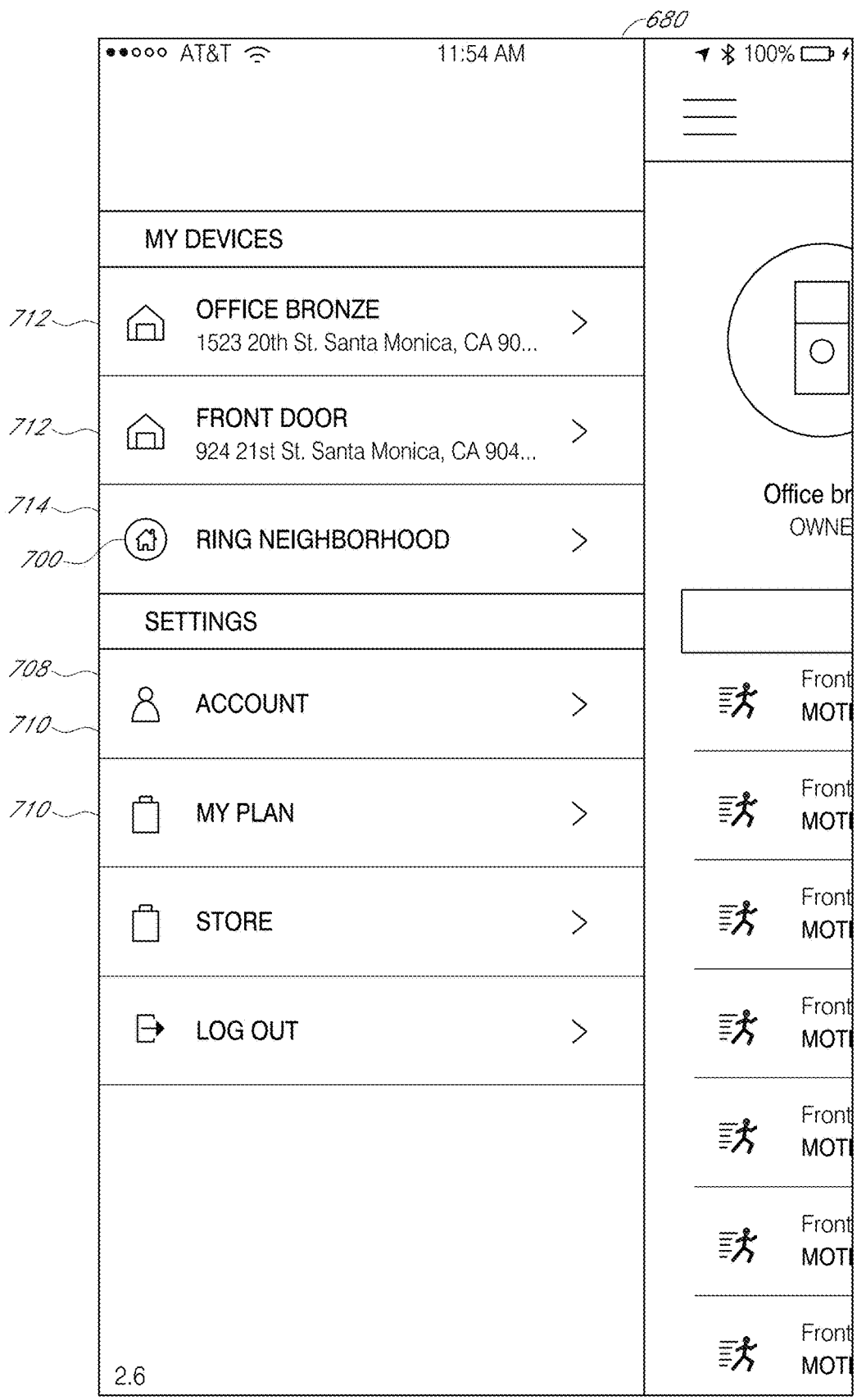

With reference to FIG. 33, the GUI 680 may further include a side menu 708. The side menu 708 may be accessed, for example, by touching the display of the user's client device and swiping to the right (if the display of the user's client device is a touchscreen). The side menu 708 may include buttons 710 for various settings, buttons 712 for each of the user's A/V recording and communication devices, as well as a NEIGHBORHOOD button 714. The NEIGHBORHOOD button 714 may further include the neighborhood event icon 700, which is described in the foregoing paragraph. When the user selects the NEIGHBORHOOD button 714, the NEIGHBORHOOD ACTIVITY screen 716 illustrated in FIG. 34 may be displayed on the display of the user's client device.

Figure 34:
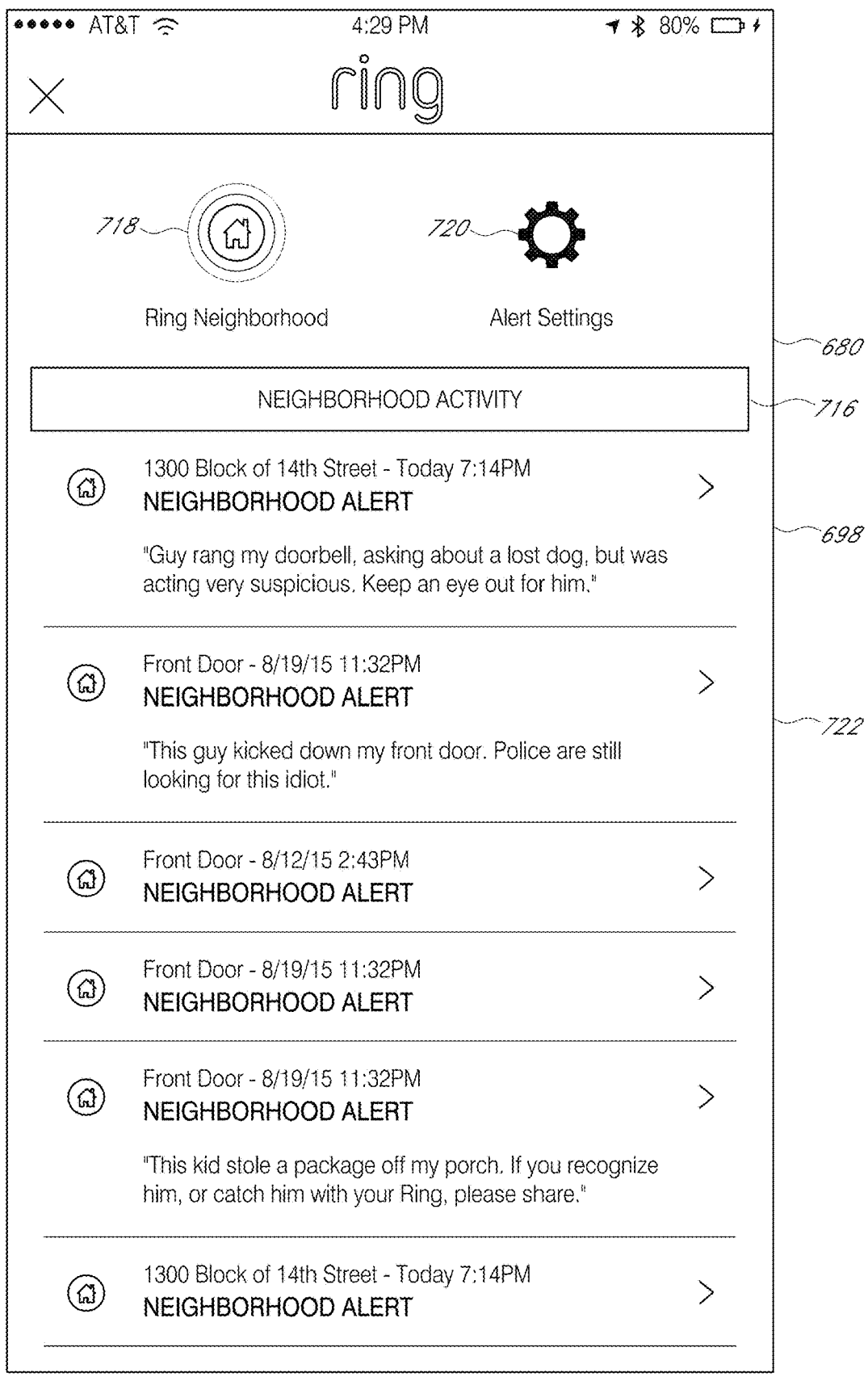
Figure 35:

With reference to FIG. 34, the NEIGHBORHOOD ACTIVITY screen 716 may include a Neighborhood button 718 and an Alert Settings button 720. When the user selects the Neighborhood button 718, a NEIGHBORHOOD ACTIVITY list 722 may be displayed on the GUI 680 that includes neighborhood alert entries 698 (the content and functionality of which is described above with respect to FIG. 32). With further reference to FIG. 34, when the user selects the Alert Settings button 720, if the user has A/V recording and communication devices at more than one location, then a Select a Neighborhood screen 724 may be displayed on the display of the user's client device, as shown in FIG. 35. The Select a Neighborhood screen 724 may include a list 726 having entries corresponding to each location (e.g. each "neighborhood") where the user has at least one A/V recording and communication device. For example, the list 726 of FIG. 35 includes a first entry 728 for the user's home "neighborhood" and a second entry 730 for the user's office "neighborhood." In certain embodiments, if the user has more than one A/V recording and communication device at a given location, only one entry may be displayed per location. For example, if the user has two doorbells and one security camera at a given address, only one entry appears in the list 726 for that location, and the entry covers all three devices at that location. If the user has one or more A/V recording and communication devices at another location, another entry appears in the list 726 for that other location. Also in certain embodiments, the entries in the list 726 may comprise addresses rather than, or in addition to, names. For example, rather than the first entry 728 being labeled "Home" and the second entry 730 being labeled "Office," the first entry 728 may be labeled "123 Main Street" and the second entry 730 may be labeled "456 First Street."

Figure 36:
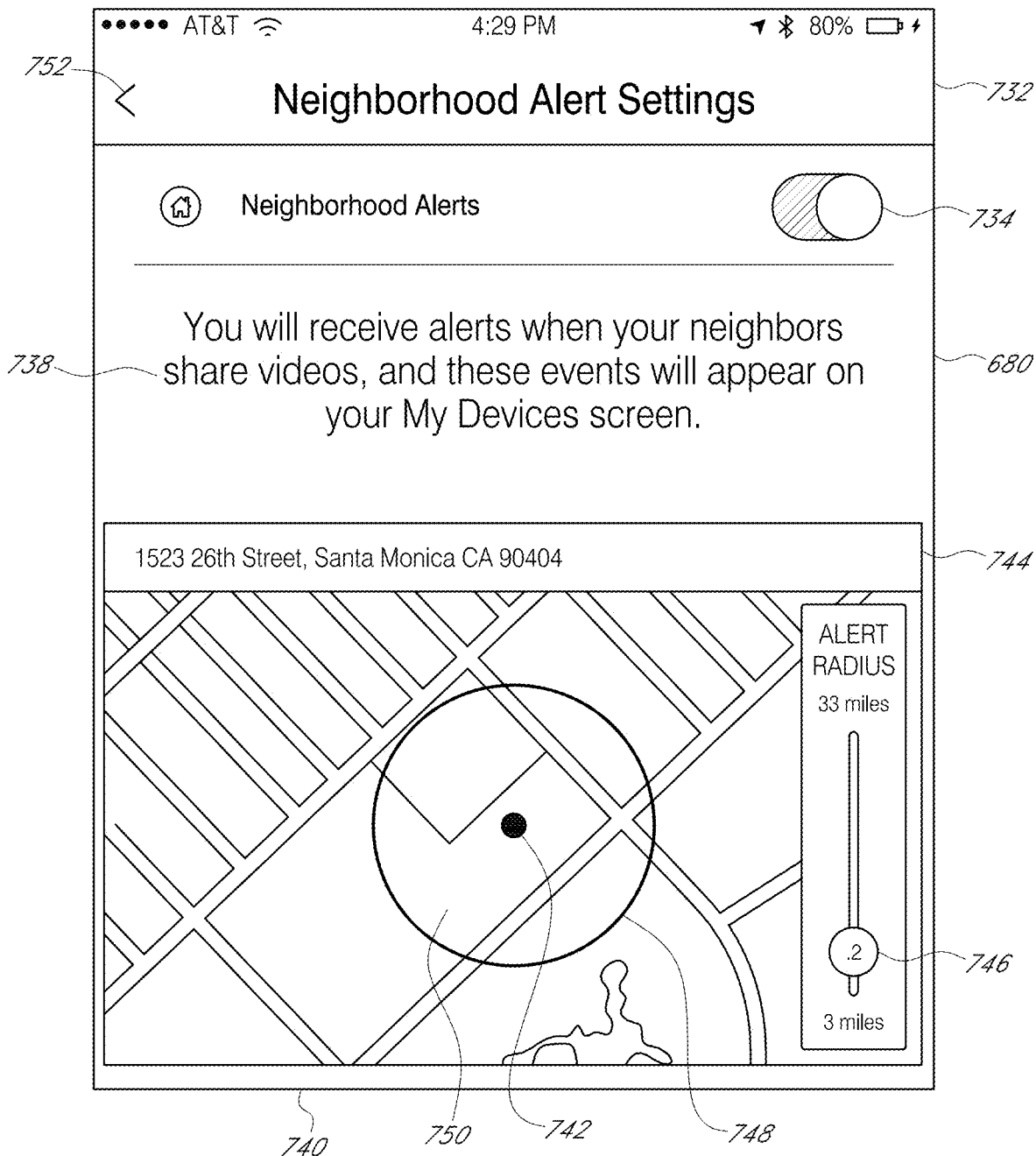
Figure 37:
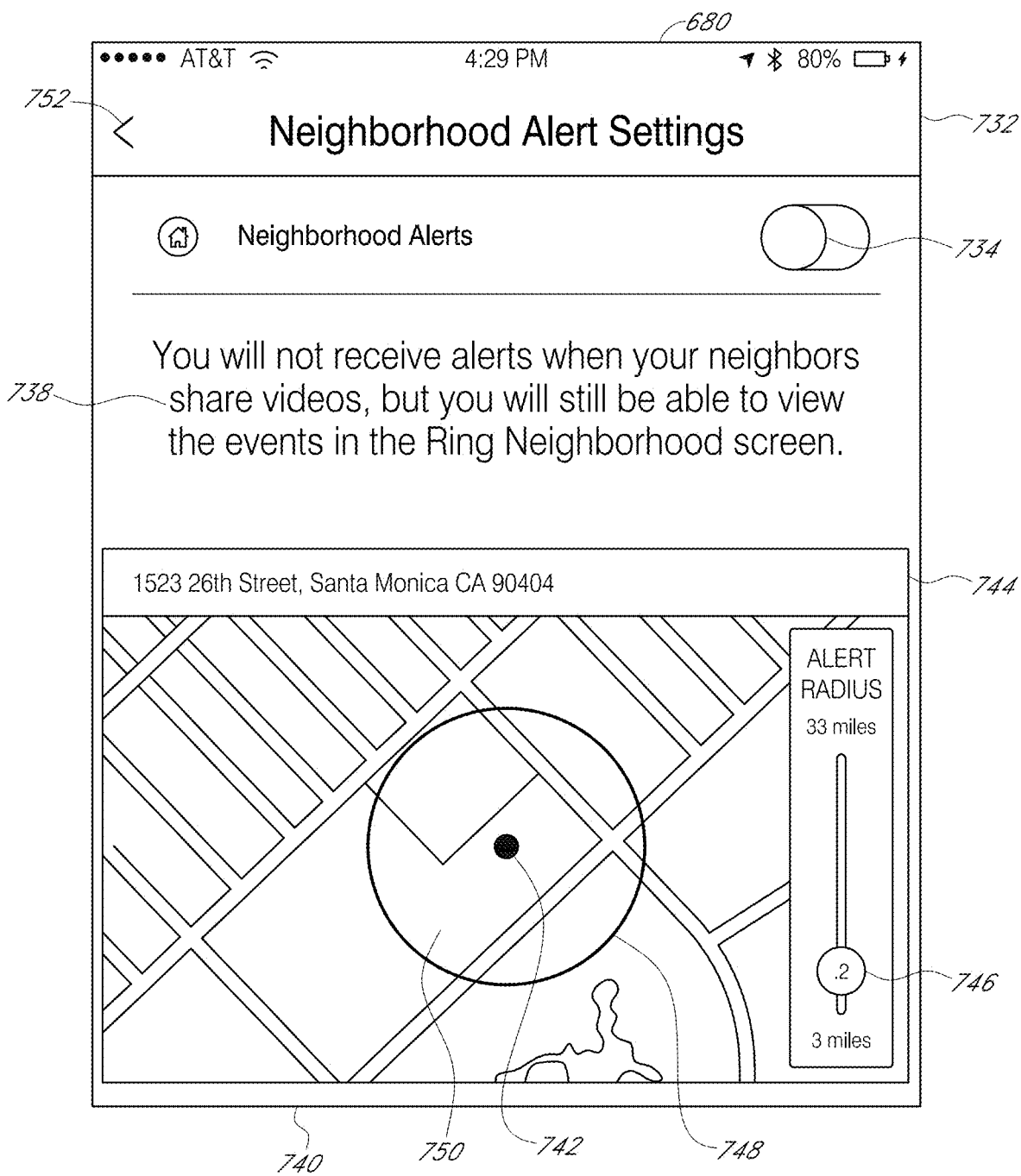

If, however, the user does not have A/V recording and communication devices at more than one location, then when the user selects the Alert Settings button 720 (FIG. 34) a Neighborhood Alert Settings screen 732 may be displayed on the display of the user's client device, as shown in FIGS. 36 and 37. Further, if the user has A/V recording and communication devices at more than one location, then when the user selects one of the locations from the list 726 on the NEIGHBORHOOD ACTIVITY screen 716 of FIG. 35, then the Neighborhood Alert Settings screen 732 of FIGS. 36 and 37 may also be displayed on the display of the user's client device.

With reference to FIG. 36, the Neighborhood Alert Settings screen 732 includes an ON/OFF slider widget 734 that enables the user to toggle the video sharing feature on and off. When the ON/OFF slider widget 734 is in the ON position, as shown in FIG. 36, the user may receive sharing notifications (alerts) when other users in the user's "neighborhood" share videos, and shared videos may appear in the list 691 of events on the user's ALL ACTIVITY screen 736 (FIG. 32), as well as in the list 722 of events on the user's NEIGHBORHOOD ACTIVITY screen 716 (FIG. 34). In certain embodiments, the ON/OFF slider widget 734 may be in the ON position by default. When the ON/OFF slider widget 734 is in the OFF position, as shown in FIG. 37, the user may not receive sharing notifications (alerts) when other users in the user's "neighborhood" share videos, and shared videos may not appear in the list 691 of events on the user's ALL ACTIVITY screen 736 (FIG. 32), but shared videos may appear in the list 722 of events on the user's NEIGHBORHOOD ACTIVITY screen 716 (FIG. 34). The Neighborhood Alert Settings screen 732 further includes a text banner 738 that explains how the video sharing feature functions when the ON/OFF slider widget 734 is in the ON position (FIG. 36) and when the ON/OFF slider widget 734 is in the OFF position (FIG. 37).

With reference to FIG. 36, the Neighborhood Alert Settings screen 732 further includes a map 740. An indicator 742 on the map 740 indicates the location of the user's A/V recording and communication device(s) corresponding to the location selected from the list 724 of FIG. 35 (or corresponding to the single location at which the user has at least one A/V recording and communication device, if the user does not have A/V recording and communication devices at more than one location). In the illustrated embodiment, the indicator 742 comprises a dot, but in other embodiments the indicator 742 may comprise any other type of indicator, such as a pin, for example. The Neighborhood Alert Settings screen 732 further includes a text banner 744 that provides the street address of the location corresponding to the indicator 742 on the map 740.

With further reference to FIG. 36, the Neighborhood Alert Settings screen 732 further includes a slider widget 746 for adjusting the alert radius around the user's A/V recording and communication device(s) at the location indicated on the map 740. A circle 748 around the indicator 742 on the map 740 identifies the outer boundary of the area 750 from which the user will receive share notifications from other users. An area 750 within the circle 748 may be shaded, as indicated in FIG. 36. To adjust the size of the area 750, the user adjusts the length of the alert radius by moving the slider widget 746 up or down. In the illustrated embodiment, moving the slider widget 746 up increases the size of the area 750 (and the alert radius), while moving the slider widget 746 down decreases the size of the area 750 (and the alert radius). As the slider widget 746 is moved up and down, the size of the circle 748 around the indicator 742 may increase and decrease to provide the user with a visual representation of the area 750 covered as the length of the alert radius increases and decreases. In some embodiments, the map 740 may have a default scale. As the user moves the slider widget 746 up to increase the size of the alert radius, if the circle 748 reaches the edges of the map 740, then the map 740 may begin to scale down so that the entire alert area 750 is always visible on the map 740.

When the user adjusts the size of the alert radius, the user's client device may send an alert radius adjustment signal to the network and the network may update a data structure with the changed size of the user's alert radius. For example, with further reference to FIG. 36, the user may adjust the size of the alert radius by moving the slider widget 746 up or down. To confirm the change, the user may select a back arrow 752 on the GUI 680 to return to the previous screen within the application executing on the user's client device. When the user selects the back arrow 752, the alert radius adjustment signal is sent to the network and the network updates the data structure with the changed size of the user's alert radius. In some embodiments, if the user exits the application without selecting the back arrow 752, then the adjustment of the alert radius may be discarded (the size of the alert radius may remain unchanged).

With further reference to FIG. 36, the magnitude of the alert radius may be indicated by a number on the slider widget 746. For example, in FIG. 36 the alert radius is set at 0.2 miles, as indicated by the number 0.2 on the slider widget 746. Maximum and/or minimum magnitudes of the alert radius may be indicated by numbers at opposite ends of the slider widget 746. For example, in FIG. 36 the maximum alert radius is indicated as 10 miles at the upper end of the slider widget 746, while the minimum alert radius is indicated as 0.1 miles at the lower end of the slider widget 746. It should be appreciated that the maximum and minimum magnitudes shown in FIGS. 36 and 37 are just examples and are not limiting.

In certain embodiments, the magnitude of the alert radius may be dynamically set based on the number of other A/V recording and communication devices around the location indicated on the map 740. For example, the alert radius may be set such that the resulting defined area 750 around the user's A/V recording and communication device encompasses at least a minimum threshold number of other A/V recording and communication devices. Alternatively, the alert radius may be set such that the resulting defined area 750 around the user's A/V recording and communication device encompasses no more than a maximum threshold number of other A/V recording and communication devices. Still further, the alert radius may be set such that the resulting defined area 750 around the user's A/V recording and communication device encompasses a number of other A/V recording and communication devices that falls within a defined range. In certain embodiments, the magnitude of the alert radius may be dynamically adjusted as the number of other A/V recording and communication devices around the user's device changes. Thus, as more A/V recording and communication devices are added around the user's device, the size of the alert radius may be decreased so that the number of other A/V recording and communication devices in the defined area 750 remains about the same. Conversely, as A/V recording and communication devices are removed (or deactivated) from the area 750 around the user's device, the size of the alert radius may be increased so that the number of other A/V recording and communication devices in the defined area 750 remains about the same. In certain embodiments, the user may override the dynamic setting and/or adjustment of the magnitude of the alert radius by manually selecting the magnitude of the alert radius by moving the slider widget 746 as described above with reference to FIG. 36.

In some embodiments, the defined alert area about a user's A/V recording and communication device may not have a circular outer boundary. For example, a user may define an alert area about his or her A/V recording and communication device that has a non-circular shape, such as square, rectangular, or any other shape, including irregular polygons. The shape of the alert area may also extend a greater distance from A/V recording and communication device in one direction than in another direction. For example, if an A/V recording and communication device is located in a coastal area, or on a lakefront, or on an edge of an uninhabited area (such as a desert), or on an edge of a restricted area (such as a military base), then the user may not want the alert area to extend over the water, or desert, or military base, etc., but the user may want the alert area to extend a substantial distance in directions away from the water, or desert, or military base, etc. In such embodiments, the A/V recording and communication device would not be located at the center of the defined alert area.

Figure 38:
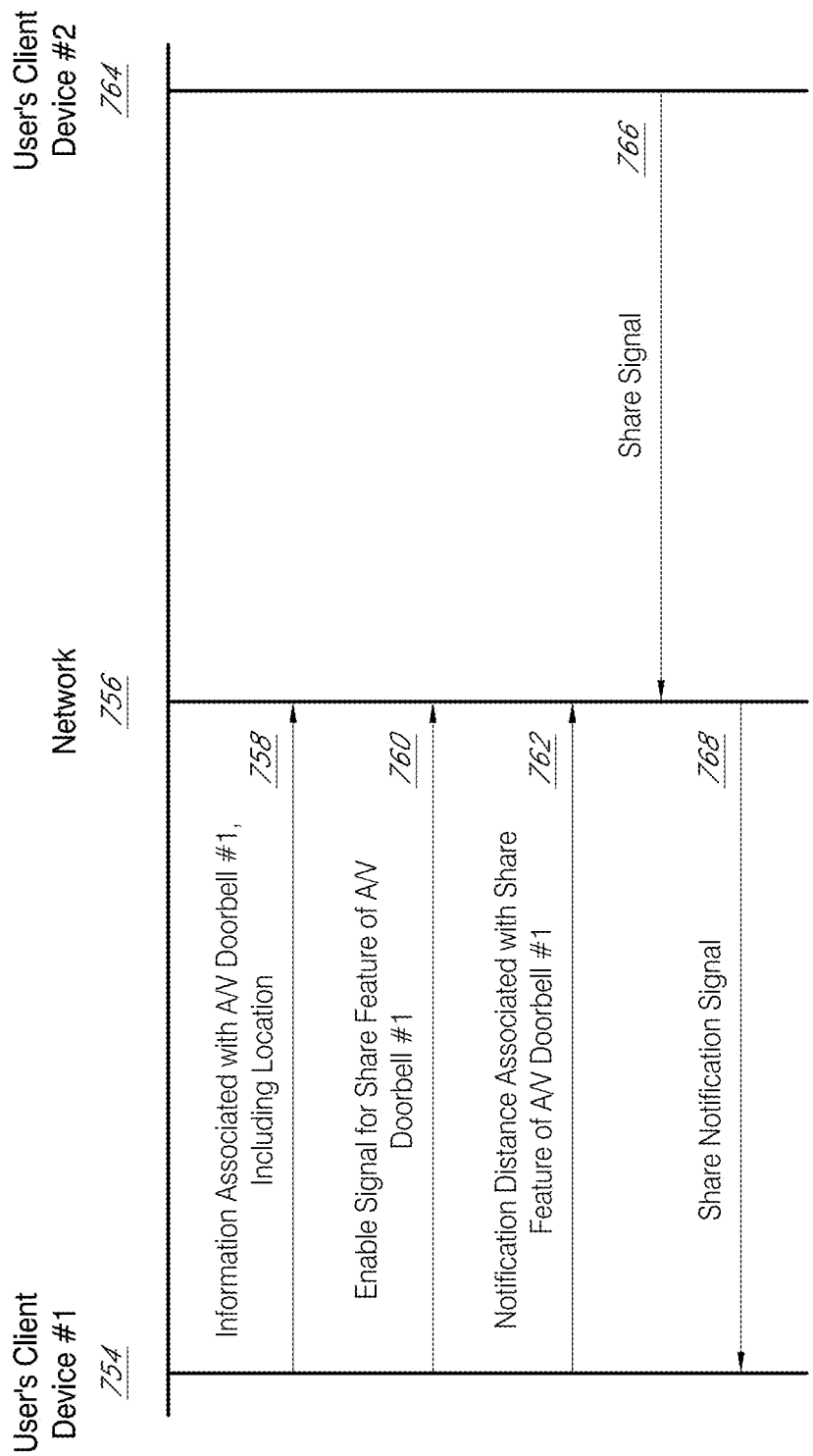
FIG. 38 is a sequence diagram illustrating another process for sharing video footage from an A/V recording and communication doorbell according to an aspect of the present disclosure.

FIG. 38 is a sequence diagram illustrating another process for sharing video footage from an A/V recording and communication doorbell according to an aspect of the present disclosure. In the process of FIG. 38, a new A/V recording and communication device is activated and connected to the network. In certain embodiments, some aspects of the activation/setup/connection process may be carried out using an application executing on the user's client device. Thus, with reference to FIG. 38, the user's client device 754 (User's Client Device #1) may send to the network 756, and the network 756 may receive from the user's client device 754, information 758 associated with the user's A/V recording and communication device (A/V Doorbell #1). The information 758 may include, for example, the location of the user's A/V recording and communication device. The location may comprise the street address of a building with which the user's A/V recording and communication device is associated, such as being secured thereto, for example. The user's client device 754 may further send to the network 756, and the network 756 may further receive from the user's client device 754, an enable signal 760 for the video sharing feature of the user's A/V recording and communication device. For example, during the setup process the user may enable (turn on) the video sharing feature using a GUI such as that illustrated in FIG. 36. In some embodiments, the video sharing feature may be enabled by default, such that the user does not have to take any affirmative steps to enable the video sharing feature.

With further reference to FIG. 38, the user's client device 754 may further send to the network 756, and the network 756 may further receive from the user's client device 754, a notification distance (alert radius) 762 associated with the video sharing feature of the user's A/V recording and communication device. For example, during the setup process the user may select an alert radius 762 using a GUI such as that illustrated in FIG. 36. In some embodiments, the alert radius 762 may be set automatically to a default value, or may be set automatically according to the criteria described above, such that the user does not have to take any affirmative steps to set the alert radius 762. The alert radius 762 defines an area around the user's A/V recording and communication device that encompasses at least one other A/V recording and communication device, which in this example will be referred to as A/V Doorbell #2. A/V Doorbell #2 may record video footage, and the user associated with A/V Doorbell #2 may share the recorded video footage according to a process described herein. Thus, with further reference to FIG. 38, the client device associated with A/V Doorbell #2 (User's Client Device #2 764) may send to the network 756, and the network 756 may receive from User's Client Device #2 764, a share signal 766. The network 756, after determining that A/V Doorbell #2 764 is within the alert area defined around A/V Doorbell #1, may then send a share notification signal 768 to the client device associated with A/V Doorbell #1 (User's Client Device #1 754).

Figure 39:
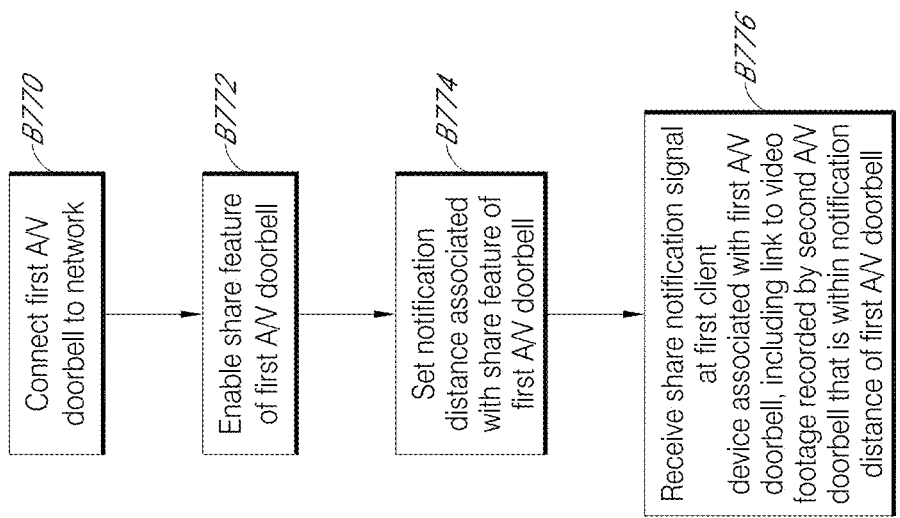
FIG. 39 is a flowchart illustrating another process for sharing video footage from an A/V recording and communication doorbell according to an aspect of the present disclosure.
Figure 40:
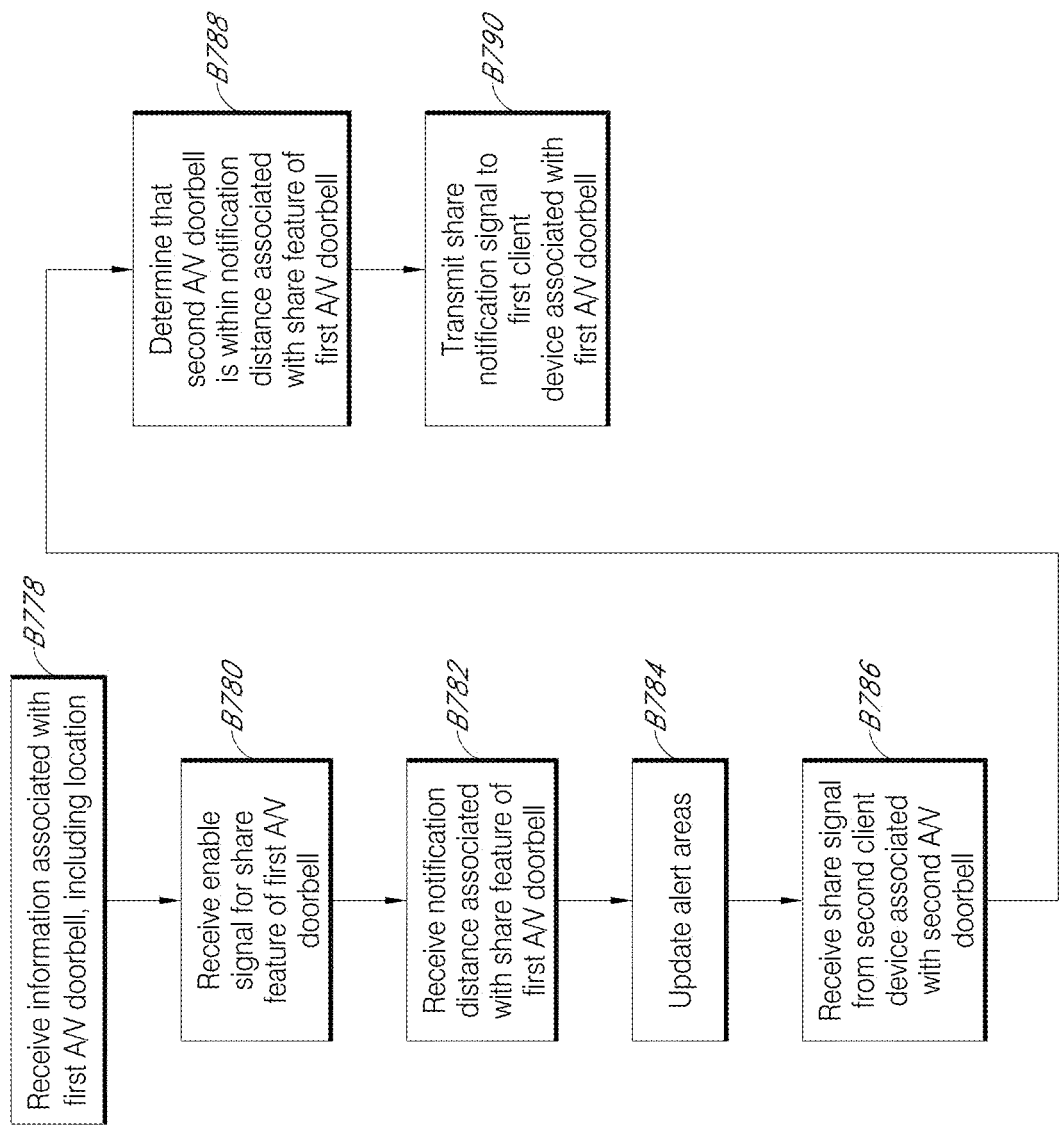
FIG. 40 is a flowchart illustrating another process for sharing video footage from an A/V recording and communication doorbell according to an aspect of the present disclosure.

FIGS. 39 and 40 are flowcharts illustrating other processes for sharing video footage from an A/V recording and communication doorbell according to an aspect of the present disclosure. FIG. 39 is described from the perspective of the user, while FIG. 40 is described from the perspective of the network device(s). Thus, with reference to FIG. 39, at block B770 the user may activate a new A/V recording and communication device and connect it to the network. As described above, some aspects of the activation/setup/connection process may be carried out using an application executing on the user's client device. At block B772, the user may enable the video sharing feature of the user's A/V recording and communication device, and at block B774 the user may set a notification distance (alert radius) associated with the video sharing feature of the user's A/V recording and communication device. As described above, these aspects of the activation/setup/connection process may be automated, such that the user does not have to take any affirmative steps. The alert radius defines an area around the user's A/V recording and communication device that encompasses at least one other A/V recording and communication device, which in this example will be referred to as a second A/V doorbell. The second A/V doorbell may record video footage, and the user associated with the second A/V doorbell may share the recorded video footage according to a process described herein. The client device associated with the second A/V doorbell may send to the network, and the network may receive from the second A/V doorbell, a share signal. The network, after determining that the second A/V doorbell is within the alert area defined around A/V Doorbell #1, may then send a share notification signal to the client device associated with A/V Doorbell #1 (first client device). Thus, at block B776 the first client device may receive the share notification signal, including a link to the video footage recorded by the second A/V doorbell that is within the notification distance (alert radius) of the first A/V doorbell.

With reference to FIG. 40, at block B778 the network may receive from the user's client device information associated with the user's A/V recording and communication device (first A/V doorbell). The information may include, for example, the location of the first A/V doorbell. The location may comprise the street address of a building with which the first A/V doorbell is associated, such as being secured thereto, for example. At block B780, the network may further receive from the user's client device, an enable signal for the video sharing feature of the first A/V doorbell. For example, during the setup process the user may enable (turn on) the video sharing feature using a GUI such as that illustrated in FIG. 36. In some embodiments, the video sharing feature may be enabled by default, such that the user does not have to take any affirmative steps to enable the video sharing feature.

With further reference to FIG. 40, at block B782 the network may further receive from the user's client device a notification distance (alert radius) associated with the video sharing feature of the first A/V doorbell. For example, during the setup process the user may select an alert radius using a GUI such as that illustrated in FIG. 36. In some embodiments, the alert radius may be set automatically to a default value, or may be set automatically according to the criteria described above, such that the user does not have to take any affirmative steps to set the alert radius. At block B784, the network may update one or more data structures (alert areas) with the information received about the first A/V doorbell, including its location and/or its alert radius.

The alert radius defines an area around the first A/V doorbell that encompasses at least one other A/V recording and communication device, which in this example will be referred to as second A/V doorbell. The second A/V doorbell may record video footage, and the user associated with the second A/V doorbell may share the recorded video footage according to a process described herein. Thus, with further reference to FIG. 40, at block B786 the network may receive from the second client device a share signal. The network, after determining, at block B788, that the second A/V doorbell is within the alert area defined around the first A/V doorbell, may then send a share notification signal to the client device associated with the first A/V doorbell at block B790.

Figure 41:
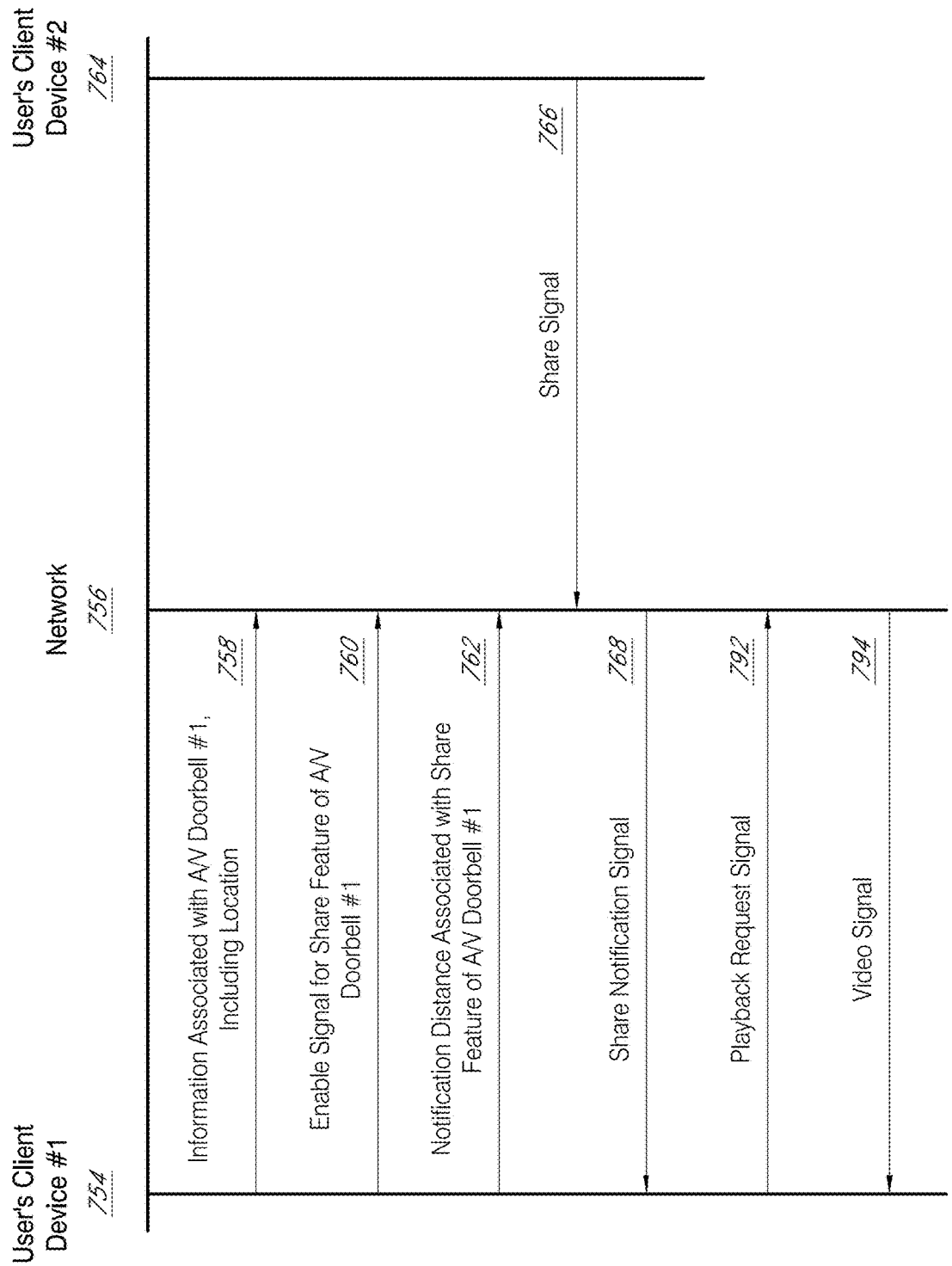
FIG. 41 is a sequence diagram illustrating another process for sharing video footage from an A/V recording and communication doorbell according to an aspect of the present disclosure.

FIG. 41 is a sequence diagram illustrating another process for sharing video footage from an A/V recording and communication doorbell according to an aspect of the present disclosure. The process of FIG. 41 includes aspects of the process of FIG. 38, including the user's client device 754 (User's Client Device #1) sending to the network 756 (and the network 756 receiving from the user's client device 754, information 758 associated with the user's A/V recording and communication device (A/V Doorbell #1), the user's client device 754 further sending to the network 756 (and the network 756 further receiving from the user's client device 754) an enable signal 760 for the video sharing feature of the user's A/V recording and communication device, the user's client device 754 further sending to the network 756 (and the network 756 further receiving from the user's client device 754) a notification distance (alert radius) 762 associated with the video sharing feature of the user's A/V recording and communication device, the second client device 764 (User's Client Device #2) sending a share signal 766 to the network 756 (and the network 756 receiving the share signal 766 from the second client device 764), and the network device(s) 756 transmitting a share notification signal 768 to the user's client device 754.

The process of FIG. 41 further comprises the user's client device 754 sending a playback request signal 792 to the network 756 (and the network 756 receiving the playback request signal from the user's client device 754), and the network device(s) 756, in response to receiving the playback request signal 792 from the user's client device 754, transmitting a video signal 794 to the user's client device 754, the video signal 794 including the shared video footage recorded by A/V Doorbell #2. For example, User's Client Device #1 754 may receive the share notification signal 768, which may be, for example, a push notification. The user associated with User's Client Device #1 754 may then choose to view the shared video footage, such as by selecting a "VIEW NOW" button (or an "OK" button, etc.) in the push notification. Alternatively, the user may ignore the share notification signal 768, but may subsequently request to view the shared video footage through one or more screens/menus within an application executing on User's Client Device #1 754, as described above. The playback request signal 768 is then sent to the network 756, and the shared video footage is sent to User's Client Device #1 754 in the video signal 794.

Figure 42:
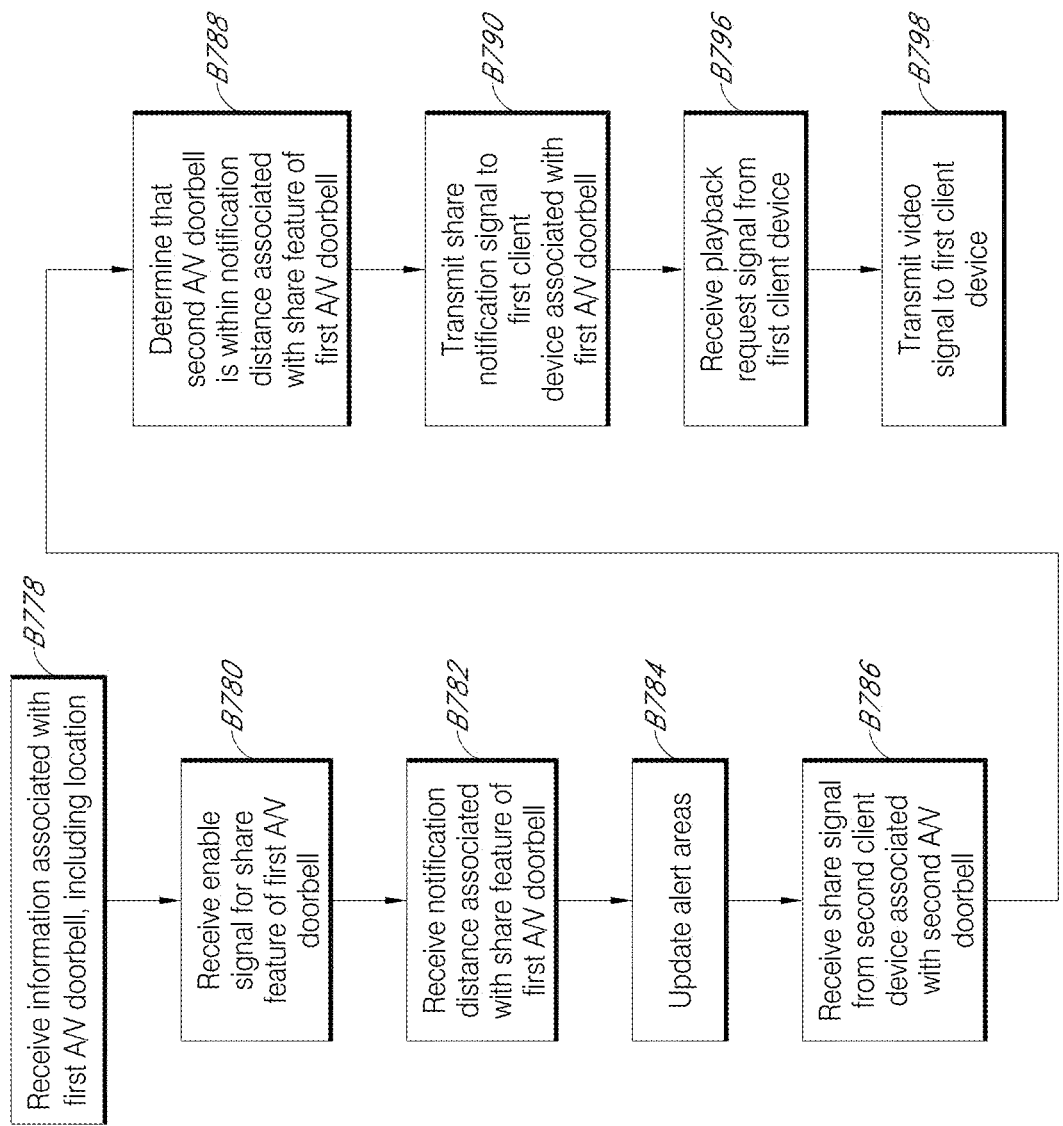
FIG. 42 is a flowchart illustrating another process for sharing video footage from an A/V recording and communication doorbell according to an aspect of the present disclosure.

FIG. 42 is a flowchart illustrating another process for sharing video footage from an A/V recording and communication doorbell according to an aspect of the present disclosure. The process of FIG. 42 is described from the perspective of the network device(s). Thus, at block B778 the network receives from the user's client device information associated with the user's A/V recording and communication device (first A/V doorbell). The information may include, for example, the location of the first A/V doorbell. The location may comprise the street address of a building with which the first A/V doorbell is associated, such as being secured thereto, for example. At block B780, the network may further receive from the user's client device, an enable signal for the video sharing feature of the first A/V doorbell. For example, during the setup process the user may enable (turn on) the video sharing feature using a GUI such as that illustrated in FIG. 36. In some embodiments, the video sharing feature may be enabled by default, such that the user does not have to take any affirmative steps to enable the video sharing feature.

With further reference to FIG. 42, at block B782 the network may further receive from the user's client device a notification distance (alert radius) associated with the video sharing feature of the first A/V doorbell. For example, during the setup process the user may select an alert radius using a GUI such as that illustrated in FIG. 36. In some embodiments, the alert radius may be set automatically to a default value, or may be set automatically according to the criteria described above, such that the user does not have to take any affirmative steps to set the alert radius. At block B784, the network may update one or more data structures (alert areas) with the information received about the first A/V doorbell, including its location and/or its alert radius.

The alert radius defines an area around the first A/V doorbell that encompasses at least one other A/V recording and communication device, which in this example will be referred to as second A/V doorbell. The second A/V doorbell may record video footage, and the user associated with the second A/V doorbell may share the recorded video footage according to a process described herein. Thus, with further reference to FIG. 40, at block B786 the network may receive from the second client device a share signal. The network, after determining, at block B788, that the second A/V doorbell is within the alert area defined around the first A/V doorbell, may then send a share notification signal to the client device associated with the first A/V doorbell at block B790. At block B796, the network receives a playback request signal from the first client device. At block B798, the network transmits a video signal to the first client device.

Figure 43:
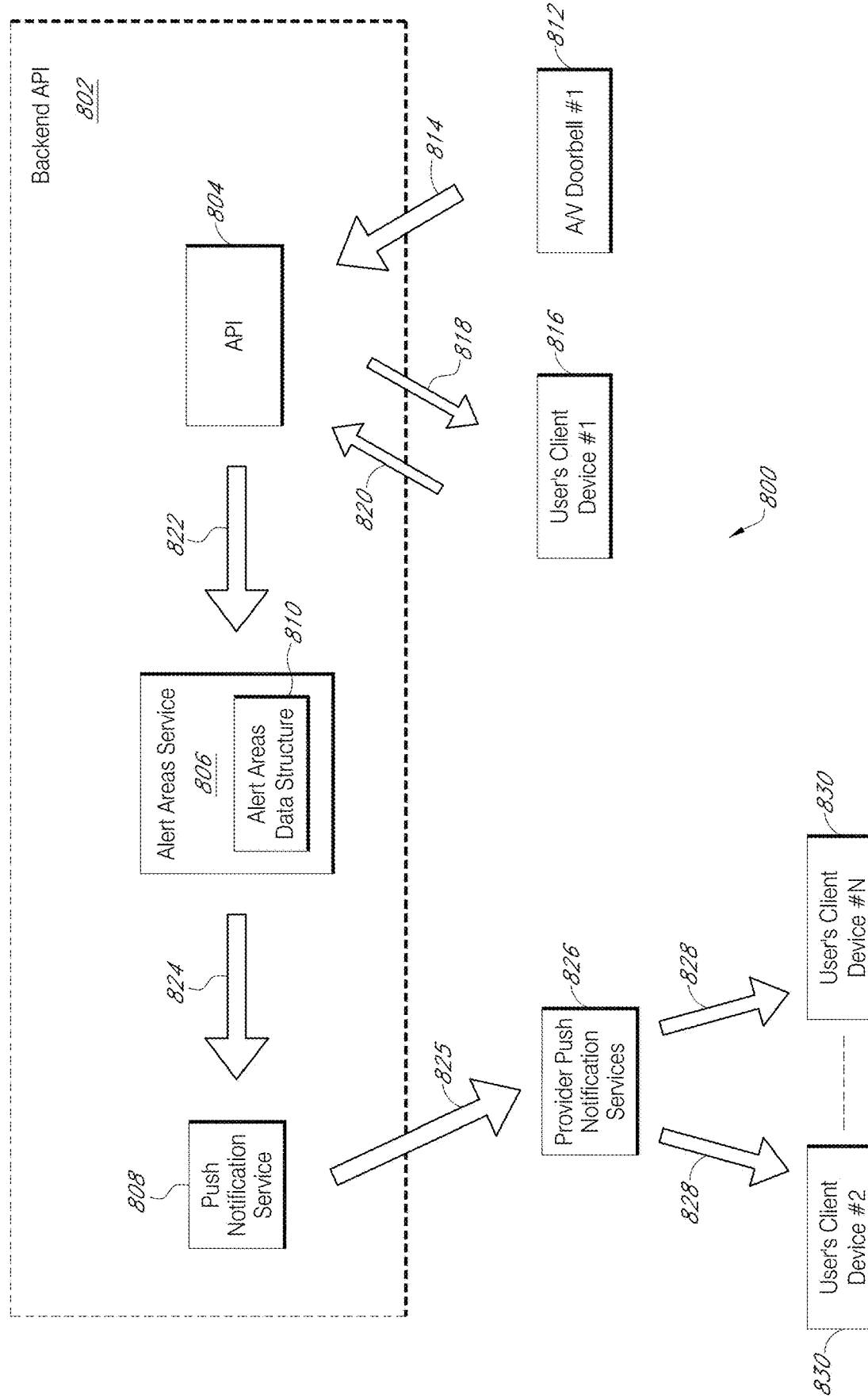
FIG. 43 is a functional block diagram illustrating a system for sharing video footage from A/V recording and communication devices according to the present embodiments.

FIG. 43 is a functional block diagram illustrating a system 800 for sharing video footage from audio/video recording and communication devices according to the present embodiments. The system 800 may comprise a backend API 802 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 802 illustrated FIG. 43 may include one or more APIs 804. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 802 illustrated in FIG. 43 may further include one or more services 806, 808 (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

The backend API 802 illustrated in FIG. 43 includes an alert areas service 806. The alert areas service 806 may comprise one or more data structures 810 storing information about a plurality of A/V recording and communication devices. For example, the information may include the location of each device (such as the street address of each device), and the size of the alert radius around each device. The alert areas service 806 may access the information in the data structure(s) 810 when needed to determine which users will receive a share notification when a first user shares recorded video footage, as further described below. The alert areas service 806 may also maintain the information in the data structure(s) 810 and update the information in the data structure(s) 810 when new A/V recording and communication devices are activated, when existing A/V recording and communication devices are deactivated, and/or when the alert radii around existing A/V recording and communication devices are changed.

In the system 800 of FIG. 43, a first A/V recording and communication device 812 (A/V Doorbell 812 #1) may record video footage, which may also include audio. The doorbell 812 sends a first alert signal and a first video signal 814 to the API 804, and the API 804 receives the first alert signal and the first video signal 814. The first video signal includes images (the video footage) captured by a camera of the doorbell 812. The API 804 transmits to a first client device 816 (User's Client Device #1), in response to receiving the first alert signal and the first video signal 814, a second alert signal and a second video signal 818. The second alert signal may be, for example, a push notification. The second video signal includes the images captured by the camera of the doorbell 812. The user associated with the first client device 816 may be the owner/user of the doorbell 812 (A/V Doorbell #1). The user, upon receiving the second alert signal, may choose to answer the second alert signal, which may, for example, open a live call between the user and the visitor at the doorbell 812. Alternatively, the user may ignore the second alert signal (e.g. choose not to answer the call). If the user ignores the second alert signal, he or she may still view the video footage of the second video signal at a later time. After viewing (or while viewing) the video footage on the display of his or her client device 816, the user may decide to share the video footage with other users. For example, the user may tap a "share" button from within an application executing on his or her client device 816. The first client device 816 then sends a share signal 820 to the API 804, and the API 804 receives the share signal 820 from the first client device 816. The share signal 820 may include text describing the images captured by the camera of the doorbell 812 (A/V Doorbell #1). In response to receiving the share signal 820 from the first client device 816, the API 804 sends identifying information 822 to the alert areas service 806. For example, the identifying information 822 may include an identifier for the user associated with A/V Doorbell #1 and an identifier for the video footage that is to be shared with other users. Alternatively, the identifying information 822 may include an identifier for A/V Doorbell #1 (rather than an identifier for the user associated with A/V Doorbell #1) and an identifier for the video footage that is to be shared with other users. The alert areas service 806 accesses the alert areas data structure(s) 810 and determines, based on the identifying information 822, the other users who are to receive a notification of the shared video footage. For example, the alert areas service 806, using the information stored in the alert areas data structure(s) 810 may determine that A/V Doorbell #1 812 is within the alert radius defined around at least one other A/V recording and communication device. Once the other device(s) has/have been identified, the alert areas service 806 may transmit a share notification signal 824 to a push notification service 808. The share notification signal 824 may include the text describing the images captured by the camera of the doorbell 812 (A/V Doorbell #1). The push notification service 808 may then forward one or more push notifications 825 to a plurality of provider push notification services 826. The provider push notification services 826 are configured to send push notifications to client devices that run different operating systems. For example, Android devices may receive push notifications from an Android push notification service 826, while iOS devices may receive push notifications from an iOS push notification service 826. Android is a mobile operating system (OS) developed by Google, based on the Linux kernel. iOS, by contrast, is a mobile operating system created and developed by Apple Inc. and distributed exclusively for Apple hardware. The provider push notification services 826 then send push notifications 828 to the client devices 830 associated with the other doorbell(s) identified by the alert areas service 806. The other user(s), upon receiving the push notifications 828, may choose to view the shared video footage. Alternatively, the other user(s) may ignore the push notifications 828. If the other user(s) ignores the push notifications 828, he or she may still view the shared video footage at a later time. In either event (viewing the shared video footage right away or viewing the shared video footage at a later time), one or more of the client devices 830 sends a playback request signal (not shown) to the backend API 802 (and the backend API 802 receives the playback request signal from the one or more of the client devices 830). In response to receiving the playback request signal from the one or more of the client devices 830, the backend API 802 transmits a video signal (not shown) to the one or more of the client devices 830. The video signal includes the shared video footage. In certain embodiments, the alert areas service 806 may receive the playback request signal from the one or more of the client devices 830 and transmit the video signal to the one or more of the client devices 830. If the other user(s) opens the push notification, which may contain a reference to the shared video footage, the other user(s) client device(s) 830 may use the API 804 to get the URL (Uniform Resource Locator) of the shared video footage and any other metadata (if any) about the shared video footage so that the shared video footage can be played back. If the other user(s) opens the shared video footage from the NEIGHBORHOOD ACTIVITY screen 716 (FIG. 34), a similar process may occur, but the reference to the shared video footage may be in the activity feed item.

In some embodiments, an A/V recording and communication device may begin recording video footage not in response to a visitor being detected, but rather when a user accesses the camera of the device to view live video footage using his or her client device (e.g. "on-demand" viewing). In such embodiments, a process for sharing a video may include a step of the user accessing the camera of the device to view live video footage using his or her client device (e.g. "on-demand" viewing), followed by the user sharing the live video footage. For example, the user may select a share button from within an application executing on the user's client device (similar to the share button 584 described above with respect to FIGS. 20 and 21), and a share signal may then be sent from the user's client device and received by the network device(s) (similar to step 548 described above with respect to FIG. 18), and a share notification signal may then be sent from the network device(s) and received by another client device(s) (similar to step 550 described above with respect to FIG. 18). Example embodiments of video-on-demand are described in U.S. patent application Ser. Nos. 62/267,762 and 62/289,114, both of which are incorporated herein by reference in their entireties as if fully set forth.

As described above, the present embodiments advantageously enable users of A/V recording and communication devices to share video footage with one another. This feature can help reduce crime by increasing public awareness of suspicious activity. Users can tailor the number and frequency of alerts (notifications of shared videos) they receive by increasing and decreasing the size of the alert radius around their own A/V recording and communication device(s). Users will only receive alerts that result from videos recorded by other A/V recording and communication devices that are located within the alert area that the user has set. Users may share videos as frequently or as infrequently as desired, and users may view shared videos from other users as frequently or as infrequently as desired. When a user receives an alert, he or she can choose to view the accompanying video immediately, or to ignore the alert. If the user ignores the alert, he or she can still view the video at a later time using one or more menu screens within an application executing on the user's client device. The present embodiments thus advantageously provide a tool that can be used to reduce crime rates and that can be tailored by each user to meet his or her personal preferences.

The present embodiments describe numerous ways for sharing videos, including via social media and/or social network(s). A social network may comprise a third-party network, such as NEXTDOOR®, FACEBOOK®, INSTAGRAM®, TWITTER®, etc. A social network may also comprise a network made up of users of A/V recording and communication devices, such as video doorbells and security cameras. For example, when a user shares a video via the neighborhood share button 584 described above with respect to FIGS. 20, 21, 25, and 26, the video is shared with a social network in which the members of the social network are users who have A/V recording and communication devices, such as video doorbells and security cameras. The present embodiments are not limited to any particular kind or type of social network. Further, participants in the social network are not limited to users of A/V recording and communication devices of any particular kind or type.

In the present embodiments, some steps shown in one or more of the sequence diagrams and/or flowcharts may be omitted. For example, in the process for sharing video footage from a first A/V recording and communication device, such as shown in FIGS. 18 and 19, for example, the steps of transmitting/receiving the first alert signal and the first video signal and transmitting/receiving the second alert signal and the second video signal may be omitted. Such an embodiment might comprise, therefore, just the steps of transmitting/receiving the share signal transmitting/receiving the share notification signal.

Figure 44:
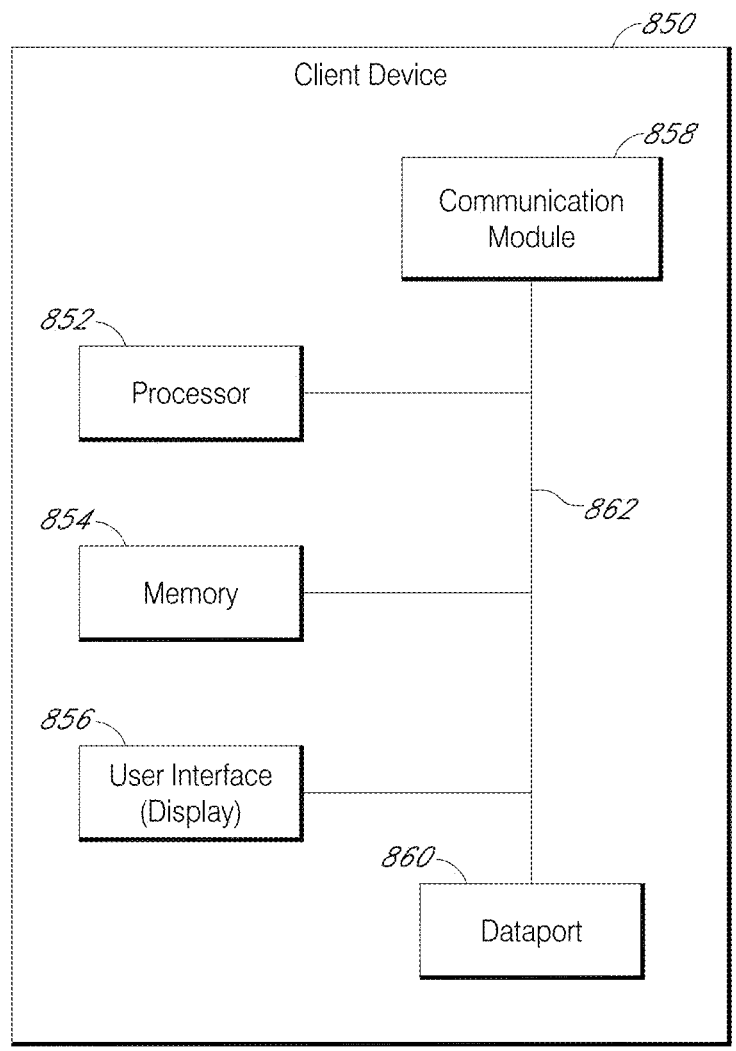
FIG. 44 is a functional block diagram of a client device on which the present embodiments may be implemented according to various aspects of the present disclosure.

FIG. 44 is a functional block diagram of a client device 850 on which the present embodiments may be implemented according to various aspects of the present disclosure. The user's client device 114 described with reference to FIG. 1 may include some or all of the components and/or functionality of the client device 850. The client device 850 may comprise, for example, a mobile phone such as a smartphone, or a computing device such as a tablet computer, a laptop computer, a desktop computer, etc.

With reference to FIG. 44, the client device 850 includes a processor 852, a memory 854, a user interface 856, a communication module 858, and a dataport 860. These components are communicatively coupled together by an interconnect bus 862. The processor 852 may include any processor used in smartphones and/or portable computing devices, such as an ARM processor (a processor based on the RISC (reduced instruction set computer) architecture developed by Advanced RISC Machines (ARM)). In some embodiments, the processor 852 may include one or more other processors, such as one or more conventional microprocessors, and/or one or more supplementary co-processors, such as math co-processors.

The memory 854 may include both operating memory, such as random access memory (RAM), as well as data storage, such as read-only memory (ROM), hard drives, flash memory, or any other suitable memory/storage element. The memory 854 may include removable memory elements, such as a CompactFlash card, a MultiMediaCard (MMC), and/or a Secure Digital (SD) card. In some embodiments, the memory 854 may comprise a combination of magnetic, optical, and/or semiconductor memory, and may include, for example, RAM, ROM, flash drive, and/or a hard disk or drive. The processor 852 and the memory 854 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 852 may be connected to the memory 854 via the dataport 860.

The user interface 856 may include any user interface or presentation elements suitable for a smartphone and/or a portable computing device, such as a keypad, a display screen, a touchscreen, a microphone, and a speaker. The communication module 858 is configured to handle communication links between the client device 850 and other, external devices or receivers, and to route incoming/outgoing data appropriately. For example, inbound data from the dataport 860 may be routed through the communication module 858 before being directed to the processor 852, and outbound data from the processor 852 may be routed through the communication module 858 before being directed to the dataport 860. The communication module 858 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 860 may be any type of connector used for physically interfacing with a smartphone and/or a portable computing device, such as a mini-USB port or an IPHONE®/IPOD® 30-pin connector or LIGHTNING® connector. In other embodiments, the dataport 860 may include multiple communication channels for simultaneous communication with, for example, other processors, servers, and/or client terminals.

The memory 854 may store instructions for communicating with other systems, such as a computer. The memory 854 may store, for example, a program (e.g., computer program code) adapted to direct the processor 852 in accordance with the present embodiments. The instructions also may include program elements, such as an operating system. While execution of sequences of instructions in the program causes the processor 852 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 45:
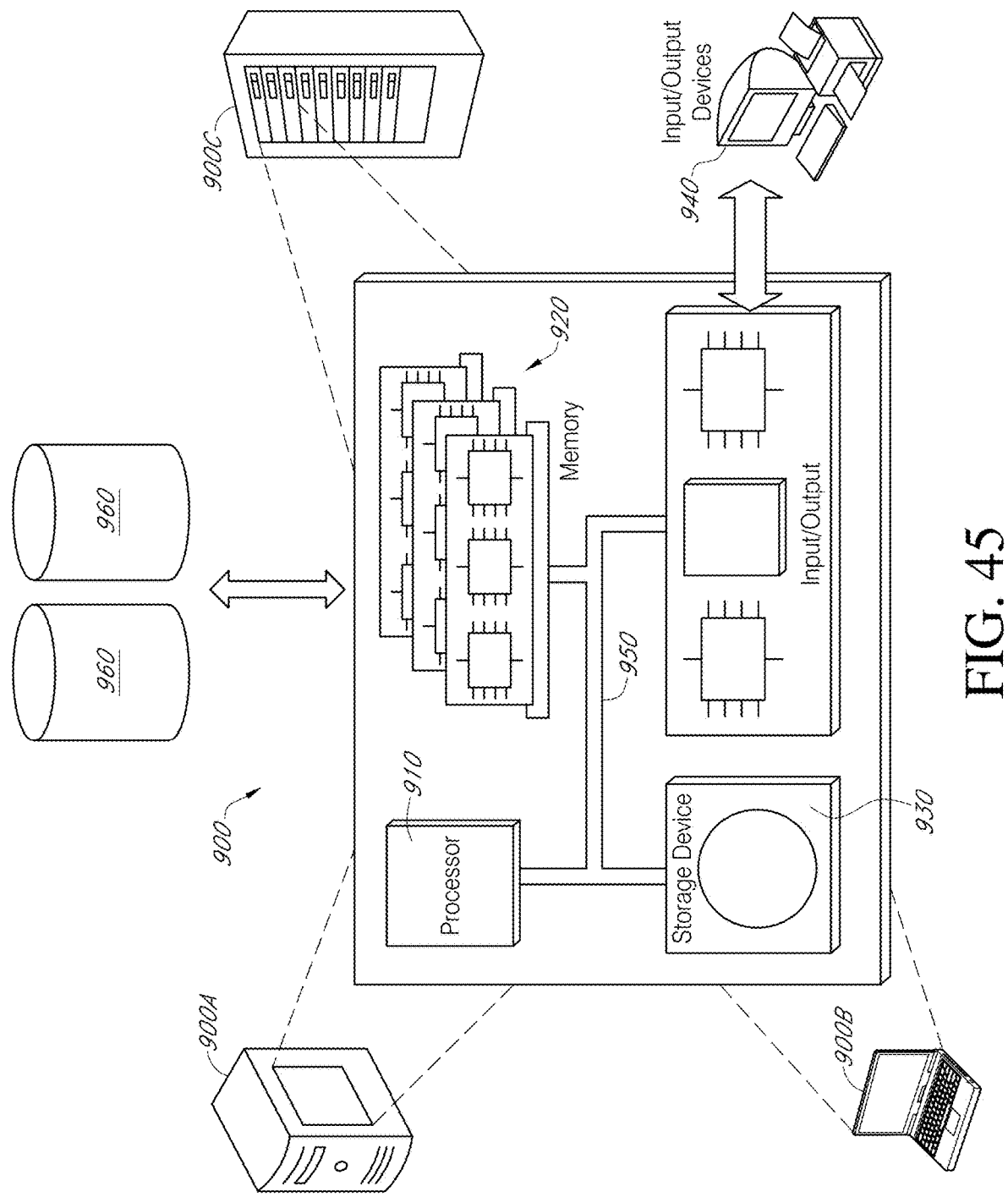
FIG. 45 is a functional block diagram of a general-purpose computing system on which the present embodiments may be implemented according to various aspects of present disclosure.

FIG. 45 is a functional block diagram of a general-purpose computing system on which the present embodiments may be implemented according to various aspects of the present disclosure. The computer system 900 may execute at least some of the operations described above. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

Figure 46:
FIG. 46 is a screenshot of a graphical user interface (GUI) illustrating aspects of another process for sharing video footage from an A/V recording and communication device according to an aspect of the present disclosure.

In some embodiments, users may tag or categorize their videos when sharing them with other users, and users may set one or more preferences for the type(s) of videos for which they want to receive share notifications. For example, FIG. 46 illustrates an embodiment of a graphical user interface (GUI) 970 for setting one or more user preferences for the type(s) of videos for which the user wants to receive share notifications. The Neighborhood Alert Settings screen 970 includes a list 972 having a plurality of categories, including, for example, SUSPICIOUS ACTIVITY 974, BURGLARY 976, ATTEMPTED BURGLARY 978, VANDALISM 980, THEFT 982, and OTHER 984. By selecting one or more of the listed categories, a user may limit the type(s) of videos that will be shared with that user. For example, the user may only receive share notifications for shared videos that fall within one or more of the categories that the user has selected. A GUI (not shown) similar to that shown in FIG. 46 may be provided to users during the video sharing process, so that the shared videos can be tagged or categorized. In some embodiments, a user may choose not to categorize a shared video. In some embodiments, a user who has set preferences for the types of videos he or she wants to be notified about may receive share notifications for uncategorized shared videos. In alternative embodiments, a user who has set preferences for the types of videos he or she wants to be notified about may not receive share notifications for uncategorized shared videos.

In some embodiments, users may be able to view shared videos regardless of where their own A/V recording and communication devices are located. In still further embodiments, even users who do not even own any A/V recording and communication devices may be able to view shared videos. For example, shared videos may be available through a publicly accessible forum, such as a website. In another example, shared videos may be accessed by users running an application on their client devices. A user sharing a video may have the option to make the shared video available to the public, or to restrict the shared video to only those users identified through the processes described above, such as the processes of FIGS. 16-19. In still further embodiments, a user may be able to view shared videos from any area the user specifies by selecting a location on a map and specifying an alert radius around the location. In still further embodiments, a user may enable "alerts around me." This feature may work in real-time to provide the user with alerts from within a given radius of the user's current location. The user's current location may be determined, for example, using GPS technology and the user's mobile client device, such as a smartphone.

In some embodiments, shared videos may be accessed by law enforcement agencies. For example, a user sharing a video may have the option to make the shared video available to law enforcement through a web portal. Law enforcement may be able to log in through the web portal to view the shared videos. For example, the web portal may include a map view indicating the locations of all of the shared videos. The map view may include selectable markers or icons corresponding to the locations of the shared videos. Selecting one of the icons may open a video player and begin playback of the shared video corresponding to the selected icon. Different law enforcement agencies, departments, or groups may have different logins that grant access to specific zones, such as geographic locations that are within the jurisdiction of each agency, department, or group.

In some embodiments, users may be able to block videos from certain other users and/or from certain locations.

In some embodiments, when a user attempts to share a video, the video may undergo a review before being shared with other users. For example, with reference to FIG. 18, when the network 542 receives the share signal 548, an administrator may subsequently review the video before the share notification signal 550 may be sent to any client devices of other users. If the video violates any policies, the administrator may prevent the share notification signal 550 from being sent to any client devices of other users. A notification, such as an e-mail, may be sent to the user who shared the video explaining that the video did not comply with one or more policies or guidelines. The requirement for administrator review may apply to all users, or selectively to only some users, such as users who have attempted to share one or more inappropriate videos. In further embodiments, an administrator may ban a user from sharing videos, such as for repeated policy violations (such as attempting to share one or more inappropriate videos).

As described above, another aspect of the present embodiments includes the realization that members of a neighborhood (may also be referred to as "network of users") may benefit from the capability of locating a person of interest, initially identified by a first user, on image data captured by other users. In various embodiments, a neighborhood may include a grouping of members (may also be referred to as "users") sharing information using a neighborhood platform running on each user's client device. For example, the neighborhood platform may include a neighborhood alert feed that allows members to post videos, photos, and/or texts to alert other members of possible suspicious activity in the neighborhood using a share signal. In some embodiments, a first user may share first image data that includes a person of interest committing a criminal act or acting suspiciously. In such embodiments, other users, such as a second user, may see the shared first image data in their neighborhood feed and be asked for permission to search second image data captured by devices associated with the second user for a match of the person of interest. Further, if the person of interest is found in the second image data, the matched second image data may be appended to the first image data of the person of interest and further shared to other users of the network. In other embodiments, a first user may not have video but may still share a text-based description of a person of interest. In such embodiments, other users, such as the second user, may see the shared text-based description of the person of interest and be asked for permission to search the second image data for a match of the text-based description of the person of interest. In addition, if the person of interest is found in the second image data, the matched second image data may be included with the text-based description of the person of interest and further shared to other users of the network. In these ways, neighborhood safety may be enhanced by tracking movement and activity of the person of interest and providing multiple data points for users of the network to see suspicious and/or criminal patterns in the neighborhood. The present embodiments provide these advantages and enhancements, as described below.

Figure 47:
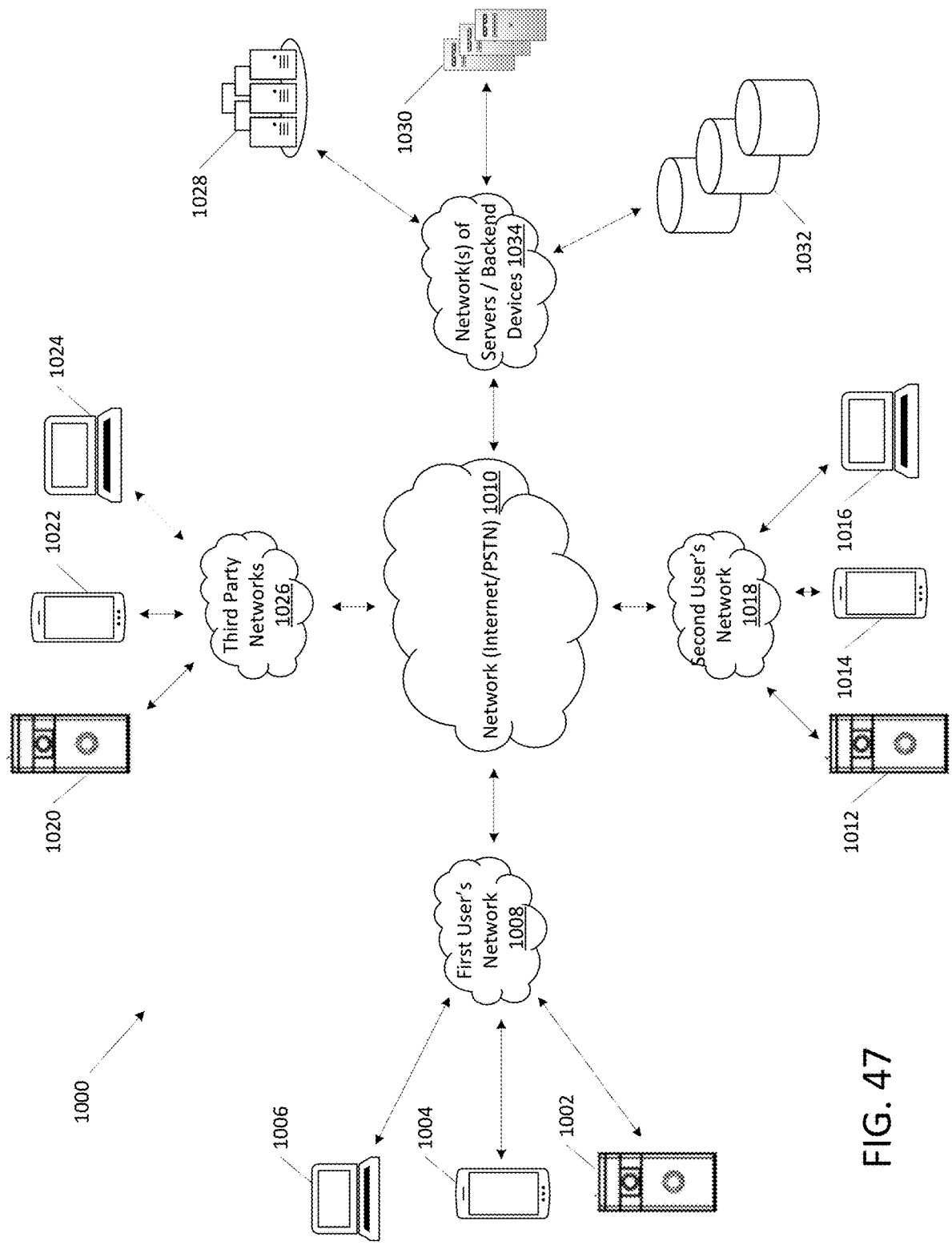
FIG. 47 is a functional block diagram illustrating a system for communicating in a network according to various aspects of the present disclosure.

FIG. 47 is a functional block diagram illustrating a system 1000 for communicating in a network using a share signal. In various embodiments, the share signal may include image data and/or a text-based description of a person of interest, as described below. For example, a first client device may share first image, audio, and/or text data using a share signal, and the network may receive the share signal. As further described below, the network may include one or more backend devices that may be configured to receive the share signal, identify one or more persons of interest, and search second image, audio, and/or text data from various other users in the network for a match of the person of interest. In some embodiments, if a match is found, an alert signal that includes a notification that a person of interest was matched may be sent to the user associated with the second image, audio, and/or text data. Further, in some embodiments, if a match of the person of interest is found, the share signal may be appended to include the matched second image, audio, and/or text data. Thus, a person of interest identified in the share signal may be further identified and tracked in captured data from other users beyond the user of the first client device, as further described below.

In reference to FIG. 47, the system 1000 may include one or more first audio/video (A/V) recording and communication devices 1002 configured to access a first user's network 1008 to connect to a network (Internet/PSTN) 1010. The system 1000 may also include one or more first client devices 1004, 1006, which in various embodiments may be configured to be in network communication with the first A/V recording and communication device 1002. The first client devices 1004, 1006 may comprise, for example, a mobile phone such as a smartphone, or a computing device such as a tablet computer, a laptop computer, a desktop computer, etc. The first client devices 1004, 1006 may include any or all of the components and/or functionality of the client device 114 and/or the client device 850 described herein. In some embodiments, the first client devices 1004, 1006 may not be associated with a first A/V recording and communication device, as described above.

In various embodiments, the system 1000 may also include one or more second A/V recording and communication devices 1012 connected to the network (Internet/PSTN) 1010 using a second user's network 1018 to connect to the network (Internet/PSTN) 1010. The system 1000 may further include one or more second client devices 1014, 1016, which in various embodiments may be configured to be in network communication with the second A/V recording and communication device 1012. The second client devices 1014, 1016 may comprise, for example, a mobile phone such as a smartphone, or a computing device such as a tablet computer, a laptop computer, a desktop computer, etc. The second client devices 1014, 1016 may include any or all of the components and/or functionality of the client device 114 and/or the client device 850 described herein. In some embodiments, the second client devices 1014, 1016 may not be associated with a second A/V recording and communication device, as described above.

In some embodiments, the system 1000 may also include one or more third party A/V recording and communication devices 1020 connected to the network (Internet/PSTN) 1010 using various third party networks 1026 such as a local network, a wireless network such as a cellular/mobile network and/or a Wi-Fi network, a wired network such as an Ethernet network, a public network, a low-bandwidth network, and/or any other appropriate network to access the network (Internet/PSTN) 1010. The system 1000 may further include one or more third party client devices 1022, 1024, which in various embodiments may be configured to be in network communication with the third party A/V recording and communication device 1020. The third party client devices 1022, 1024 may comprise, for example, a mobile phone such as a smartphone, or a computing device such as a tablet computer, a laptop computer, a desktop computer, etc. The third party client devices 1022, 1024 may include any or all of the components and/or functionality of the client device 114 and/or the client device 850 described herein. In some embodiments, the third party client devices 1022, 1024 may not be associated with a third party A/V recording and communication device, as described above.

With further reference to FIG. 47, the system 1000 may also include various backend devices such as (but not limited to) storage devices 1032, backend servers 1030, and backend APIs 1028 in network communication with the first, second, and third party A/V communication devices 1002, 1012, 1020 and their respective client devices 1004, 1006, 1014, 1016, 1022, 1024. In some embodiments, the storage devices 1032 may be a separate device from the backend servers 1030 (as illustrated) or may be an integral component of the backend servers 1030. In addition, the first user's network 1008 and the network 1010 may be similar in structure and/or function to the user's network 110 and the network 112 (FIG. 1), respectively. In some embodiments, the first and second A/V recording and communication devices 1002, 1012 may be similar in structure and/or function to the A/V doorbell 100 (FIG. 1) and/or the A/V recording and communication doorbell 130 (FIGS. 2-12). In some embodiments, the first user's client devices 1004, 1006 may be similar in structure and/or function to the user's client device 114 (FIG. 1) and/or the user's client device 850 (FIG. 44). Further, the second user's network 1018 may be similar in structure and/or function to the user's network 110 (FIG. 1). In some embodiments, the second user's client devices 1014, 1016 may also be similar in structure and/or function to the user's client device 114 (FIG. 1) and/or the user's client device 850 (FIG. 44). Also, the storage devices 1032 may be similar in structure and/or function to the storage device 116 (FIG. 1). In addition, in some embodiments, the backend servers 1030 and backend APIs 1028 may be similar in structure and/or function to the server 118 and the backend API 120 (FIG. 1), respectively.

In various embodiments, the first user's client devices 1004, 1006 and/or the second client devices 1014, 1016 may connect to the network (Internet/PSTN) 1010 using any network, including, without limitation, a local network, a wireless network such as a cellular/mobile network and/or a Wi-Fi network, a wired network such as an Ethernet network, a public network, a low-bandwidth network, and/or any other appropriate network to access the network (Internet/PSTN) 1010.

Figure 48:
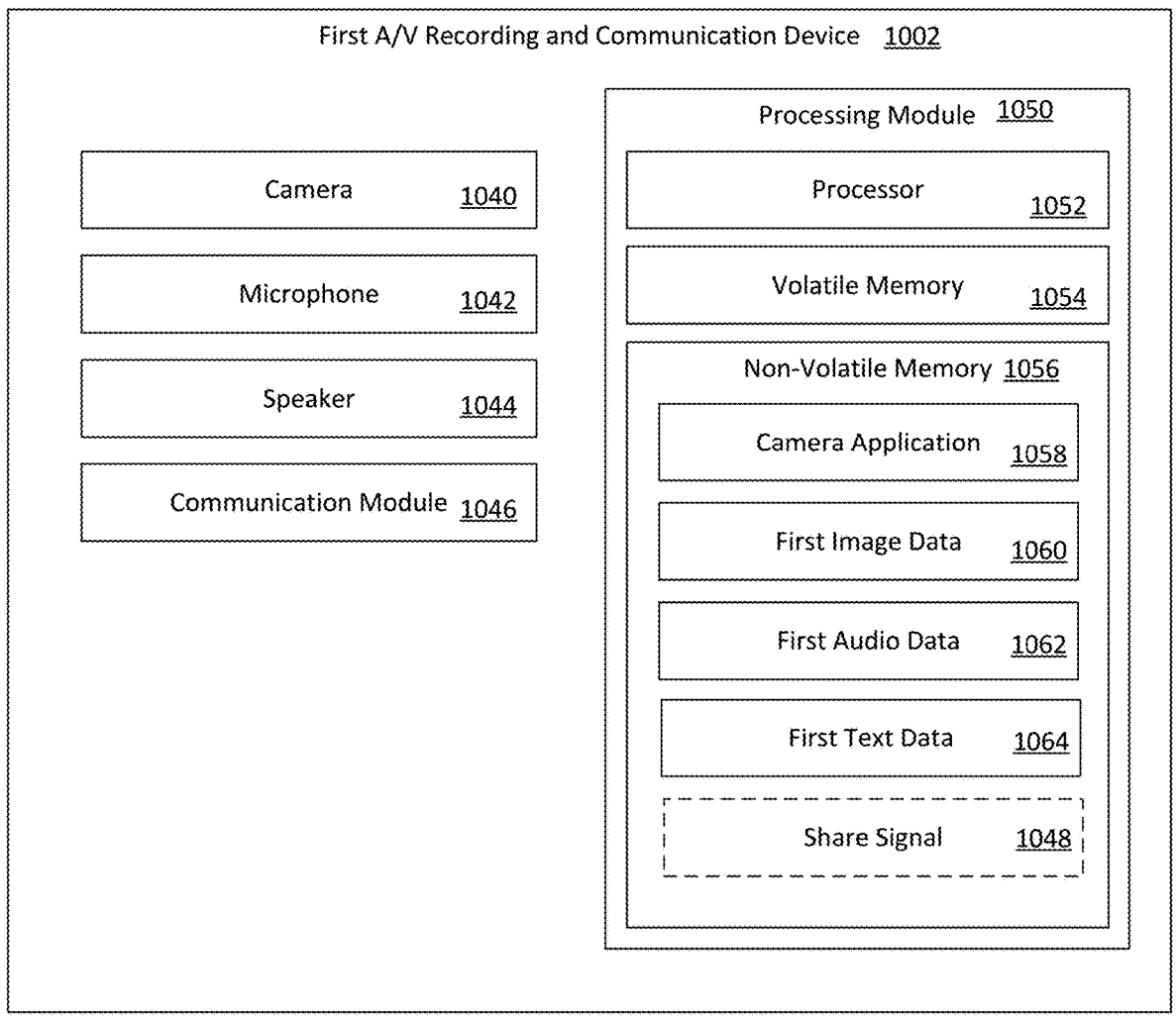
FIG. 48 is a functional block diagram illustrating one embodiment of a first A/V recording and communication device according to various aspects of the present disclosure.

FIG. 48 is a functional block diagram illustrating an embodiment of the first A/V recording and communication device 1002 according to various aspects of the present disclosure. The first A/V recording and communication device 1002 may comprise a processing module 1050 that is operatively connected to a camera 1040, a microphone 1042, a speaker 1044, and a communication module 1046. The processing module 1050 may comprise a processor 1052, volatile memory 1054, and non-volatile memory 1056 that includes a camera application 1058. In various embodiments, the camera application 1058 may configure the processor 1052 to capture first image data 1060 using the camera 1040 and first audio data 1062 using the microphone 1042. In some embodiments, the camera application 1058 may also configure the processor 1052 to generate first text data 1064 describing the first image data 1060 and/or the first audio data 1062. In other embodiments, the first text data 1064 describing the first image data 1060 may be generated by a user using the first client device 1004, 1006 associated with the first A/V recording and communication device 1002, as described above. In some embodiments, the first text data 1064 describing the first audio data 1062 may be a transcription of the first audio data 1062. In addition, the camera application 1058 may configure the processor 1052 to transmit the first image data 1060, the first audio data 1062, and/or the text data 1064 to the first client device 1004, 1006 using the communication module 1046, and the first client device 1004, 1006 may generate and transmit a share signal 1048 using the first image data 1060, the first audio data 1062, and/or the text data 1064 to the backend server 1030, as described above. In other embodiments, the camera application 1058 may configure the processor 1052 to directly generate and transmit a share signal 1048 using the first image data 1060, the first audio data 1062, and/or the text data 1064 to the backend server 1030 using the communication module 1046. As further described below, the backend server 1030 may identify a person of interest in the share signal 1048 and match the person of interest in second image data, as further described below. In some embodiments, the backend server 1030 may also identify an object of interest in the share signal 1048 and match the object of interest in second image data provided by the second A/V recording and communication device 1012. Further, in some embodiments, the share signal 1048 may only include first text data 1064 that includes a text-based description of a person and/or object of interest and the backend server 1030 may use the first text data 1064 to search and match the text-based description in the second image data, as further described below. In addition, in some embodiments, the share signal 1048 may only include first audio data 1062 of a person and the backend server 1030 may use the first audio data 1062 to search and match the person of interest using the second audio data, as further described below.

Figure 49:
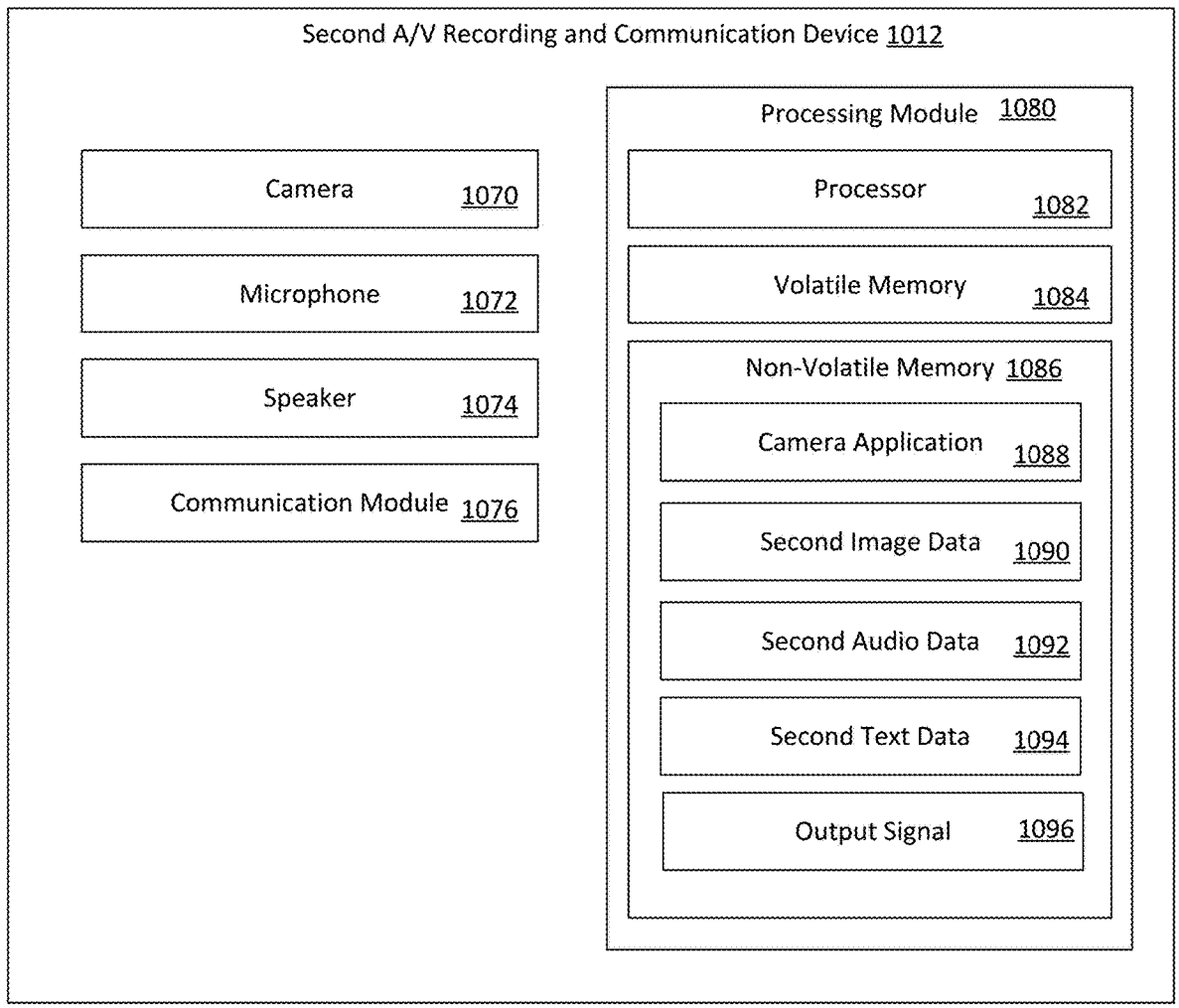
FIG. 49 is a functional block diagram illustrating one embodiment of a second A/V recording and communication device according to various aspects of the present disclosure.

FIG. 49 is a functional block diagram illustrating an embodiment of the second A/V recording and communication device 1012 according to various aspects of the present disclosure. The second A/V recording and communication device 1012 may comprise a processing module 1080 that is operatively connected to a camera 1070, a microphone 1072, a speaker 1074, and a communication module 1076. The processing module 1080 may comprise a processor 1082, volatile memory 1084, and non-volatile memory 1086 that includes a camera application 1088. In some embodiments, the camera application 1088 may configure the processor 1082 to capture second image data 1090 using the camera 1070 and second audio data 1092 using the microphone 1072. In some embodiments, the camera application 1088 may also configure the processor 1082 to generate second text data 1094 describing the second image data 1090 and/or the second audio data 1092. In other embodiments, the second text data 1094 describing the second image data 1090 may be generated by a user using the second client device 1014, 1016 associated with the second A/V recording and communication device 1012, as described above. In some embodiments, the second text data 1094 describing the second audio data 1092 may be a transcription of the second audio data 1092. In various embodiments, the camera application 1088 may also configure the processor to generate and transmit an output signal 1096 that may include the second image data 1090, the second audio data 1092, and/or the second text data 1094. In some embodiments, the output signal 1096 may be transmitted, using the communication module 1076, to the second client device 1014, 1016, and the second client device 1014, 1016 may send the output signal 1096 to the backend server 1030. In other embodiments, the output signal 1096 may be transmitted directly to the backend server 1030 using the communication module 1076. In either embodiment, the backend server 1030 may search the output signal 1096 to find a match of the person of interest identified in the share signal, as further described below. For example, in some embodiments, the backend server 1030 may receive first image data 1060 of a person of interest and may search and find a match of the person of interest in the second image data 1090. In a further example, in some embodiments, the backend server 1030 may receive a text-based 1064 description of a person of interest and may search and find a match of the person of interest in second image data 1090. In some embodiments, the backend server 1030 may first transmit to a second client device 1014, 1016 associated with the second A/V recording and communication device 1012, a request to check the second image data 1090 for a person of interest before searching the second image data 1090, as further described below.

Figure 50:
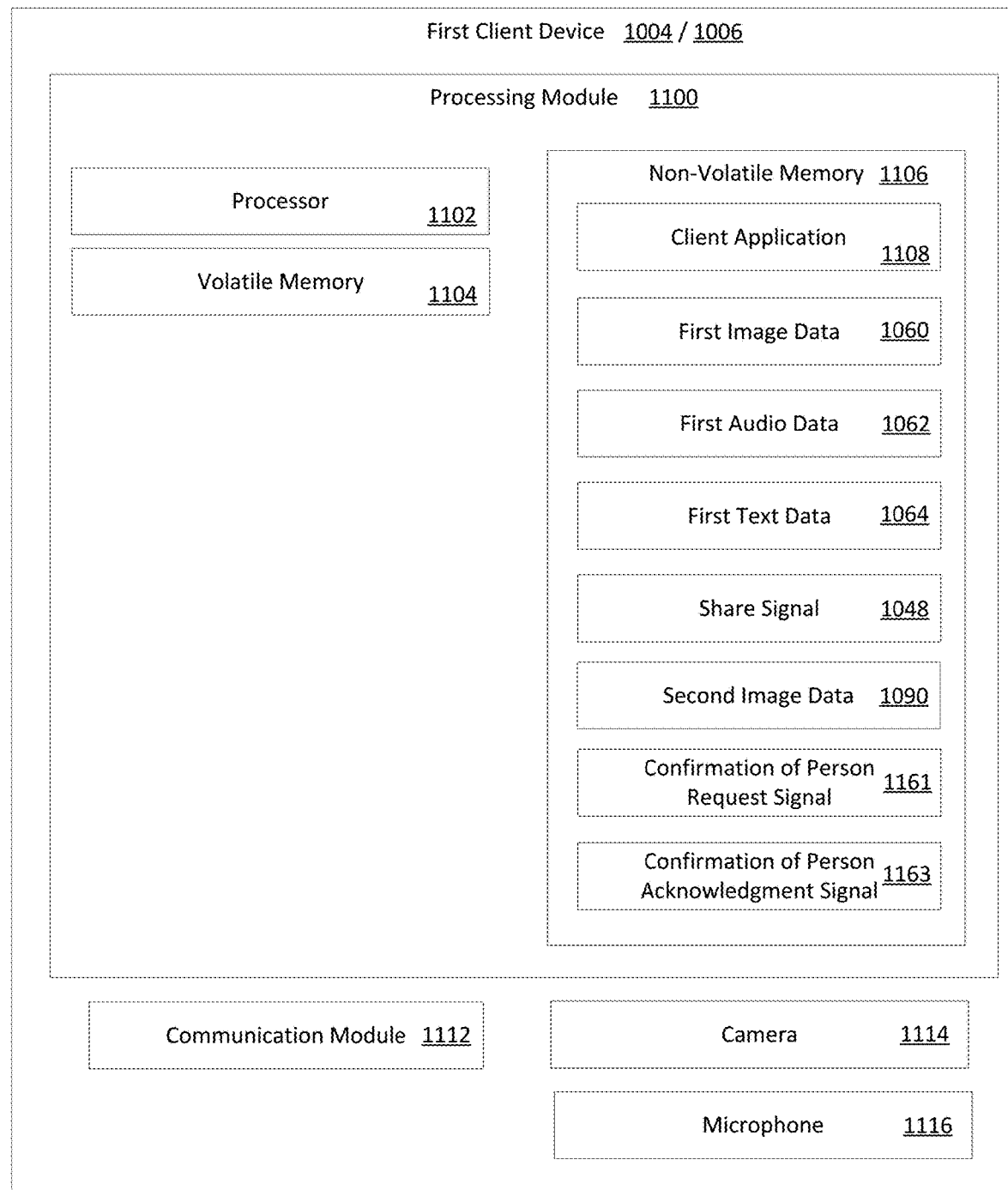
FIG. 50 is a functional block diagram illustrating one embodiment of a first client device according to various aspects of the present disclosure.

FIG. 50 is a functional block diagram illustrating one embodiment of the first client device(s) 1004, 1006 according to various aspects of the present disclosure. As described above, the first client device(s) 1004, 1006 may be configured to share video footage captured by the first A/V recording and communication device 1002 using a share signal 1048. The first client device(s) 1004, 1006 may include a processing module 1100 that is operatively connected to a camera 1114 and a microphone 1116. The processing module 1100 may comprise a processor 1102, volatile memory 1104, and non-volatile memory 1106. The non-volatile memory 1106 may include a client application 1108 that configures the processor 1102 to capture first image data using the camera 1114 and first audio data using the microphone 1116. The first client device(s) 1004, 1006 may also include a communication module 1112 for network communication with the first A/V recording and communication device 1002 and/or the backend server 1030. In some embodiments, the first client device(s) 1004, 1006 may receive the first image data 1060 and first audio data 1062 captured by the first A/V recording and communication device(s) 1002, as described above. Further, the first client device(s) 1004, 1006 may be configured to receive first text data 1064 input by a first user that describes the first image data 1060 and/or the first audio data 1062. In various embodiments, the share signal 1048 may include the first image data 1060, first audio data 1062, and/or the first text data 1064. In some embodiments, the share signal 1048 may also include the first image data captured using the camera 1114, the first audio data captured using the microphone 1116 of the first client device 1004, 1006. Further, the first client device(s) 1004, 1006 may transmit the share signal 1048 to the backend server 1030, where the contents of the share signal may be provided to members of a neighborhood using client devices such as (but not limited to) first client devices 1004, 1006 and second client devices 1014, 1016, as further described below.

In further reference to FIG. 50, the first client device 1004, 1006 may transmit to the backend server 1030 the first text data 1064 that includes a text-based description of a person of interest, as further described below. In some embodiments, the backend server 1030 may search and match second image data 1090 to the text-based description, and transmit the matched second image data 1090 and a confirmation of person request signal 1161 to the first client device 1004, 1006. In such embodiments, a user of the first client device 1004, 1006 may review the matched second image data 1090 and transmit a confirmation of person acknowledgment signal 1163 to the backend server 1030 verifying that the second image data 1090 does include the person of interest as described in the first text data 1064 of the text-based description of the person of interest, as further described below.

Figure 51:
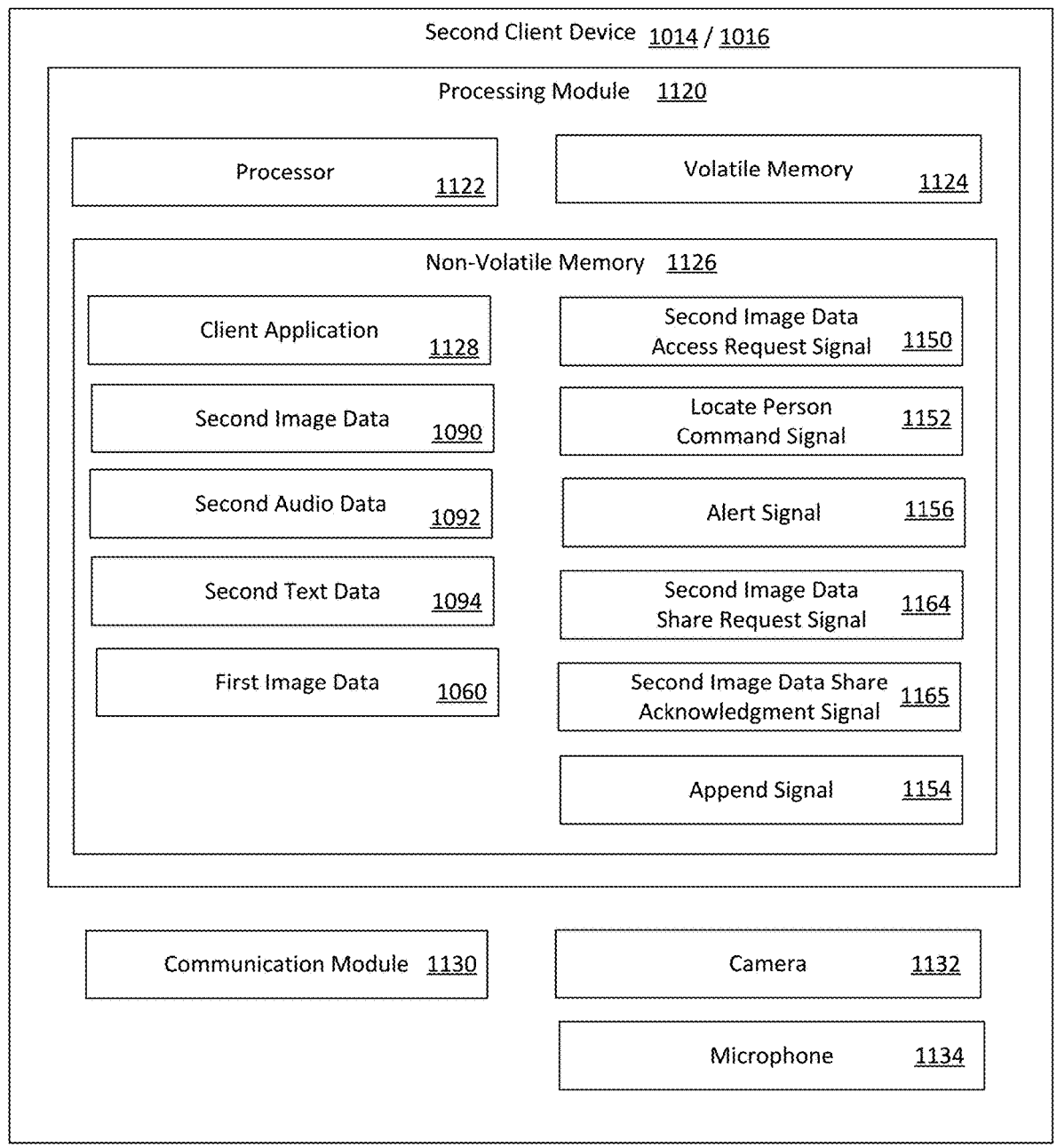
FIG. 51 is a functional block diagram illustrating one embodiment of a second client device according to various aspects of the present disclosure.

FIG. 51 is a functional block diagram illustrating one embodiment of the second client device(s) 1014, 1016 according to various aspects of the present disclosure. In many embodiments, the second client device 1014, 1016 may include a processing module 1120 that is operatively connected to a camera 1132 and a microphone 1134. The processing module 1120 may comprise a processor 1122, volatile memory 1124, and non-volatile memory 1126. The non-volatile memory 1126 may include a client application 1128 that configures the processor 1122 to capture second image data using the camera 1132. The second client device 1014, 1016 may also include a communication module 1130 for network communication with the second A/V recording and communication device 1012. For example, in some embodiments, the second client device 1014, 1016 may receive the second image data 1090 and the second audio data 1092 from the second A/V recording and communication device 1012 using the communication module 1130. Further, the second client device 1014, 1016 may be configured to receive second text data 1094 provided by a second user that describes the second image data 1090 and/or the second audio data 1092. In some embodiments, the second client device 1014, 1016 may transmit the second image data 1090, second audio data 1092, and/or the second text data 1094 to the backend server 1030. In other embodiments, the second A/V recording and communication device 1012 may directly transmit the second image data 1090, second audio data 1092, and/or the second text data 1094 to the backend server 1030 via the output signal 1096, as described above.

In further reference to FIG. 51, the second client device 1014, 1016 may receive from the backend server 1030 the first image data 1060 that includes the person of interest and a second image data access request signal 1150 that includes a request to check the second image data 1090 for the person of interest. If the second user grants permission, then the second client device 1014, 1016 may transmit a locate person command signal 1152 in response to the request to check the second image data 1090 for the person of interest. If the person of interest is matched in the second image data 1090, the second client device 1014, 1016 may receive an alert signal 1156 that includes a notification that the person of interest was matched in the second image data 1090. In some embodiments, the alert signal 1156 may also include a second image data share request signal 1164 that requests permission to share the second image data 1090 of the matched person of interest with the network of users. In other embodiments, the second image data share request signal 1164 may be a separate signal from the alert signal 1156. In some embodiments, if the second user grants permission, then the second client device 1014, 1016 may transmit an append signal 1154 that includes a command to append the second image data 1090 of the matched person of interest onto the shared first image data 1060 of the person of interest, as further described below. In some embodiments, if the second user grants permission, then the second client device 1014, 1016 may transmit a second image data share acknowledgment signal 1165 that includes a confirmation to share the matched second image data 1090 with the first client device(s) 1004, 1006, and/or the network of users.

In reference to FIGS. 48, 49, 50, and 51, the image data 1060, 1090 may comprise image sensor data such as (but not limited to) exposure values and data regarding pixel values for a particular sized grid. Further, image data may comprise converted image sensor data for standard image file formats such as (but not limited to) JPEG, JPEG 2000, TIFF, BMP, or PNG. In addition, image data may also comprise data related to video, where such data may include (but is not limited to) image sequences, frame rates, and the like. Moreover, image data may include data that is analog, digital, uncompressed, compressed, and/or in vector formats. Image data may take on various forms and formats as appropriate to the requirements of a specific application in accordance with the present embodiments. As described herein, the term "record" may also be referred to as "capture" as appropriate to the requirements of a specific application in accordance with the present embodiments. In addition, a communication module, such as the communication modules 1046, 1076 may comprise (but is not limited to) one or more transceivers and/or wireless antennas (not shown) configured to transmit and receive wireless signals. In further embodiments, the communication modules 1046, 1076 may comprise (but are not limited to) one or more transceivers configured to transmit and receive wired and/or wireless signals.

Figure 52:
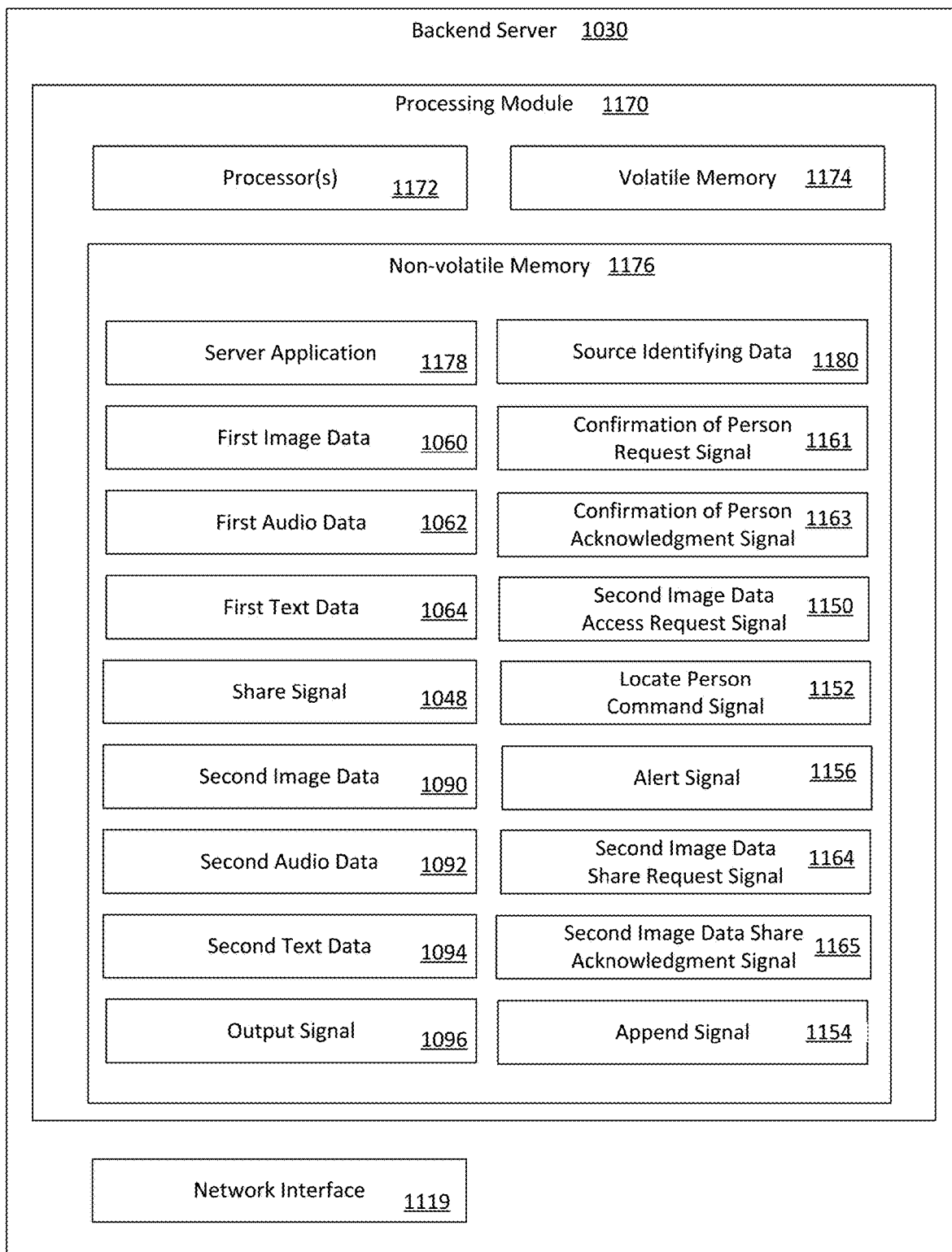
FIG. 52 is a functional block diagram illustrating one embodiment of a backend device according to various aspects of the present disclosure.

FIG. 52 is a functional block diagram illustrating one embodiment of a backend server 1030 according to various aspects of the present disclosure. The backend server 1030 may comprise a processing module 1170 comprising a processor 1172, volatile memory 1174, a network interface 1119, and non-volatile memory 1176. The network interface 1119 may allow the backend server 1030 to access and communicate with devices connected to the network (Internet/PSTN) 1010. The non-volatile memory 1176 may include a server application 1178 that configures the processor 1172 to receive the share signal 1048 and perform processes for searching and matching for a person of interest, as further described below. In various embodiments, the share signal 1048 may include first image data 1060, first audio data 1062, and/or text data 1068 received from the first client device 1004, 1006 and/or the first A/V recording and communication device 1002. Further, the non-volatile memory 1176 may include an output signal 1096 that includes second image data 1090, second audio data 1092, and/or second text data 1094 received from the second client device 1014, 1016 and/or the second A/V recording and communication device 1012. As further described below, in some embodiments, the backend server 1030 may receive a text-based description of a person of interest. In such embodiments, the backend server 1030 may search image data such as (but not limited to) the second image data 1090 for a match of the text-based description of the person of interest. Upon a match, the backend server 1030 may transmit the matched second image data 1090 with a confirmation of person request signal 1161 requesting confirmation from the first user that the matched second image data 1090 includes the person of interest. The backend server 1030 may receive a confirmation of person acknowledgment signal 1163 from the first client device(s) 1004, 1006 confirming that the matched second image data 1090 includes the person of interest. As further described below, in some embodiments, the backend server 1030 may receive a share signal 1048 with first image data 1060 that includes a person of interest. In such embodiments, the backend server 1030 may transmit the first image data 1060 and a second image data access request signal 1150 to the second client device(s) 1014, 1016 requesting permission to check the second image data 1090 for the person of interest found in the first image data 1060. If the request is permitted, the backend server 1030 may receive a locate person command signal 1152, as further described below. In addition, if the person of interest is matched in the second image data 1090, the backend server 1030 may generate and transmit an alert signal 1156 that includes a notification that the person of interest was matched in the second image data 1090. In some embodiments, the backend server 1030 may also send a second image data share request signal 1164 seeking permission to share the matched second image data 1090. In some embodiments, the backend server 1030 may receive an append signal 1154 from the second client device(s) 1014, 1016 that includes a command to append the second image data 1090 onto the shared first image data 1060 of the person of interest, as further described below. In some embodiments, the backend server 1030 may receive a second image data share acknowledgment signal 1165 that includes a confirmation to share the matched second image data 1090 with the first client device(s) 1004, 1006 and/or the network of users. In some embodiments, the second image data 1090, the second audio data 1092, and/or the second text data 1094 may be separately stored at the backend databases 1032, where the backend server 1030 may search and match a person of interest found in the first image data 1060, first audio data 1062, and/or the first text data 1064 by comparing the first image data 1060, the first audio data 1062, and/or the text data 1064 to information stored at the databases 1032, as further described below.

In further reference to FIG. 52, the non-volatile memory 1176 may also include source identifying data 1180 that may be used to identify, and/or determine locations of, the first A/V recording and communication device 1002, the second A/V recording and communication device 1012, and/or the third party A/V recording and communication device 1020. In addition, the source identifying data 1180 may be used to identify, and/or determine locations of, the first client device(s) 1004, 1006, the second client device(s) 1014, 1016, and/or the third party device(s) 1022, 1024. In some embodiments, the server application 1178 may configure the processor 1172 to generate and transmit a report signal to a third party client device 1022, 1024 and/or a law enforcement agency that includes information indicating an approximate location of where the first image data 1060 was captured and/or where the second image data 1090 was captured, as further described below.

In the illustrated embodiment of FIGS. 48-52, the various components including (but not limited to) the processing modules 1050, 1080, 1100, 1120, 1170, the communication modules 1046, 1076, 1112, 1130, and the network interface 1119 are represented by separate boxes. The graphical representations depicted in each of FIGS. 48-52 are, however, merely examples, and are not intended to indicate that any of the various components of the first A/V recording and communication device 1002, the second A/V recording and communication device 1012, the first client device(s) 1004, 1006, the second client device(s) 1014, 1016, or the backend server 1030 are necessarily physically separate from one another, although in some embodiments they might be. In other embodiments, however, the structure and/or functionality of any or all of the components of first A/V recording and communication device 1002 may be combined. In addition, in some embodiments the communication module 1046 may include its own processor, volatile memory, and/or non-volatile memory. Likewise, the structure and/or functionality of any or all of the components of the second A/V recording and communication device 1012 may be combined. In addition, in some embodiments the communication module 1076 may include its own processor, volatile memory, and/or non-volatile memory. In other embodiments, the structure and/or functionality of any or all of the components of first client device 1004, 1006 may be combined. In addition, in some embodiments the communication module 1112 may include its own processor, volatile memory, and/or non-volatile memory. Likewise, the structure and/or functionality of any or all of the components of the second client device(s) 1014, 1016 may be combined. In addition, in some embodiments the communication module 1130 may include its own processor, volatile memory, and/or non-volatile memory. Further, the structure and/or functionality of any or all of the components of the backend server 1030, may be combined. In addition, in some embodiments the network interface 1119 may include its own processor, volatile memory, and/or non-volatile memory.

Figure 53:
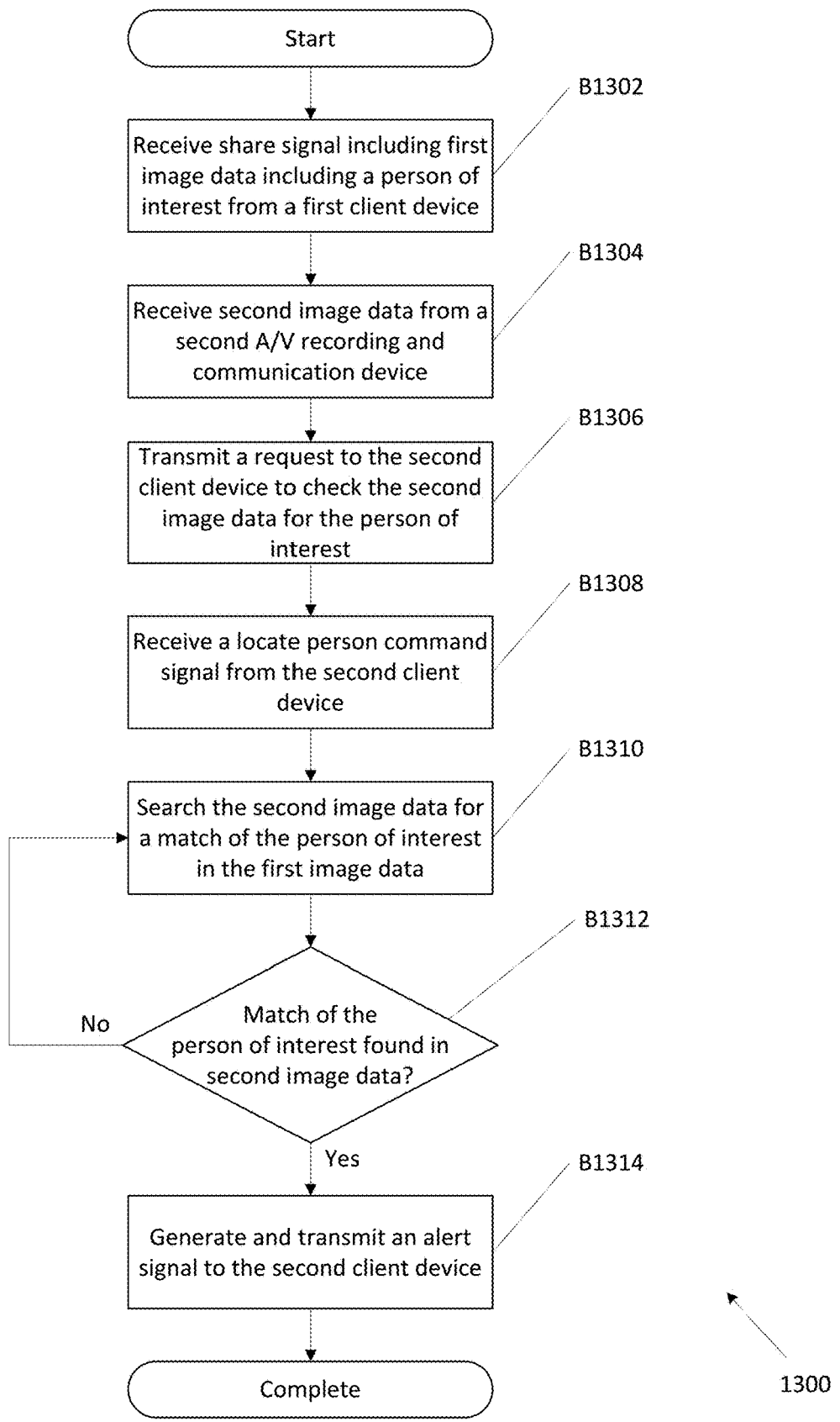
FIGS. 53 and 54 are flowcharts illustrating embodiments of processes for searching second image data for a match of a person of interest provided in first image data according to various aspects of the present disclosure.

FIG. 53 is a flowchart illustrating an embodiment of a process 1300 for searching second image data for a match of a person of interest provided in first image data according to various aspects of the present disclosure. In some embodiments, a first client device(s) 1004, 1006, may transmit a share signal 1048 that includes first image data 1060 to the backend server 1030, where the first image data 1060 may include images of a person of interest. In various embodiments, the first image data 1060 may be captured by a first A/V recording and communication device 1002 or by the first client device(s) 1004, 1006, as described above. Further, a second A/V recording and communication 1012 and/or second client device(s) 1014, 1016 may capture second image data 1090 and transmit the second image data 1090 to the backend server 1030. As further described below, the second image data 1090 may be searched for a match of the person of interest.

In reference to FIG. 53, the process 1300 may include the backend server 1030 receiving (block B1302), from a first client device 1004, 1006, a share signal 1048 including first image data 1060 captured by a camera 1040 of the first A/V recording and communication device 1002, the first image data including a person of interest, as described above. In some embodiments, the share signal 1048 may include first audio data 1062 captured by a microphone 1042 of the first A/V recording and communication device 1002 associated with the first client device 1004, 1006. Further, the share signal 1048 may also include first text data 1064 that describes the first image data 1060 and/or the first audio data 1062. For example, the first text data 1064 may describe that the person of interest has committed a criminal act or is behaving suspiciously, as depicted in the first image data 1060 and/or the first audio data 1062. In alternative embodiments, and as described above, the share signal 1048 may include the first audio data 1062 and/or the first text data 1064 without the first image data 1060. In addition, the share signal may also include a command to share the first image data 1060 (and/or the first audio data 1062 and/or the text data 1064) with a network of users. For example, the share signal 1048 may comprise a neighborhood alert that notifies other users of a possible danger posed by the person of interest.

The process 1300 may also include receiving (block B1304) second image data 1090 captured by a camera 1070 of the second A/V recording and communication device 1012, as described above. Further, in some embodiments, the backend server 1030 may receive second audio data 1092 captured by a microphone 1072 of the second A/V recording and communication device 1012 and/or second text data 1094 that describes the second image data 1090 and/or the second audio data 1092. In many embodiments, the second image data 1090 may be received (block B1304) before receiving (block B1302) the share signal 1048, and stored in either a database(s) 1032 and/or in the non-volatile memory 1176 storage of the backend server 1030 where it may be searched upon receiving the share signal 1048. Upon receiving the share signal 1048, the process 1300 may further include transmitting (block B1306) a request, to the second client device(s) 1014, 1016 using a second image data access request signal 1150, to check the second image data 1090 for the person of interest. In some embodiments, the backend server 1030 may also transmit the first image data 1060 that includes the person of interest along with the request to check the second image data for the person of interest. For example, one or more second users may receive on their second client device(s) 1014, 1016 a video shared by a first user that includes a request to check second image data 1090 captured by their respective second A/V recording and communication device 1012. If the second user grants permission, then the process 1300 may include receiving (block B1308), from the second client device(s) 1014, 1016, a locate person command signal 1152, in response to the request to check the second image data 1090 for the person of interest. In some embodiments, a second user may choose to grant permission for access in advance for future share signals 1048 that may include a person of interest. In such embodiments, the backend server 1030 may receive an automatic locate command signal, and in response activate a setting for automatically identifying a further person of interest and searching the second image data 1090 each time a new share signal 1048 is received including the further person of interest.

In further reference to FIG. 53, the process 1300 may include searching (block B1310) the second image data 1090 for a match (block B1312) of the person of interest in the first image data 1060. In many embodiments, the search (block B1310) of the second image data 1090 for a match (block B1312) of the person of interest in the first image data 1060 may be automated using various imaging processing techniques and/or machine learning processes. For example, in some embodiments, searching (block B1310) the second image data 1090 for the match (block B1312) of the person of interest may be performed using facial recognition processes, color matching schemes, and/or using a body build score. In some embodiments, a match (block B1312) of the person of interest in the second image data 1090 may be confirmed by a human operator. In addition, searching (block B1310) the second image data 1090 for the match (block B1314) of the person of interest may be restricted to a subset of the second image data 1090, such as a subset of the second image data captured during a predetermined length of time before and/or the capture of the first image data 1060 that includes the person of interest. In many embodiments, when a match (block B1312) of the person of interest is not found, the process 1300 may include continuing to search (block B1310) the second image data 1090. If, after continued searching of the second image data 1090 at block B1310, no match of the person of interest is found, the process 1300 may return a notification to the second client device(s) 1014, 1016, wherein the notification indicates that no match of the person of interest was found. However, when a match (block B1312) of the person of interest is found in the second image data 1090, then process 1300 may include generating and transmitting (block B1314) an alert signal 1156 to the second client device(s) 1014, 1016, wherein the alert signal 1156 includes a notification that the person of interest was matched in the second image data 1090.

Figure 54:
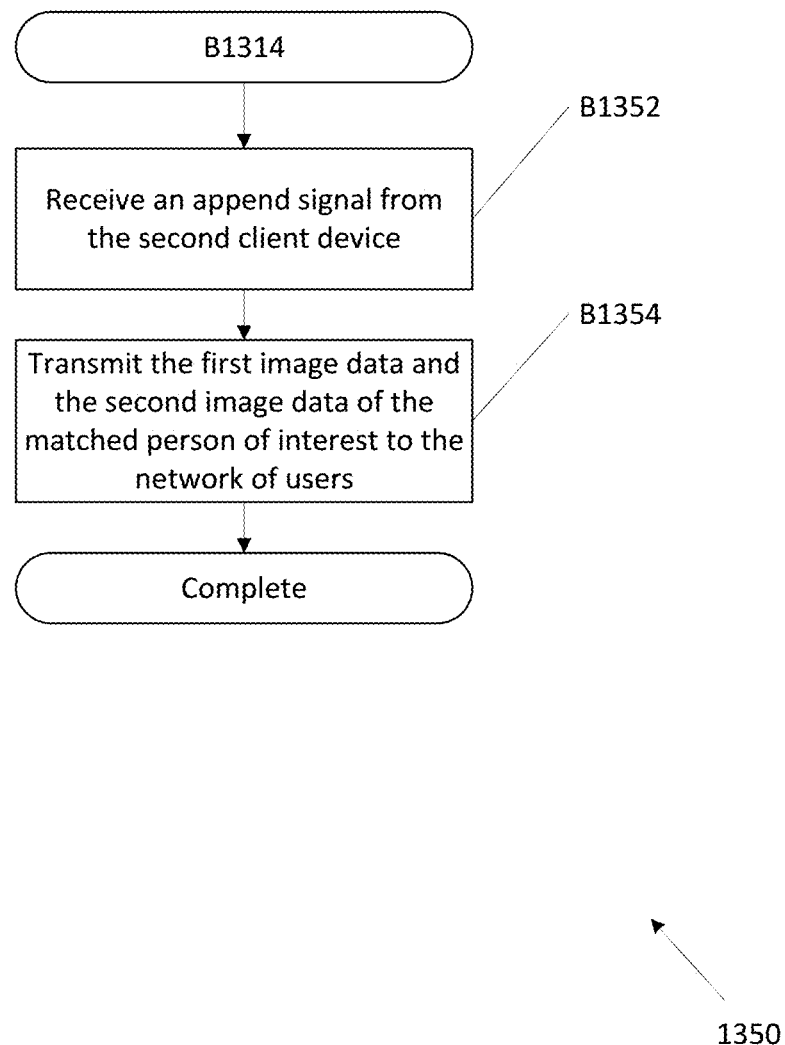

FIG. 54 is a flowchart illustrating another embodiment of a process 1350 for searching second image data for a match of a person of interest provided in first image data according to various aspects of the present disclosure. In many embodiments, the process 1350 may continue from block B1314 of process 1300, as described above with respect to FIG. 53. In some embodiments, the alert signal 1156 that is transmitted to the second client device(s) 1014, 1016 may include the second image data 1090 of the matched person of interest. Further, the alert signal 1156 may include a request for permission to share the second image data 1090 of the matched person of interest with the network of users or the request for permission to share the second image data 1090 may be transmitted to the second client device(s) 1014, 1016 using a second image data share request signal 1164. If permission is granted by the second user, the process 1350 may include receiving (block B1352) an append signal 1154, from the second client device(s) 1014, 1016, wherein the append signal 1154 includes a command to append the second image data 1090 of the matched person of interest onto the shared first image data 1060 of the person of interest. The process 1350 may also include transmitting (block B1354) the first image data 1060 and the second image data 1090 of the matched person of interest to the network of users. By including the second image data 1090 of the matched person of interest, the person of interest captured in the first image data 1060 may be tracked and his or her whereabouts and actions captured for various users to increase neighborhood safety.

Figure 55:
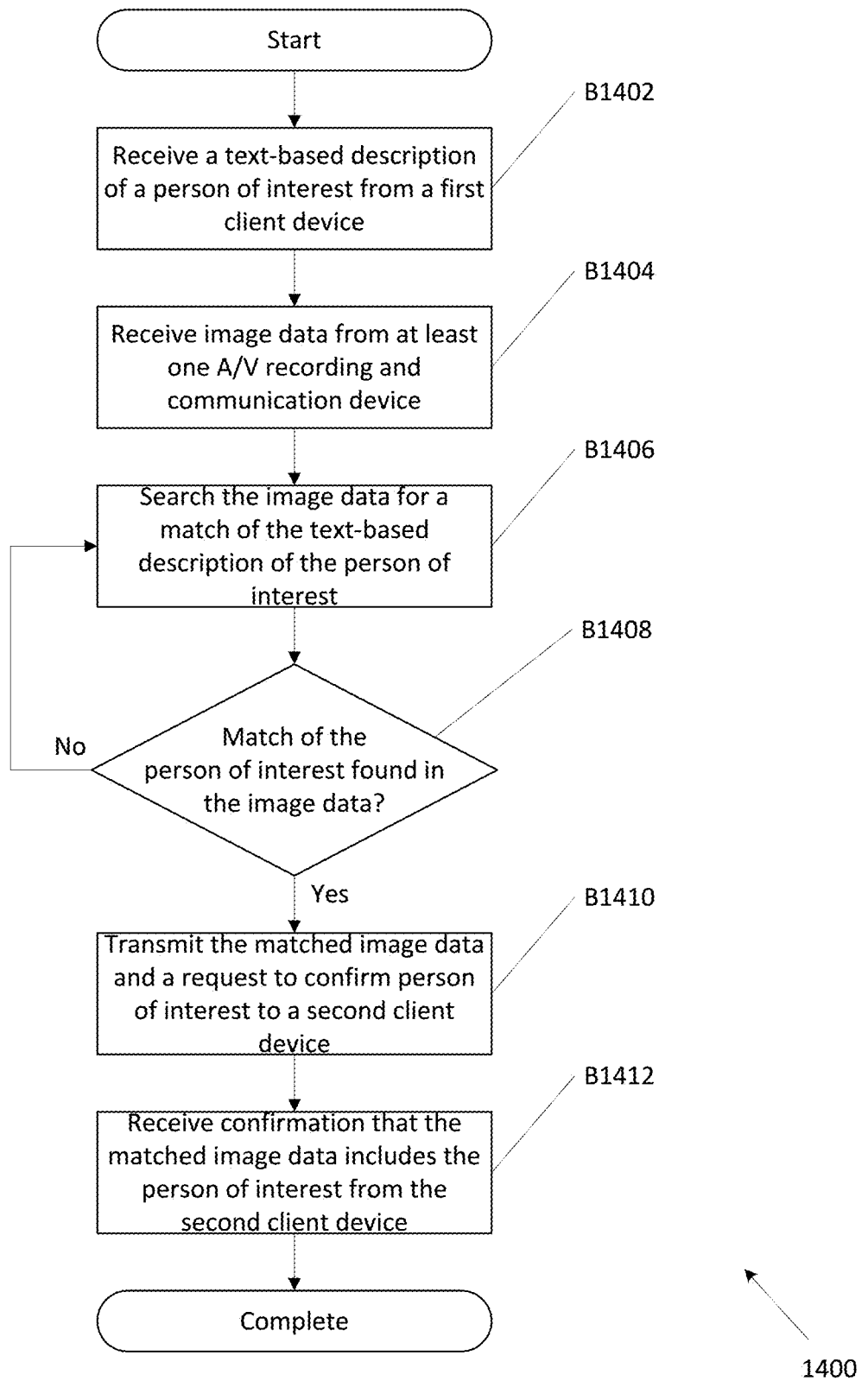
FIGS. 55 and 56 are flowcharts illustrating embodiments of processes for searching image data for a match of a person of interest provided in a text-based description according to various aspects of the present disclosure.

FIG. 55 is a flowchart illustrating an embodiment of a process 1400 for searching image data for a match of a person of interest provided in a text-based description according to various aspects of the present disclosure. In some embodiments, a first client device(s) 1004, 1006, may transmit a share signal 1048 that includes first text data 1064 to the backend server 1030, where the first text data 1064 may include a text-based description of a person of interest. In various embodiments, the first text data 1064 may be provided by a first user using the first client device(s) 1004, 1006 that may be associated with the first A/V recording and communication device 1002, as described above. Further, as described above, a second A/V recording and communication 1012 and/or second client device(s) 1014, 1016 may capture second image data 1090 and transmit the second image data 1090 to the backend server 1030. In many embodiments, the first user may not have first image data 1060 and/or first audio data 1062 of the person of interest. Thus, the text-based description may be used to search image data captured by various other users for a match of the person of interest, as further described below.

In reference to FIG. 55, the process 1400 may include receiving (block B1402), at the backend server 1030, a text-based description (may also be referred to as "first text data 1064") of a person of interest from a first client device(s) 1004, 1006. The process 1400 may also include receiving (block B1404), from an A/V recording and communication device such as (but not limited to) the second A/V recording and communication device 1012, image data such as (but not limited to) second image data 1090 captured by a camera 1070 of the second A/V recording and communication device 1012, as described above. Further, in some embodiments, the backend server 1030 may also receive second audio data 1092 captured by a microphone 1072 of the second A/V recording and communication device 1012 and/or second text data 1094 that describes the second image data 1090 and/or the second audio data 1092. In many embodiments, the second image data 1090, second audio data 1092, and/or second text data 1094, may be received (block B1404) before receiving (block B1402) the text-based description of the person of interest, and stored in either a database(s) 1032 and/or in the non-volatile memory 1176 storage of the backend server 1030 where it may be searched upon receiving the first text data 1064. The process 1400 may further include searching (block B1406) the second image data 1090 for a match of the text-based description of the person of interest. In some embodiments, the searching (block B1406) the second image data 1090 for a match of the text-based description of the person of interest may be performed using natural language processing. In some embodiments, the searching (block B1406) the second image data 1090 for a match of the text-based description of the person of interest may be performed by comparing a text-based description of the second image data 1090 with the received text-based description of the person of interest. If a match (block B1408) of the person of interest is not found, then the process 1400 may continue to search (block B1406) the second image data 1090. If, after continued searching of the second image data 1090 at block B1408, no match of the person of interest is found, the process 1400 may return a notification to the second client device(s) 1014, 1016, wherein the notification indicates that no match of the person of interest was found. However, if a match (block B1408) is found, then the process 1400 may include transmitting (block B1410), from the backend server 1030 to a second client device(s) 1014, 1016, associated with the second A/V recording and communication device 1012, the matched second image data 1090 and a request to confirm that the matched second image data 1090 includes the person of interest using a confirmation of person request signal 1161. In some embodiments, the backed server 1030 may also send the text based-description along with the matched second image data 1090 and the confirmation of person request signal 1161. Further, the process 1400 may include receiving (block B1412) a confirmation of person acknowledgment signal 1163, from the second client device(s) 1014, 1016, confirming that the matched second image data 1090 includes the person of interest. In some embodiments, the process 1400 may include transmitting, to the first client device(s) 1004, 1006, the matched second image data 1090 and a request to confirm that the matched second image data 1090 includes the person of interest. In such embodiments, the process 1400 may further include receiving, from the first client device(s) 1004, 1006, a confirmation that the matched second image data 1090 includes the person of interest.

Figure 56:
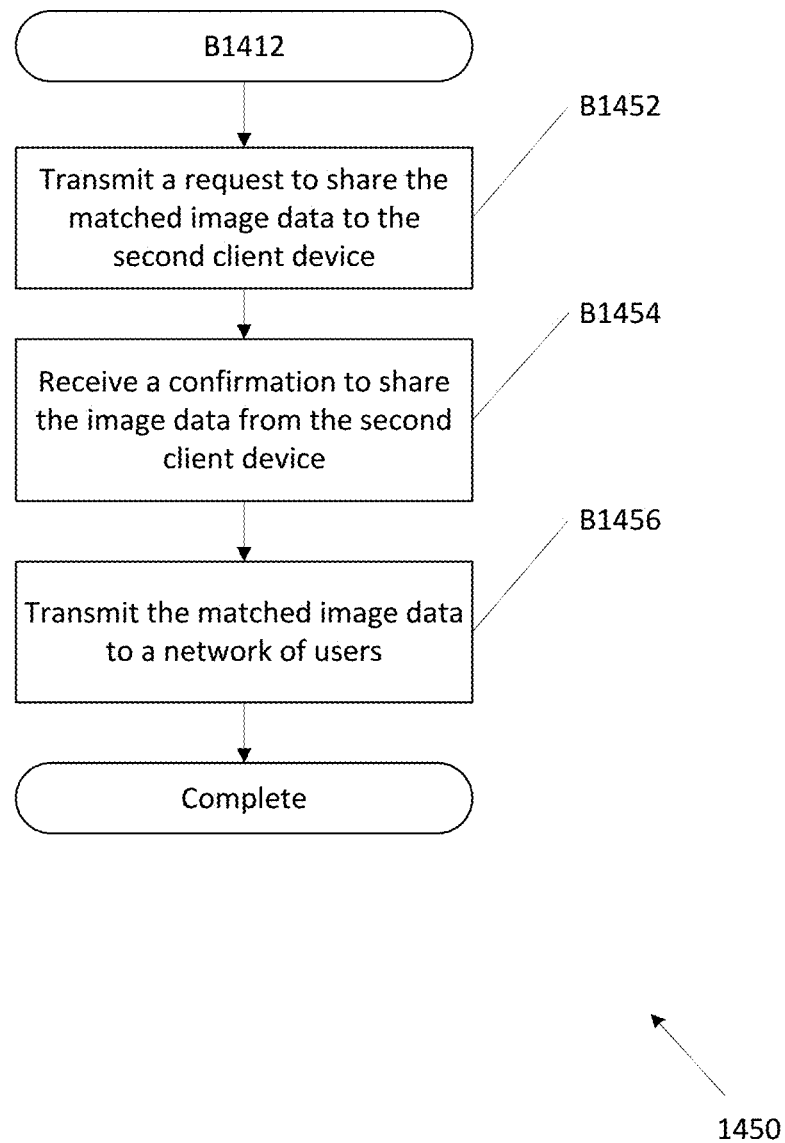

FIG. 56 is a flowchart illustrating another embodiment of a process 1450 for searching image data for a match of a person of interest provided in a text-based description according to various aspects of the present disclosure. In many embodiments, the process 1450 may continue from block B1412 of process 1400, as described above with respect to FIG. 55. In various embodiments, the process 1450 may include transmitting (block B1452), from the backend server 1030 to the second client device(s) 1014, 1016, a second image data share request signal 1164. In some embodiments, the second image data share request signal 1164 may include a request to share the matched second image data 1090 with a first user associated with the first client device(s) 1004, 1006 and/or a network of users. The process 1450 may also include receiving (block B1454), from the second client device(s) 1014, 1016, a second image data share acknowledgment signal 1165 that includes confirmation to share the matched second image data 1090 with the first client device(s) 1004, 1006 and/or the network of users. In addition, the process 1450 may include transmitting (block B1456) the matched second image data 1090 to the network of users.

Figure 57:
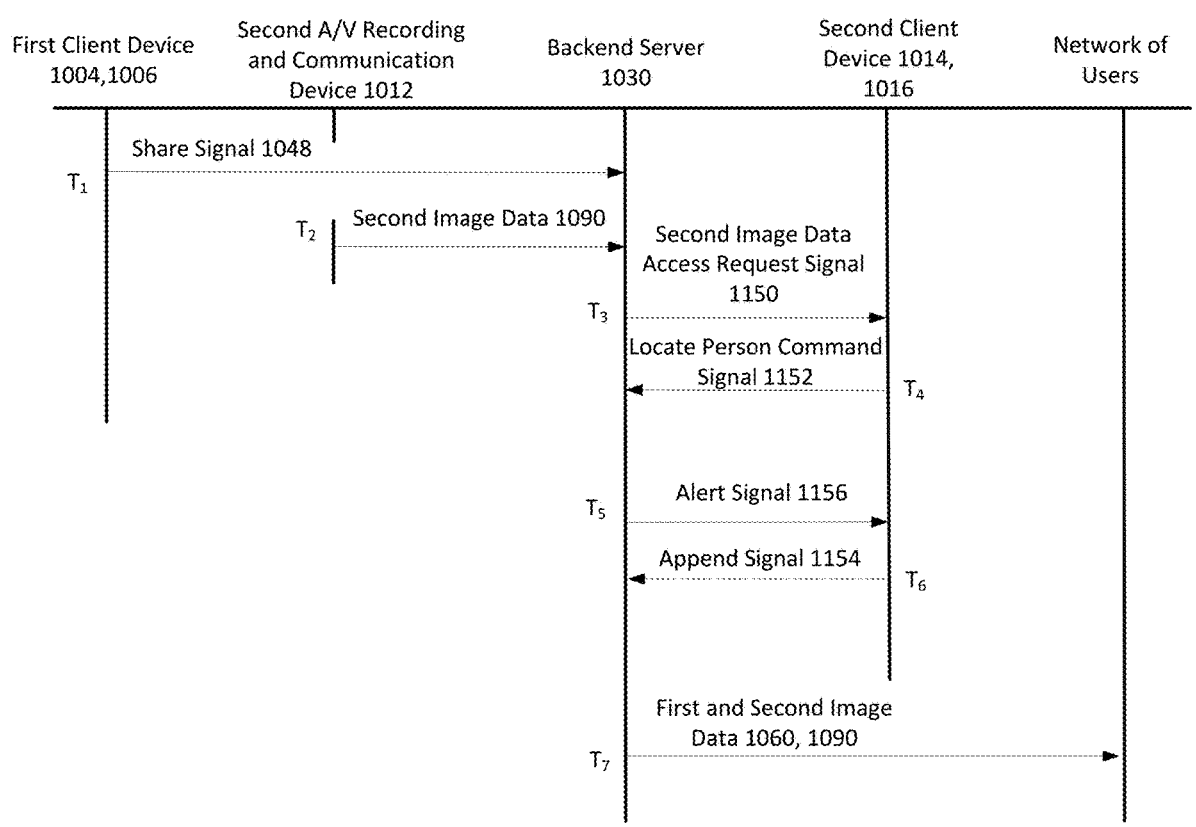
FIGS. 57 and 58 are sequence diagrams illustrating embodiments of processes for searching second image data for a match of a person of interest according to various aspects of the present disclosure.

FIG. 57 is a sequence diagram illustrating an embodiment of another process for searching second image data 1090 for a match of a person of interest according to various aspects of the present disclosure. The process may include a first client device(s) 1004, 1006, a second A/V recording and communication device 1012, a backend device such as the backend server 1030, a second client device(s) 1014, 1016, and a network of users. At a time $T_1$, the first client device 1004, 1006 may transmit a share signal 1048 including first image data 1060 that includes a person of interest, to the backend server 1030, as described above. In addition, at a time $T_2$, the second A/V recording and communication device 1012 may transmit to the backend server 1030 second image data 1090 captured using a camera 1070, as described above. In many embodiments, the second A/V recording and communication device 1012 may transmit the second image data 1090 before the first client device(s) 1004, 1006 transmits the share signal 1048. In this manner, the backend server 1030 may have second image data 1090 that has been stored and can be searched for a match of the person of interest found in the first image data 1060. However, the order of timing of $T_1$ or $T_2$ is inconsequential so long as the backend server 1030 has received the second image data 1090 prior to searching the second image data 1090 for a match of the person of interest. In many embodiments, the backend server may transmit a second image data access request signal 1150 to the second client device(s) 1014, 1016 at a time $T_3$, as described above. If access is granted, the second client device(s) 1014, 1016, may transmit a locate person command signal 1152 at a time $T_4$, in response to receiving the second image data access request signal 1150, as described above. Upon searching and finding a match of the person of interest in the second image data 1090, the backend server 1030 may transmit an alert signal 1156 at a time $T_5$, wherein the alert signal 1156 includes a notification that the person of interest was matched in the second image data 1090. In some embodiments, the second client device(s) 1014, 1016, may then transmit an append signal 1154 at a time $T_6$, that includes a command to append the second image data 1090 of the matched person of interest onto the shared first image data 1060 of the person of interest. At a time $T_7$, the backend server 1030, may transmit the first and second image data 1060, 1090 of the matched person of interest to the network of users.

Figure 58:
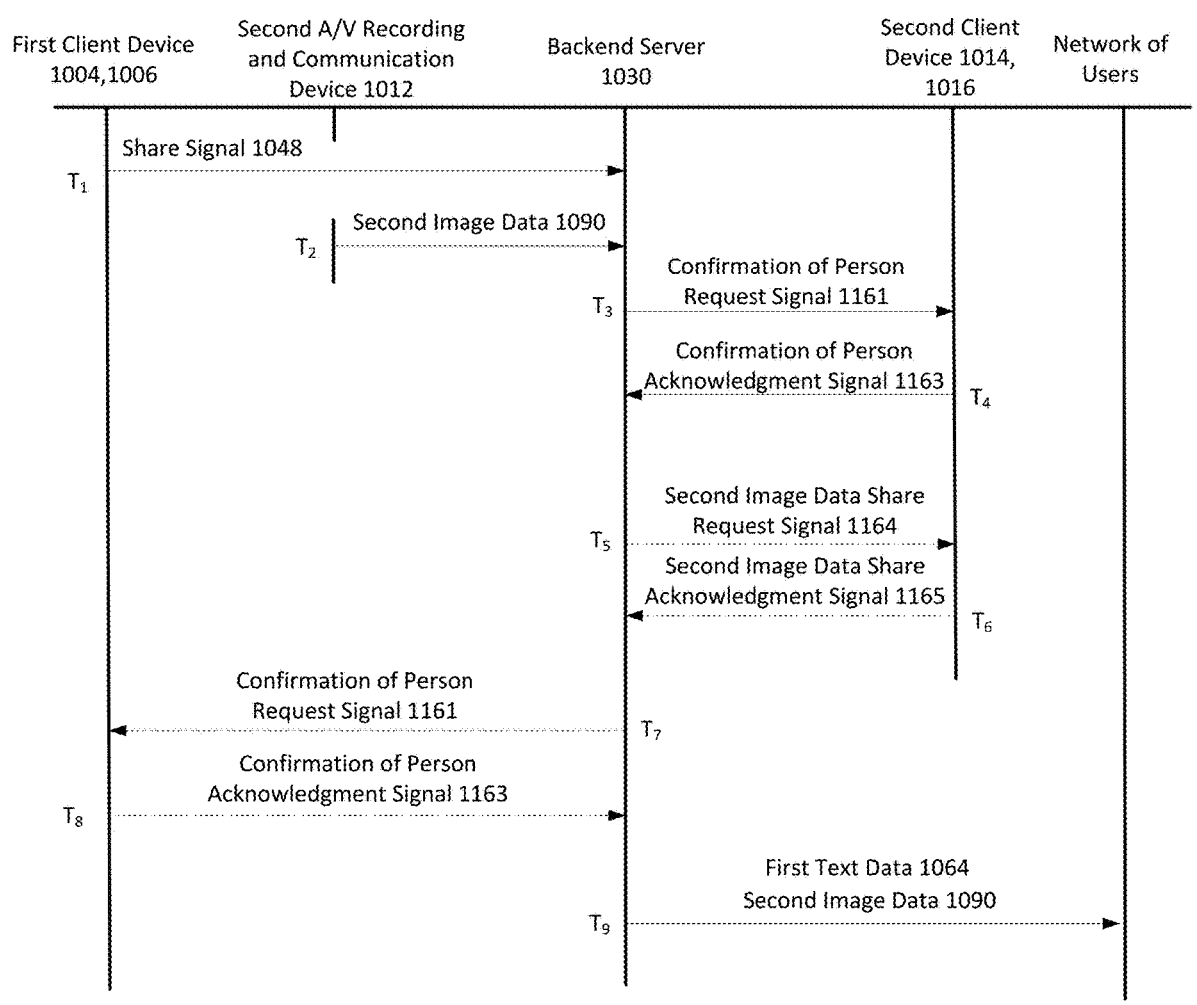

FIG. 58 is a sequence diagram illustrating an embodiment of another process for searching second image data 1090 for a match of a person of interest according to various aspects of the present disclosure. The process may include a first client device(s) 1004, 1006, a second A/V recording and communication device 1012, a backend device such as the backend server 1030, a second client device(s) 1014, 1016, and a network of users. At a time $T_1$, the first client device 1004, 1006 may transmit a share signal 1048 including first text data 1064 that includes a text-based description of a person of interest, to the backend server 1030, as described above. In addition, at a time $T_2$, the second A/V recording and communication device 1012 may transmit to the backend server 1030 second image data 1090 captured using a camera 1070, as described above. In many embodiments, the second A/V recording and communication device 1012 may transmit the second image data 1090 before the first client device(s) 1004, 1006 transmits the share signal 1048. In this manner, the backend server 1030 may have second image data 1090 that has been stored and can be searched for a match of the person of interest described in the first text data 1064. As described above, the order of timing of $T_1$ or $T_2$ is inconsequential so long as the backend server 1030 has received the second image data 1090 prior to searching the second image data 1090 for a match of the person of interest.

Upon finding a match of the text-based description of the person of interest in the second image data 1090, the backend server may transmit the matched second image data 1090, the text-based description of the person of interest, and a confirmation of person request signal 1161 to the second client device(s) 1014, 1016 at a time $T_3$, as described above. If a second user associated with the second client device(s) 1014, 1016 agrees that the matched second image data 1090 appears to match the text-based description of the person of interest, the second client device(s) 1014, 1016, may transmit a confirmation of person acknowledgment signal 1163 at a time $T_4$, as described above. In some embodiments, the backend server 1030 may transmit a second image data share request signal 1164 at a time $T_5$, to the second client device(s) 1014, 1016, seeking permission to share the second image data 1090 with other users. The second user may grant permission and transmit using the second client device(s) 1014, 1016 a second image data share acknowledgment signal 1165 at a time $T_6$. In some embodiments, upon finding a match of the text-based description of the person of interest in the second image data 1090, the backend server 1030 may also transmit the matched second image data 1090 and a confirmation of person request signal 1161 to the first client device(s) 1004, 1006 at a time $T_7$. If a first user associated with the first client device(s) 1004, 1006 agrees that the matched second image data 1090 appears to match the text-based description of the person of interest, the first client device(s) 1004, 1006 may transmit a confirmation of person acknowledgment signal 1163 at a time $T_8$, as described above. At a time $T_9$, the backend server 1030, may transmit the first text data 1064 and second image data 1090 of the matched person of interest to the network of users.

Figure 59:
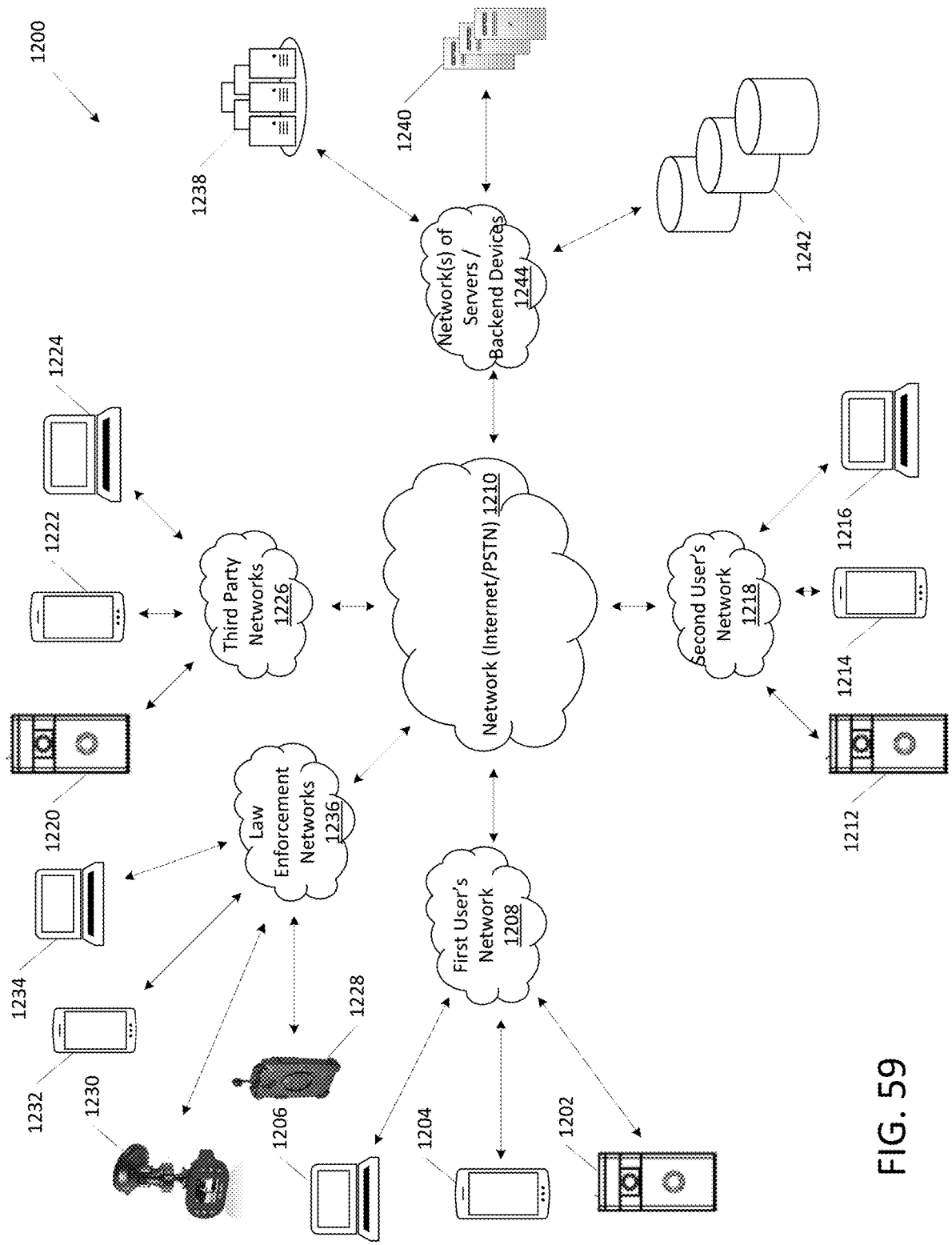
FIG. 59 is a functional block diagram illustrating a system for communicating in a network using various devices according to various aspects of the present disclosure.

FIG. 59 is a functional block diagram illustrating a system for communicating in a network using various signals. In some embodiments, the share signals may include image data and/or a text-based description of a person of interest according to various aspects of the present disclosure, as further described below. In some embodiments, first client device(s) 1004, 1006 may transmit a share signal 1048 to backend devices that may include information about a person of interest, as described above. However, in other embodiments, various other devices, such as (but not limited to) third party devices, may transmit various signals that may include various data including (but not limited to) image data, audio data, and/or text data to the backend devices that may include information about a person of interest that may be used to search and match to image data stored at the backend devices such as (but not limited to) the backend server and/or the databases.

In reference to FIG. 59, the system 1200 may include one or more first audio/video (A/V) recording and communication devices 1202 configured to access a first user's network 1208 to connect to a network (Internet/PSTN) 1210. The system 1200 may also include one or more first client devices 1204, 1206, which in various embodiments may be configured to be in network communication with the first A/V recording and communication device 1202. The first client devices 1204, 1206 may comprise, for example, a mobile phone such as a smartphone, or a computing device such as a tablet computer, a laptop computer, a desktop computer, etc. The first client devices 1204, 1206 may include any or all of the components and/or functionality of the first client devices 1004, 1006, client device 114, and/or the client device 850 described herein. In some embodiments, the first client devices 1204, 1206 may not be associated with a first A/V recording and communication device.

In various embodiments, the system 1200 may also include one or more second A/V recording and communication devices 1212 connected to the network (Internet/PSTN) 1210 using a second user's network 1218 to connect to a network (Internet/PSTN) 1210. The system 1200 may further include one or more second client devices 1214, 1216, which in various embodiments may be configured to be in network communication with the second A/V recording and communication device 1212. The second client devices 1214, 1216 may comprise, for example, a mobile phone such as a smartphone, or a computing device such as a tablet computer, a laptop computer, a desktop computer, etc. The second client devices 1214, 1216 may include any or all of the components and/or functionality of the second client devices 1014, 1016, client device 114, and/or the client device 850 described herein. In some embodiments, the second client devices 1214, 1216 may not be associated with a second A/V recording and communication device.

In some embodiments, the system 1200 may also include one or more third party A/V recording and communication devices 1220 connected to the network (Internet/PSTN) 1210 using various third party networks 1226 such as a local network, a wireless network such as a cellular/mobile network and/or a Wi-Fi network, a wired network such as an Ethernet network, a public network, a low-bandwidth network, and/or any other appropriate network to access the network (Internet/PSTN) 1210. The system 1200 may further include one or more third party client devices 1222, 1226, which in various embodiments may be configured to be in network communication with the third party A/V recording and communication device 1220. The third party client devices 1222, 1226 may comprise, for example, a mobile phone such as a smartphone, or a computing device such as a tablet computer, a laptop computer, a desktop computer, etc. The third party client devices 1222, 1226 may include any or all of the components and/or functionality of the first client devices 1004, 1006, second client devices 1014, 1016, client device 114, and/or the client device 850 described herein. In some embodiments, the third party client devices 1222, 1226 may not be associated with a third party A/V recording and communication device.

With further reference to FIG. 59, the system 1200 may also include law enforcement A/V recording and communication devices 1228, 1230 connected to the network (Internet/PSTN) 1210 using a law enforcement network 1236 such as a local network, a wireless network such as a cellular/mobile network and/or a Wi-Fi network, a wired network such as an Ethernet network, a public network, a low-bandwidth network, and/or any other appropriate network to access the network (Internet/PSTN) 1210. In addition, the law enforcement A/V recording and communication devices 1228, 1230 may be configured to capture image data, audio data, and/or text data and be associated with law enforcement client devices 1232, 1234. In the illustrated embodiment, the law enforcement A/V recording and communication devices include a body camera 1228 and a dashboard camera 1230, but the illustrated devices are only examples and are not limiting.

In further reference to FIG. 59, the system 1200 may also include various backend devices such as (but not limited to) storage devices 1242, backend servers 1240, and backend APIs 1238 in network communication with the law enforcement A/V recording and communication devices 1228, 1230, the first and second A/V recording and communication devices 1202, 1212, and the third party A/V recording and communication devices 1220. Further, the various backend devices 1238, 1240, 1242 may be in network communication with the law enforcement client devices 1232, 1234, the first client devices 1204, 1206, the second client devices 1214, 1216, and the third party client devices 1222, 1224. In some embodiments, the storage devices 1242 may be a separate device from the backend servers 1240 (as illustrated) or may be an integral component of the backend servers 1240. In addition, the first user's network 1208 and the second user's network 1218 may be similar in structure and/or function to the user's network 1008 and network 1018 (FIG. 47), respectively. Further, the network 1210 may be similar in structure and/or function to the network 1010 (FIG. 47). As described above, the backend devices such as the backend servers 1240 may be configured to receive a share signal from the first client devices 1204, 1206 comprising image data and/or a text-based description of a person of interest that may be used to search stored image data for a match of the person of interest. Further, the backend devices such as the backend servers 1240 may also be configured to receive various signals having image data and/or a text-based description of a person of interest from any A/V recording and communication device, such as the third party A/V recording and communication device 1220 and/or the law enforcement A/V recording and communication devices 1228, 1230, using the processes described above. In addition, the backend devices such as the backend server 1240 may receive the various signals having image data and/or a text-based description of a person of interest from third party client devices 1222, 1224, and law enforcement client devices 1232, 1234. In some embodiments, the backend devices such as the backend server 1240 may receive the various signals having image data and/or a text-based description of a person of interest from third party social networks that may include any social media service or platform that uses computer-mediated tools that allow participants to create, share, and/or exchange information in virtual communities and/or networks, such as (but not limited to) social networking websites and/or applications running on participant devices. Non-limiting examples of social networks include NEXTDOOR®, FACEBOOK®, INSTAGRAM®, SNAPCHAT®, TWITTER®, etc. In some embodiments, the backend devices such as the backend server 1240 may receive the various signals from third parties, such as the general public, where a member of the public may transmit a signal that includes image data and/or a text-based description of a person of interest using their third party device(s) 1222, 1224, such as, but not limited to, a smartphone, where the signal transmitted by the member of the public may include image data, audio data, and/or text data.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method comprising:
   receiving, from a first client device associated with a first audio/video recording and communication device (A/V device), and at a server in network communication with the first A/V device, first image data captured by a camera of the first A/V device, the first image data representing images of a person of interest;
   receiving, from a second A/V device, and at the server in network communication with the second A/V device, second image data captured by a camera of the second A/V device;
   transmitting, from the server, and to a second client device associated with the second A/V device, the first image data;
   transmitting, from the server, and to the second client device, a request to check the second image data for the person of interest;
   after sending the request, receiving, from the second client device, and at the server, a command to locate the person of interest;
   determining that the second image data represents images of the person of interest; and
   after determining that the second image data represents images of the person of interest, transmitting, to the second client device, notification that the second image data represents the person of interest.

2. The method of claim 1, further comprising sending the second image data to the second client device.

3. The method of claim 1, further comprising sending, to the second client device, a request for permission to share the second image data with a network of users.

4. The method of claim 3, further comprising receiving, from the second client device, a command to append the second image data onto the first image data.

5. The method of claim 4, further comprising transmitting, to at least a third client device associated with the network of users, the first image data and the second image data.

6. The method of claim 1, further comprising analyzing the second image data using at least one of facial recognition, color matching schemes, and a body build score,
   wherein determining that the second image data represents images of the person of interest is based at least in part on analyzing the second image data.

7. The method of claim 1, further comprising receiving a confirmation that the second image data represents images of the person of interest.

8. The method of claim 1, further comprising determining that a subset of the second image data captured during a predetermined length of time represents images of the person of interest.

9. The method of claim 1, further comprising receiving, from the second client device, and at the server, an additional command to locate an additional person of interest when a signal is received.

10. A method comprising:
receiving, from a first client device, and at a server in network communication with the first client device, a text-based description of a person of interest;
receiving, from an audio/video recording and communication device (A/V device), and at the server in network communication with the A/V device, image data captured by a camera of the A/V device;
determining, based at least in part on the text-based description, that the image data represents images of the person of interest;
transmitting, from the server, and to a second client device associated with the A/V device, the data;
transmitting, from the server, and to the second client device, a request to confirm that the image data represents images of the person of interest; and
receiving, from the second client device, a confirmation that the image data represents images of the person of interest.

11. The method of claim 10, further comprising transmitting, to the second client device, a request to share the image data with a user associated with the first client device.

12. The method of claim 11, further comprising receiving, from the second client device, and at the server, a confirmation to share the image data with the first client device.

13. The method of claim 12, further comprising:
transmitting, to the first client device, the image data; and
transmitting, to the first client device, a request to confirm that the image data represents images of the person of interest.

14. The method of claim 13, further comprising receiving, from the first client device, and at the server, a confirmation that the image data represents images of the person of interest.

15. The method of claim 10, further comprising transmitting the image data to at least a third client device associated with a network of users.

16. The method of claim 10, further comprising transmitting, to the second client device, a request to share the image data with a network of users.

17. The method of claim 16, further comprising receiving, from the second client device, and at the server, a confirmation to share the image data with the network of users.

18. The method of claim 17, further comprising causing the image data to be shared with the network of users.

19. The method of claim 10, wherein determining the image data represents images of the person of interest is further based at least in part on using natural language processing.

20. The method of claim 10, further comprising:
comparing an additional text-based description of the image data with the text-based description of the person of interest,
wherein determining that the image data represents images of the person of interest is based at least in part on comparing the additional text-based description with the text-based description.

21. A method comprising:
receiving, from a server, and at a second client device associated with a second audio/video recording and communication device (A/V device), first image data captured by a first camera of a first A/V device associated with a first client device, the first image data representing images of a person of interest;
displaying, on a display of the second client device, at least one of the images of the person of interest;
receiving, from the server, and at the second client device, a request to access second image data to search for a match of the person of interest, wherein the second image data is captured using a second camera of the second A/V device;
displaying, on the display of the second client device, the request to access the second image data to search for the match of the person of interest;
receiving an input associated with locating the person of interest;
transmitting, from the second client device, and to the server, a command to locate the person of interest; and
receiving, from the server, and at the second client device, a notification that the second image data represents images of the person of interest.

22. The method of claim 21, further comprising receiving, from the server, and at the second client device, the second image data representing the person of interest.

23. The method of claim 21, further comprising receiving, from the server, and at the second client device, a request for permission to share the second image data with a network of users.

24. The method of claim 23, further comprising:
displaying, on the display of the second client device, the request to share the second image data with the network of users;
receiving an additional input associated with sharing the second image data with the network of users; and
transmitting, from the second client device, and to the server, a command to append the second image data onto the first image data.

25. The method of claim 21, further comprising:
displaying, on the display of the second client device, a request to automatically grant access to the second image data to search for a match of a further person of interest;
receiving an additional input associated with automatically granting the access; and
transmitting, from the second client device, and to the server, permission to access the second image data to search for the match of the further person of interest.

26. A non-transitory machine-readable medium storing instructions executable by a processor of a client device, which when executed cause the client device to:
receive, from a server, first image data captured by a first camera of a first A/V recording and communication device (A/V device), wherein the first image data represents images of a person of interest;
display, on a display of the client device, at least one of the images of the person of interest;
receive, from the server, a request for permission to access second image data to search for a match of the person of interest, wherein the second image data is captured using a second camera of a second A/V device associated with the client device;
display, on the display of the client device, the request to access the second image data to search for the match of the person of interest;
receive an input associated with locating the person of interest;
transmit to the server, a command to locate the person of interest; and receive, from the server, a notification that the person of interest was matched in the second image data.

27. The non-transitory machine-readable medium of claim 26, storing further instructions executable by the processor of the client device, which when executed further cause the client device to receive, from the server, the second image data representing images of the person of interest.

28. The non-transitory machine-readable medium of claim 26, storing further instructions executable by the processor of the client device, which when executed further cause the client device to receive, from the server, a request for permission to share the second image data representing images of the person of interest with a network of users.

29. The non-transitory machine-readable medium of claim 28, storing further instructions executable by the processor of the client device, which when executed further cause the client device to:
   display, on the display of the client device, the request to share the second image data with the network of users;
   receive an additional input associated with sharing the second image data; and
   transmit, to the server, a command to share the second image data with the network of users.

30. The non-transitory machine-readable medium of claim 26, storing further instructions executable by the processor of the client device, which when executed further cause the client device to:
   display, on the display of the client device, a request to automatically grant access to the second image data to search for a match of a further person of interest;
   receive an additional input associated with automatically granting the access; and
   transmit, to the server, permission to access the second image data to search for the match of the further person of interest.

* * * * *

UNITED STATES PATENT AND TRADEMARK OFFICE
CERTIFICATE OF CORRECTION

PATENT NO. : 10,841,542 B2
APPLICATION NO. : 15/857537
DATED : November 17, 2020
INVENTOR(S) : James Siminoff et al.

Page 1 of 1

It is certified that error appears in the above-identified patent and that said Letters Patent is hereby corrected as shown below:

In the Claims

Column 63, Line 18, change "the data" to --the image data--.

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*